United States Patent
den Boer et al.

(10) Patent No.: US 10,816,686 B2
(45) Date of Patent: Oct. 27, 2020

(54) SEISMIC CONSTRAINED DISCRETE FRACTURE NETWORK

(71) Applicant: Schlumberger Technology Corporation, Sugar Land, TX (US)

(72) Inventors: Lennert David den Boer, Calgary (CA); Colin M. Sayers, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 269 days.

(21) Appl. No.: 15/747,933

(22) PCT Filed: Jul. 20, 2016

(86) PCT No.: PCT/US2016/043027
§ 371 (c)(1),
(2) Date: Jan. 26, 2018

(87) PCT Pub. No.: WO2017/019388
PCT Pub. Date: Feb. 2, 2017

(65) Prior Publication Data
US 2018/0203146 A1    Jul. 19, 2018

Related U.S. Application Data

(60) Provisional application No. 62/197,889, filed on Jul. 28, 2015.

(51) Int. Cl.
*G01V 1/30* (2006.01)
(52) U.S. Cl.
CPC .............. *G01V 1/306* (2013.01); *G01V 1/307* (2013.01); *G01V 2210/6161* (2013.01);
(Continued)

(58) Field of Classification Search
CPC ........... G01V 1/306; G01V 2210/6242; G01V 2210/632; G01V 2210/626
See application file for complete search history.

(56) References Cited

U.S. PATENT DOCUMENTS

| 5,508,973 A | 4/1996 | Mallick et al. |
| 7,679,993 B2 | 3/2010 | Sayers |

(Continued)

FOREIGN PATENT DOCUMENTS

| CN | 104407378 A | 3/2015 |
| WO | 2013/016733 A1 | 1/2013 |

OTHER PUBLICATIONS

Sayers et al., Seismic characterization of naturally fractured reservoirs using amplitude versus offset and azimuth analysis, 2012, University of Houston, European Association of Geoscientists & Engineers, Geophysical Prospecting, pp. 1-21 (Year: 2012).*

(Continued)

*Primary Examiner* — Mohamed Charioui
(74) *Attorney, Agent, or Firm* — Mitch Blakely

(57) ABSTRACT

A method can include receiving values of an inversion based at least in part on seismic amplitude variation with azimuth (AVAz) data for a region of a geologic environment; based at least in part on the received values, computing values that depend on components of a second-rank tensor $a_{ij}$; selecting a fracture height for fractures in the geologic environment; selecting an azimuth for a first fracture set of the fractures; based at least in part on the values for the second-rank tensor $a_{ij}$, the fracture height and the selected azimuth, determining an azimuth for a second fracture set of the fractures; and generating a discrete fracture network (DFN) for at least a portion of the region of the geologic environment where the discrete fracture network (DFN) includes fractures of the first fracture set and fractures of the second fracture set.

20 Claims, 25 Drawing Sheets

(52) U.S. Cl.
CPC ............... *G01V 2210/626* (2013.01); *G01V 2210/6226* (2013.01); *G01V 2210/6242* (2013.01); *G01V 2210/632* (2013.01)

(56) References Cited

U.S. PATENT DOCUMENTS

| | | | |
|---|---|---|---|
| 2010/0256964 A1 | 10/2010 | Lee et al. | |
| 2011/0087472 A1 | 4/2011 | den Boer et al. | |
| 2011/0182144 A1* | 7/2011 | Gray ................... | G01V 1/30 367/75 |
| 2012/0239363 A1* | 9/2012 | Durrani ............... | E21B 43/00 703/10 |
| 2012/0318500 A1 | 12/2012 | Urbancic et al. | |
| 2013/0235693 A1* | 9/2013 | Ball .................... | G01V 1/50 367/31 |
| 2014/0365420 A1* | 12/2014 | Jocker ................. | G01V 1/48 706/52 |

OTHER PUBLICATIONS

International Preliminary Report on Patentability for the equivalent International patent application PCT/US2016/043027 dated Feb. 8, 2018.
Bachrach, et al., "Recent Advances in the Characterization of Unconventional Reservoirs with Wide-Azimuth Seismic Data," SPE 168764 / URTeC 1580020, Unconventional Resources Technology Conference Aug. 12-14, 2013, Denver Colorado, USA.
Gillespie, et al., "Measurement and characterization of spatial distributions of fractures," Tectonophysics, 1993, vol. 226, pp. 113-141.
Psencik, et al., "Properties of weak contrast PP reflection/transmission coefficients for weakly anisotropic elastic media," Studia Geophysica et Geodaetica, 2001, vol. 45, pp. 176-199.
Rueger, "P-wave reflection coefficients for transversely isotropic media with vertical and horizontal axis of symmetry," Geophysics, 1997, vol. 62, No. 3, pp. 713-722.
Sayers, "Misalignment of the orientation of fractures and the principal axes for P- and S-waves in rocks containing multiple non-orthogonal fracture sets," Geophysical Journal International, 1998, vol. 133, Issue 2, pp. 459-466.
Sayers, et al., "Azimuthal variation in AVO response for fractured gas sands," Geophysical Prospecting, 1997, vol. 45, Issue 1, pp. 165-182.
Sayers, et al., "Microcrack-induced elastic wave anisotropy of brittle rocks," Journal of Geophysical Research B, 1995, vol. 100, Issue B3, pp. 4149-4156.
Sayers, et al., "Azimuth-dependent AVO in reservoirs containing non-orthogonal fracture sets," Geophysical Prospecting, 2001, vol. 49, Issue 1, pp. 100-106.
Schoenberg, et al., "Zoeppritz' rationalized and generalized to anisotropy," Journal of Seismic Exploration, 1992, vol. 1, pp. 125-144.
Schoenberg, et al., "Seismic anisotropy of fractured rock," Geophysics, 1995, vol. 60, Issue 1, pp. 204-211.
Worthington, "The compliance of macrofractures," The Leading Edge, 2007, SEG, Sep. 2007, vol. 26, Issue 9, pp. 1118-1122.
International Search Report and Written Opinion for the equivalent International patent application PCT/US2016/043027 dated Oct. 5, 2016.

* cited by examiner

Trends 610

| Θ | Path Length | Frequency | Layer Thickness |
|---|---|---|---|
| 10° | 2*z*1.01 |  |  |
| 20° | 2*z*1.06 |  |  |
| 30° | 2*z*1.15 |  |  |
| 40° | 2*z*1.31 |  |  |
| 50° | 2*z*1.56 |  |  |
| 60° | 2*z*2.00 |  |  |

SEISMIC CONSTRAINED DISCRETE FRACTURE NETWORK

RELATED APPLICATIONS

This application claims the benefit of and priority to a U.S. Provisional Application having Ser. No. 62/197,889, filed 28 Jul. 2015, which is incorporated by reference herein.

BACKGROUND

Seismic interpretation is a process that may examine seismic data (e.g., location and time or depth) in an effort to identify subsurface structures such as horizons and faults. Structures may be, for example, faulted stratigraphic formations indicative of hydrocarbon traps or flow channels. In the field of resource extraction, enhancements to seismic interpretation can allow for construction of a more accurate model, which, in turn, may improve seismic volume analysis for purposes of resource extraction. Various techniques described herein pertain to processing of seismic data, for example, for analysis of such data to characterize one or more regions in a geologic environment and, for example, to perform one or more operations (e.g., field operations, etc.).

SUMMARY

In accordance with some embodiments, a method includes receiving values of an inversion based at least in part on seismic amplitude variation with azimuth data for a region of a geologic environment; based at least in part on the received values, computing values that depend on components of a second-rank tensor; selecting a fracture height for fractures in the geologic environment; selecting an azimuth for a first fracture set of the fractures; based at least in part on the values for the second-rank tensor, the fracture height and the selected azimuth, determining an azimuth for a second fracture set of the fractures; and generating a discrete fracture network for at least a portion of the region of the geologic environment where the discrete fracture network includes fractures of the first fracture set and fractures of the second fracture set.

In some embodiments, an aspect of a method includes components of a second-rank tensor that are associated with shear compliance.

In some embodiments, an aspect of a method includes components of a second-rank tensor that include components with i, j indexes 1,1, 1,2 and 2,2.

In some embodiments, an aspect of a method includes fracture planes that are aligned substantially vertically where a region of a geologic environment is characterized as being transversely isotropic with a vertical or tilted axis of rotational symmetry.

In some embodiments, an aspect of a method includes impedance values that include S-Impedance values.

In some embodiments, an aspect of a method includes impedance values that include P-Impedance values.

In some embodiments, an aspect of a method includes receiving impedance values for fast shear impedance $I_{S_1}$ and slow shear impedance $I_{S_2}$.

In some embodiments, an aspect of a method includes receiving at least shear impedance values and a value for a fast shear azimuth.

In some embodiments, an aspect of a method includes receiving values for $\Gamma_x$ and $\Gamma_y$.

In some embodiments, an aspect of a method includes an inversion that is or includes a linearized orthotropic inversion.

In some embodiments, an aspect of a method includes receiving values for P-impedance ($I_P$), fast shear impedance ($I_{S_1}$), slow shear impedance ($I_{S_2}$) and fast shear azimuth ($\phi_{S_1}$).

In some embodiments, an aspect of a method includes selecting fracture planes at random from probability distribution functions for determining agreement with results of seismic amplitude variation with azimuth inversion.

In some embodiments, an aspect of a method includes selecting fracture planes for determining agreement with results of seismic inversion by using an appropriate scale-dependent relation between fracture normal and shear compliance and fracture dimensions.

In some embodiments, an aspect of a method includes, based at least in part on a discrete fracture network, performing one or more of predicting permeability of a reservoir, determining a location for an in-fill well, determining an orientation of an in-fill well, and determining a location and an orientation of an in-fill well.

In some embodiments, an aspect of a method includes constraints from well data that constrain fracture orientations at one or more well locations and at least in part determine properties of background media.

In some embodiments, an aspect of a method includes computing values that depend on components of the second-rank tensor and that depend on components of a fourth-rank tensor where the components of the second-rank tensor are associated with shear compliance and where the components of the fourth-rank tensor are associated with normal compliance and shear compliance.

In accordance with some embodiments, a system includes a processor; memory operatively coupled to the processor; and one or more modules that include processor-executable instructions stored in the memory to instruct the system, the instructions including instructions to: receive values from an inversion based at least in part on seismic amplitude variation with azimuth data for a region of a geologic environment; based at least in part on the received values, compute values that depend on components of a second-rank tensor; select a fracture height for fractures in the geologic environment; select an azimuth for a first fracture set of the fractures; based at least in part on the values for the second-rank tensor, the fracture height and the selected azimuth, determine an azimuth for a second fracture set of the fractures; and generate a discrete fracture network for at least a portion of the region of the geologic environment where the discrete fracture network includes fractures of the first fracture set and fractures of the second fracture set.

In some embodiments, an aspect of a system includes components of a second-rank tensor that are associated with shear compliance.

In accordance with some embodiments, one or more computer-readable storage media include computer-executable instructions to instruct a computer where the instructions include instructions to: receive values from an inversion based at least in part on seismic amplitude variation with azimuth data for a region of a geologic environment; based at least in part on the received values, compute values that depend on components of a second-rank tensor; select a fracture height for fractures in the geologic environment; select an azimuth for a first fracture set of the fractures; based at least in part on the values for the second-rank tensor, the fracture height and the selected azimuth, determine an azimuth for a second fracture set of the fractures;

and generate a discrete fracture network for at least a portion of the region of the geologic environment where the discrete fracture network includes fractures of the first fracture set and fractures of the second fracture set.

In some embodiments, an aspect of one or more one or more computer-readable storage media includes instructions to instruct a computer to, based at least in part on received values, compute values that depend on components of a second-rank tensor where the components of a second-rank tensor are associated with shear compliance.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

This description is not to be taken in a limiting sense, but rather is made merely for the purpose of describing the general principles of the implementations. The scope of the described implementations should be ascertained with reference to the issued claims.

Figure 1:
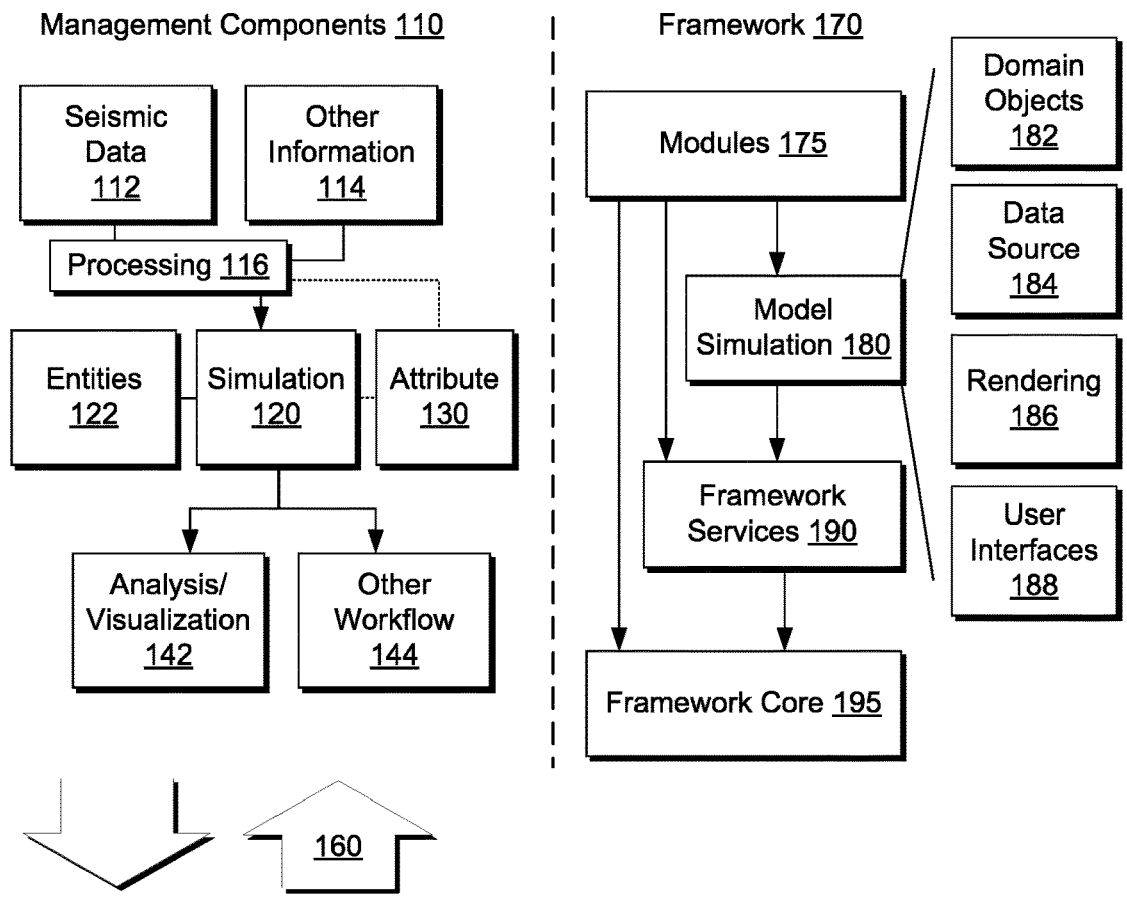
FIG. 1 illustrates an example system that includes various components for modeling a geologic environment and various equipment associated with the geologic environment.
Figure 1:
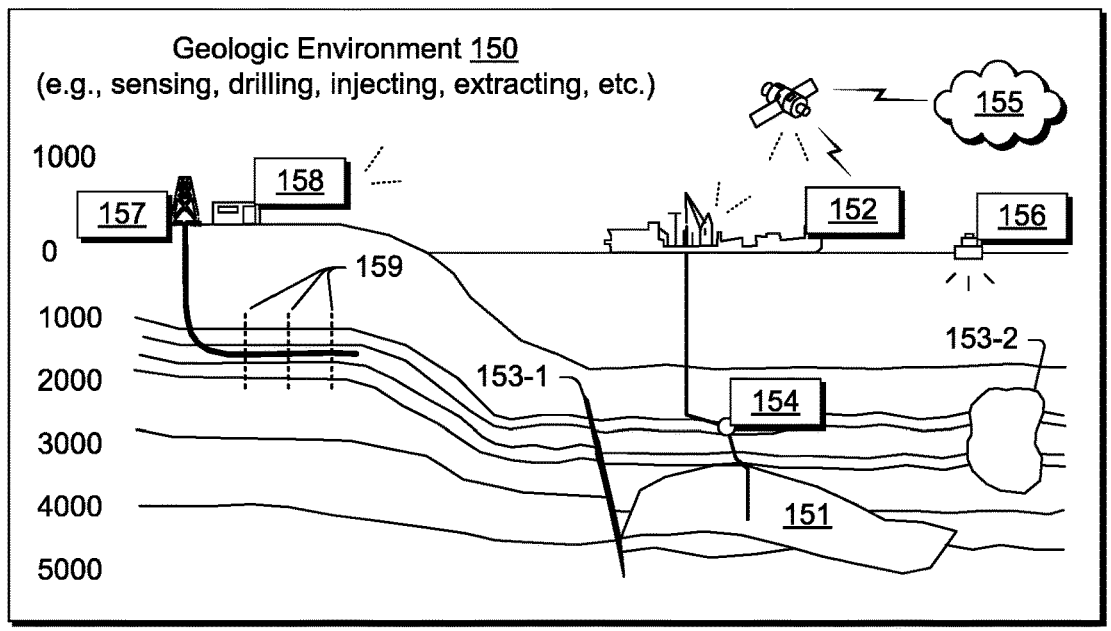

FIG. 1 shows an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE® reservoir simulator (Schlumberger Limited, Houston Tex.), the INTERSECT® reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET™ tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment

157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
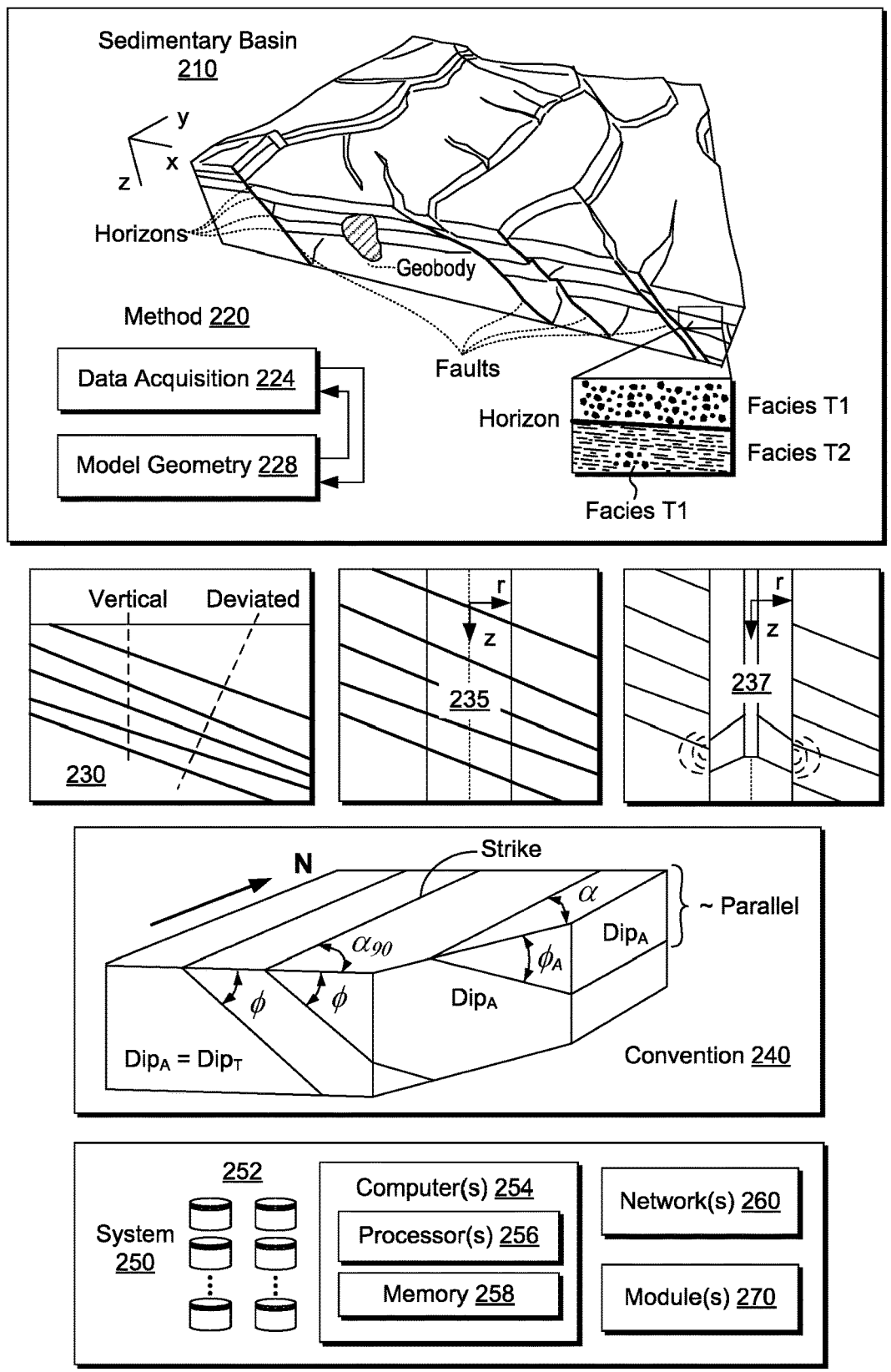
FIG. 2 illustrates an example of a sedimentary basin, an example of a method, an example of a formation, an example of a borehole, an example of a borehole tool, an example of a convention and an example of a system.

FIG. 2 shows an example of a sedimentary basin 210 (e.g., a geologic environment), an example of a method 220 for model building (e.g., for a simulator, etc.), an example of a formation 230, an example of a borehole 235 in a formation, an example of a convention 240 and an example of a system 250.

As an example, reservoir simulation, petroleum systems modeling, etc. may be applied to characterize various types of subsurface environments, including environments such as those of FIG. 1.

In FIG. 2, the sedimentary basin 210, which is a geologic environment, includes horizons, faults, one or more geobodies and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 220 includes a data acquisition block 224 and a model geometry block 228. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling, quantities such as temperature, pressure and porosity distributions within the sediments may be modeled, for example, by solving partial differential equations (PDEs) using one or more numerical techniques. Modeling may also model geometry with respect to time, for example, to account for changes stemming from geological events (e.g., deposition of material, erosion of material, shifting of material, etc.).

A commercially available modeling framework marketed as the PETROMOD® framework (Schlumberger Limited, Houston, Tex.) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows.

As shown in FIG. 2, the formation 230 includes a horizontal surface and various subsurface layers. As an example, a borehole may be vertical. As another example, a borehole may be deviated. In the example of FIG. 2, the borehole 235 may be considered a vertical borehole, for example, where the z-axis extends downwardly normal to the horizontal surface of the formation 230. As an example, a tool 237 may be positioned in a borehole, for example, to acquire information. As mentioned, a borehole tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

As an example, a borehole may be vertical, deviate and/or horizontal. As an example, a tool may be positioned to acquire information in a horizontal portion of a borehole. Analysis of such information may reveal vugs, dissolution planes (e.g., dissolution along bedding planes), stress-related features, dip events, etc. As an example, a tool may acquire information that may help to characterize a fractured reservoir, optionally where fractures may be natural and/or artificial (e.g., hydraulic fractures). Such information may assist with completions, stimulation treatment, etc. As an example, information acquired by a tool may be analyzed using a framework such as the TECHLOG® framework (Schlumberger Limited, Houston, Tex.).

As to the convention 240 for dip, as shown, the three dimensional orientation of a plane can be defined by its dip and strike. Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 240 of FIG. 2, various angles φ indicate angle of slope downwards, for example, from an imaginary horizontal plane (e.g., flat upper surface); whereas, dip refers to the direction towards which a dipping plane slopes (e.g., which may be given with respect to degrees, compass directions, etc.). Another feature shown in the convention of FIG. 2 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 240 of FIG. 2). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 240 of FIG. 2). Apparent dip may be the dip of a plane as measured in any other direction except in the direction of true dip (see, e.g., $\phi_A$ as $Dip_A$ for angle $\alpha$); however, it is possible that the apparent dip is equal to the true dip (see, e.g., $\phi$ as $Dip_A$=$Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 240 of FIG. 2, the dip of a plane as seen in a cross-section perpendicular to the strike is true dip (see, e.g., the surface with $\phi$ as $Dip_A$=$Dip_T$ for angle $\alpha_{90}$ with respect to the strike). As indicated, dip observed in a cross-section in any other direction is apparent dip (see, e.g., surfaces labeled $Dip_A$). Further, as shown in the convention 240 of FIG. 2, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 240 may be used with respect to an analysis, an interpretation, an attribute, etc. (see, e.g., various blocks of the system 100 of FIG. 1). As an example, various types of features may be described, in part, by dip (e.g., sedimentary bedding, faults and fractures, cuestas, igneous dikes and sills, metamorphic foliation, etc.). As an example, dip may change spatially as a layer approaches a geobody. For example, consider a salt body that may rise due to various forces (e.g., buoyancy, etc.). In such an example, dip may trend upward as a salt body moves upward.

Seismic interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As an example, equations may be provided for petroleum expulsion and migration, which may be modeled and simulated, for example, with respect to a period of time. Petroleum migration from a source material (e.g., primary migration or expulsion) may include use of a saturation model where migration-saturation values control expulsion. Determinations as to secondary migration of petroleum (e.g., oil or gas), may include using hydrodynamic potential of fluid and accounting for driving forces that promote fluid flow. Such forces can include buoyancy gradient, pore pressure gradient, and capillary pressure gradient.

As shown in FIG. 2, the system 250 includes one or more information storage devices 252, one or more computers 254, one or more networks 260 and one or more modules 270. As to the one or more computers 254, each computer may include one or more processors (e.g., or processing cores) 256 and memory 258 for storing instructions (e.g., modules), for example, executable by at least one of the one or more processors. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252.

As an example, the one or more modules 270 may include instructions (e.g., stored in memory) executable by one or more processors to instruct the system 250 to perform various actions. As an example, the system 250 may be configured such that the one or more modules 270 provide for establishing the framework 170 of FIG. 1 or a portion thereof. As an example, one or more methods, techniques, etc. may be performed using one or more modules, which may be, for example, one or more of the one or more modules 270 of FIG. 2.

As mentioned, seismic data may be acquired and analyzed to understand better subsurface structure of a geologic environment. Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz or optionally less than 1 Hz and/or optionally more than 100 Hz). Seismic data may be processed and interpreted, for example, to understand better composition, fluid content, extent and geometry of subsurface rocks.

Figure 3:
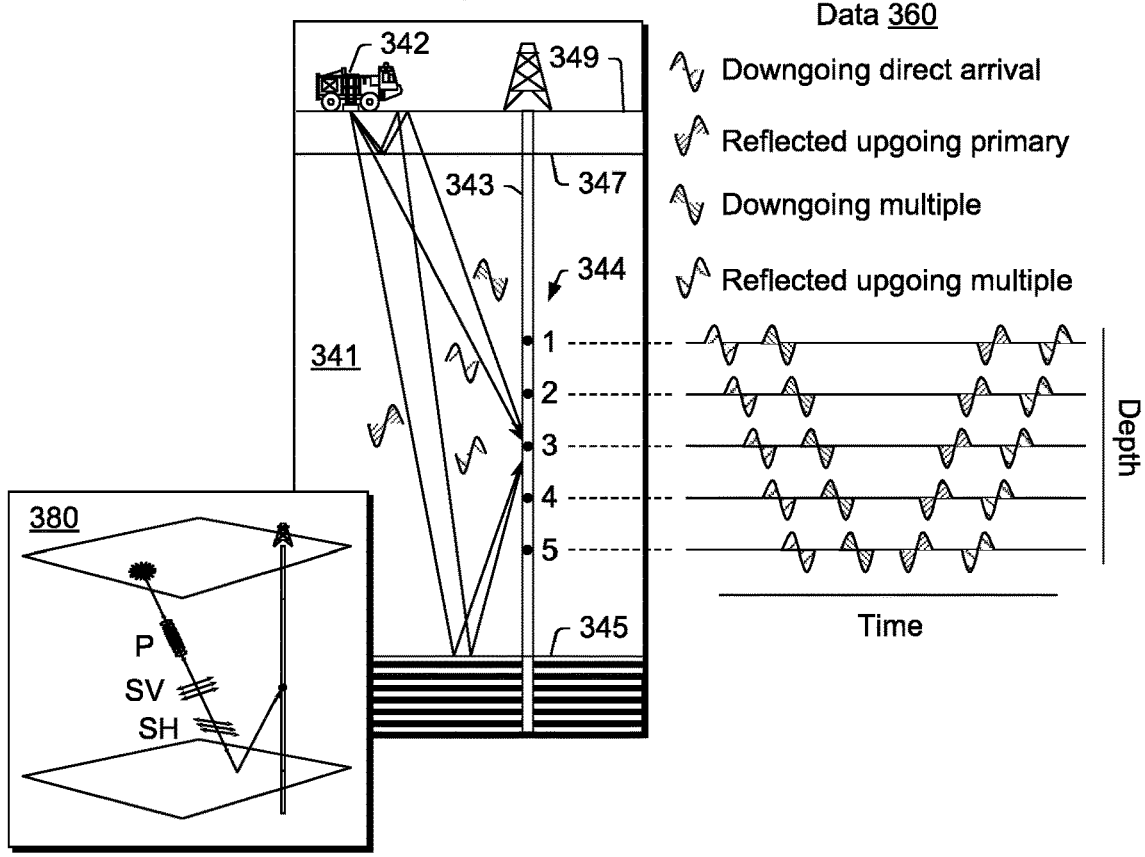
FIG. 3 illustrates an example of a technique that may acquire data.
Figure 3:
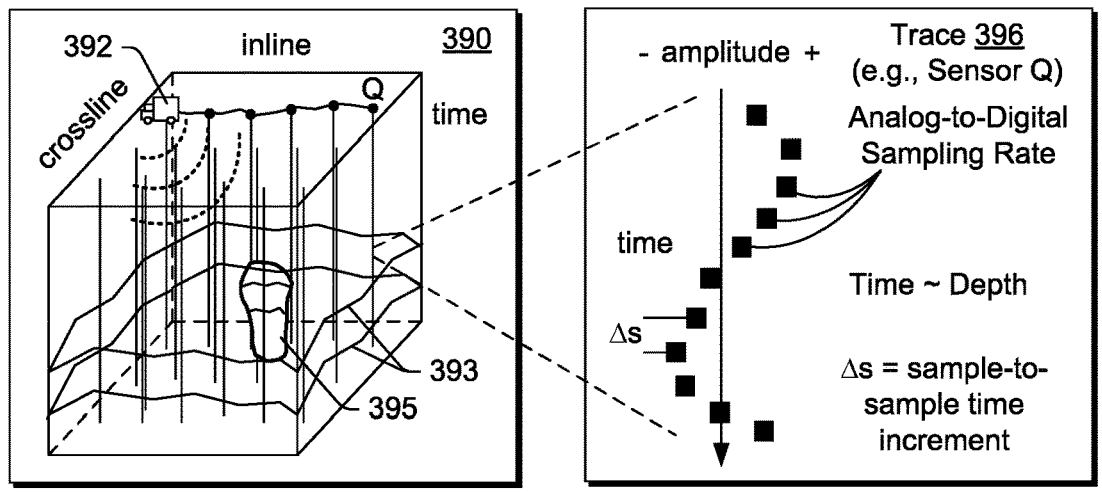

FIG. 3 shows an example of an acquisition technique 340 to acquire seismic data (see, e.g., data 360). As an example, a system may process data acquired by the technique 340, for example, to allow for direct or indirect management of sensing, drilling, injecting, extracting, etc., with respect to a geologic environment. In turn, further information about the geologic environment may become available as feedback (e.g., optionally as input to the system). As an example, an operation may pertain to a reservoir that exists in a geologic environment such as, for example, a reservoir. As an example, a technique may provide information (e.g., as an output) that may specifies one or more location coordinates of a feature in a geologic environment, one or more characteristics of a feature in a geologic environment, etc.

In FIG. 3, the technique 340 may be implemented with respect to a geologic environment 341. As shown, an energy source (e.g., a transmitter) 342 may emit energy where the energy travels as waves that interact with the geologic environment 341. As an example, the geologic environment 341 may include a bore 343 where one or more sensors (e.g., receivers) 344 may be positioned in the bore 343. As an example, energy emitted by the energy source 342 may interact with a layer (e.g., a structure, an interface, etc.) 345 in the geologic environment 341 such that a portion of the energy is reflected, which may then be sensed by one or more of the sensors 344. Such energy may be reflected as an upgoing primary wave (e.g., or "primary" or "singly" reflected wave). As an example, a portion of emitted energy may be reflected by more than one structure in the geologic environment and referred to as a multiple reflected wave (e.g., or "multiple"). For example, the geologic environment 341 is shown as including a layer 347 that resides below a surface layer 349. Given such an environment and arrangement of the source 342 and the one or more sensors 344, energy may be sensed as being associated with particular types of waves.

As an example, a "multiple" may refer to multiply reflected seismic energy or, for example, an event in seismic data that has incurred more than one reflection in its travel path. As an example, depending on a time delay from a primary event with which a multiple may be associated, a multiple may be characterized as a short-path or a peg-leg, for example, which may imply that a multiple may interfere with a primary reflection, or long-path, for example, where a multiple may appear as a separate event. As an example, seismic data may include evidence of an interbed multiple from bed interfaces, evidence of a multiple from a water interface (e.g., an interface of a base of water and rock or sediment beneath it) or evidence of a multiple from an air-water interface, etc.

As shown in FIG. 3, the acquired data 360 can include data associated with downgoing direct arrival waves, reflected upgoing primary waves, downgoing multiple reflected waves and reflected upgoing multiple reflected waves. The acquired data 360 is also shown along a time axis and a depth axis. As indicated, in a manner dependent at least in part on characteristics of media in the geologic environment 341, waves travel at velocities over distances such that relationships may exist between time and space. Thus, time information, as associated with sensed energy, may allow for understanding spatial relations of layers, interfaces, structures, etc. in a geologic environment.

FIG. 3 also shows a diagram 380 that illustrates various types of waves as including P, SV an SH waves. As an example, a P-wave may be an elastic body wave or sound wave in which particles oscillate in the direction the wave propagates. As an example, P-waves incident on an interface (e.g., at other than normal incidence, etc.) may produce reflected and transmitted S-waves (e.g., "converted" waves). As an example, an S-wave or shear wave may be an elastic body wave, for example, in which particles oscillate perpendicular to the direction in which the wave propagates. S-waves may be generated by a seismic energy sources (e.g., other than an air gun). As an example, S-waves may be converted to P-waves. S-waves tend to travel more slowly than P-waves and do not travel through fluids that do not support shear. In general, recording of S-waves involves use of one or more receivers operatively coupled to earth (e.g., capable of receiving shear forces with respect to time). As an example, interpretation of S-waves may allow for determination of rock properties such as fracture density and orientation, Poisson's ratio and rock type, for example, by crossplotting P-wave and S-wave velocities, and/or by other techniques.

As an example of parameters that may characterize anisotropy of media (e.g., seismic anisotropy), consider the Thomsen parameters ε, δ and γ. The Thomsen parameter δ describes depth mismatch between logs (e.g., actual depth) and seismic depth. As to the Thomsen parameter ε, it describes a difference between vertical and horizontal compressional waves (e.g., P or P-wave or quasi compressional wave qP or qP-wave). As to the Thomsen parameter γ, it describes a difference between horizontally polarized and vertically polarized shear waves (e.g., horizontal shear wave SH or SH-wave and vertical shear wave SV or SV-wave or quasi vertical shear wave qSV or qSV-wave). Thus, the Thomsen parameters ε and γ may be estimated from wave data while estimation of the Thomsen parameter δ may involve access to additional information. As an example, an inversion technique may be applied to generate a model that may include one or more parameters such as one or more of the Thomsen parameters. For example, one or more types of data may be received and used in solving an inverse problem that outputs a model (e.g., a reflectivity model, an impedance model, etc.).

In the example of FIG. 3, a diagram 390 shows acquisition equipment 392 emitting energy from a source (e.g., a transmitter) and receiving reflected energy via one or more sensors (e.g., receivers) strung along an inline direction. As the region includes layers 393 and, for example, the geobody 395, energy emitted by a transmitter of the acquisition equipment 392 can reflect off the layers 393 and the geobody 395. Evidence of such reflections may be found in the acquired traces. As to the portion of a trace 396, energy received may be discretized by an analog-to-digital converter that operates at a sampling rate. For example, the acquisition equipment 392 may convert energy signals sensed by sensor Q to digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

Figure 4:
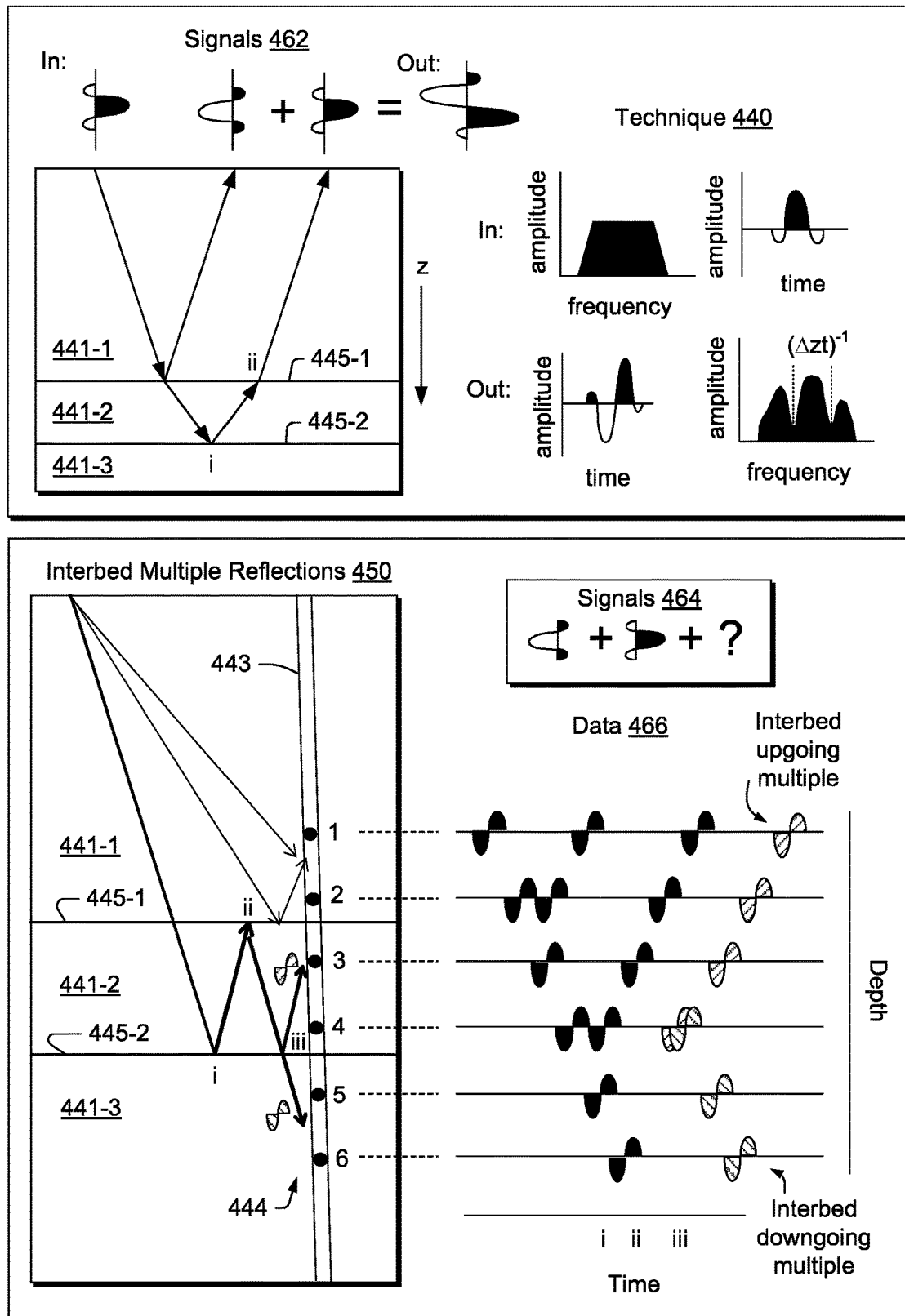
FIG. 4 illustrates examples of signals, an example of a technique, examples of data, etc.

FIG. 4 shows an example of a technique 440, examples of signals 462 associated with the technique 440, examples of interbed multiple reflections 450 and examples of signals 464 and data 466 associated with the interbed multiple reflections 450. As an example, the technique 440 may include emitting energy with respect to time where the energy may be represented in a frequency domain, for example, as a band of frequencies. In such an example, the emitted energy may be a wavelet and, for example, referred to as a source wavelet which has a corresponding frequency spectrum (e.g., per a Fourier transform of the wavelet).

As an example, a geologic environment may include layers 441-1, 441-2 and 441-3 where an interface 445-1 exists between the layers 441-1 and 441-2 and where an interface 445-2 exists between the layers 441-2 and 441-3. As illustrated in FIG. 4, a wavelet may be first transmitted downward in the layer 441-1; be, in part, reflected upward by the interface 445-1 and transmitted upward in the layer 441-1; be, in part, transmitted through the interface 445-1 and transmitted downward in the layer 441-2; be, in part, reflected upward by the interface 445-2 (see, e.g., "i") and transmitted upward in the layer 441-2; and be, in part, transmitted through the interface 445-1 (see, e.g., "ii") and again transmitted in the layer 441-1. In such an example, signals (see, e.g., the signals 462) may be received as a result of wavelet reflection from the interface 445-1 and as a result of wavelet reflection from the interface 445-2. These signals may be shifted in time and in polarity such that addition of these signals results in a waveform that may be analyzed to derive some information as to one or more characteristics of the layer 441-2 (e.g., and/or one or more of the interfaces 445-1 and 445-2). For example, a Fourier transform of signals may provide information in a frequency domain that can be used to estimate a temporal thickness (e.g., $\Delta zt$) of the layer 441-2 (e.g., as related to acoustic impedance, reflectivity, etc.).

As to the data 466, as an example, they illustrate further transmissions of emitted energy, including transmissions associated with the interbed multiple reflections 450. For example, while the technique 440 is illustrated with respect to interface related events i and ii, the data 466 further account for additional interface related events, denoted iii, that stem from the event ii. Specifically, as shown in FIG. 4, energy is reflected downward by the interface 445-1 where a portion of that energy is transmitted through the interface 445-2 as an interbed downgoing multiple and where another portion of that energy is reflected upward by the interface 445-2 as an interbed upgoing multiple. These portions of energy may be received by one or more receivers 444 (e.g., disposed in a well 443) as signals. These signals may be summed with other signals, for example, as explained with respect to the technique 440. For example, such interbed multiple signals may be received by one or more receivers over a period of time in a manner that acts to "sum" their amplitudes with amplitudes of other signals (see, e.g., illustration of signals 462 where interbed multiple signals are represented by a question mark "?"). In such an example, the additional interbed signals may interfere with an analysis that aims to determine one or more characteristics of the layer 441-2 (e.g., and/or one or more of the interfaces 445-1 and 445-2). For example, interbed multiple signals may interfere with identification of a layer, an interface, interfaces, etc. (e.g., consider an analysis that determines temporal thickness of a layer, etc.).

Figure 5:
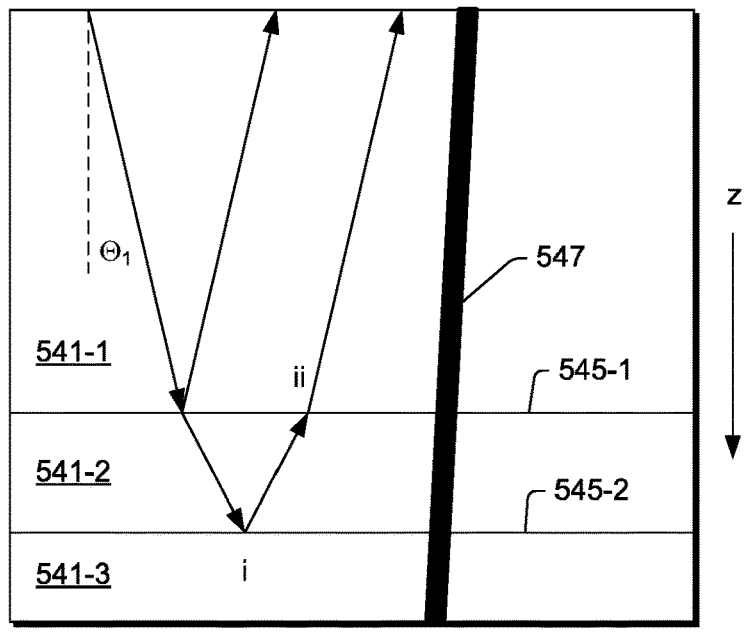
FIG. 5 illustrates examples of survey angles.
Figure 5:
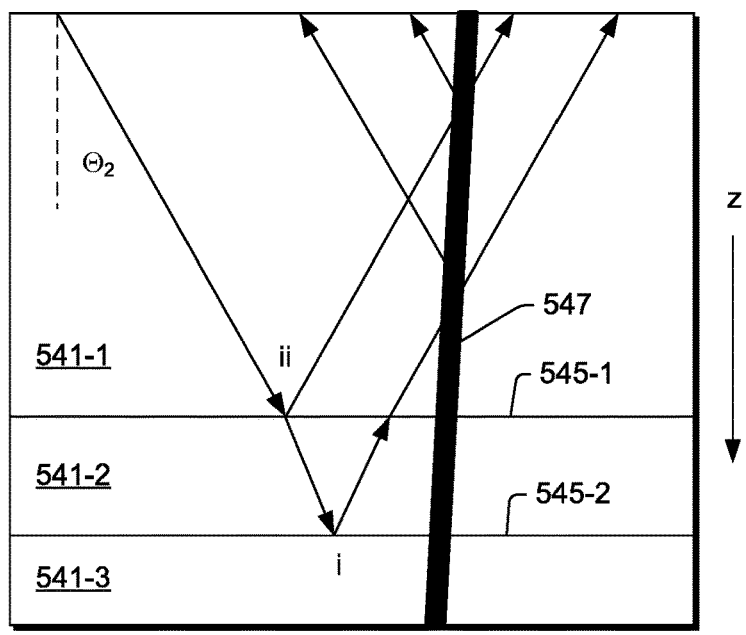

FIG. 5 shows examples 502 and 504 of survey angles $\Theta_1$ and $\Theta_2$ in a geologic environment that includes layers 541-1, 541-2 and 541-3 where an interface 545-1 exists between the layers 541-1 and 541-2, where an interface 545-2 exists between the layers 541-2 and 541-3 and where a relatively vertical feature 547 extends through the layers 541-1, 541-2 and 541-3.

As shown in the examples 502 and 504, the angle $\Theta_1$ is less than the angle $\Theta_2$. As angle increases, path length of a wave traveling in a subsurface region from an emitter to a detector increases, which can lead to attenuation of higher frequencies and increased interactions with features such as the feature 547. Thus, arrangements of emitters and detectors can, for a particular subsurface region, have an effect on acquired seismic survey data that covers that subsurface region.

Figure 6:
FIG. 6 illustrates examples of trends with respect to survey angles.
Figure 6:
Figure 6:
Figure 6:
Figure 6:
Figure 6:
Figure 6:
Figure 6:
Figure 6:
Figure 6:
Figure 6:
Figure 6:

FIG. 6 shows examples of trends 610 that may exist as angle increases. The trends 610 include a path length trend where path length increases with respect to angle, a frequency trend where higher frequencies are attenuated with respect to angle and where "resolution" with respect to layer thickness decreases with respect to angle (e.g., smaller angles may provide high resolution that can distinguish thinner layers).

Figure 7:
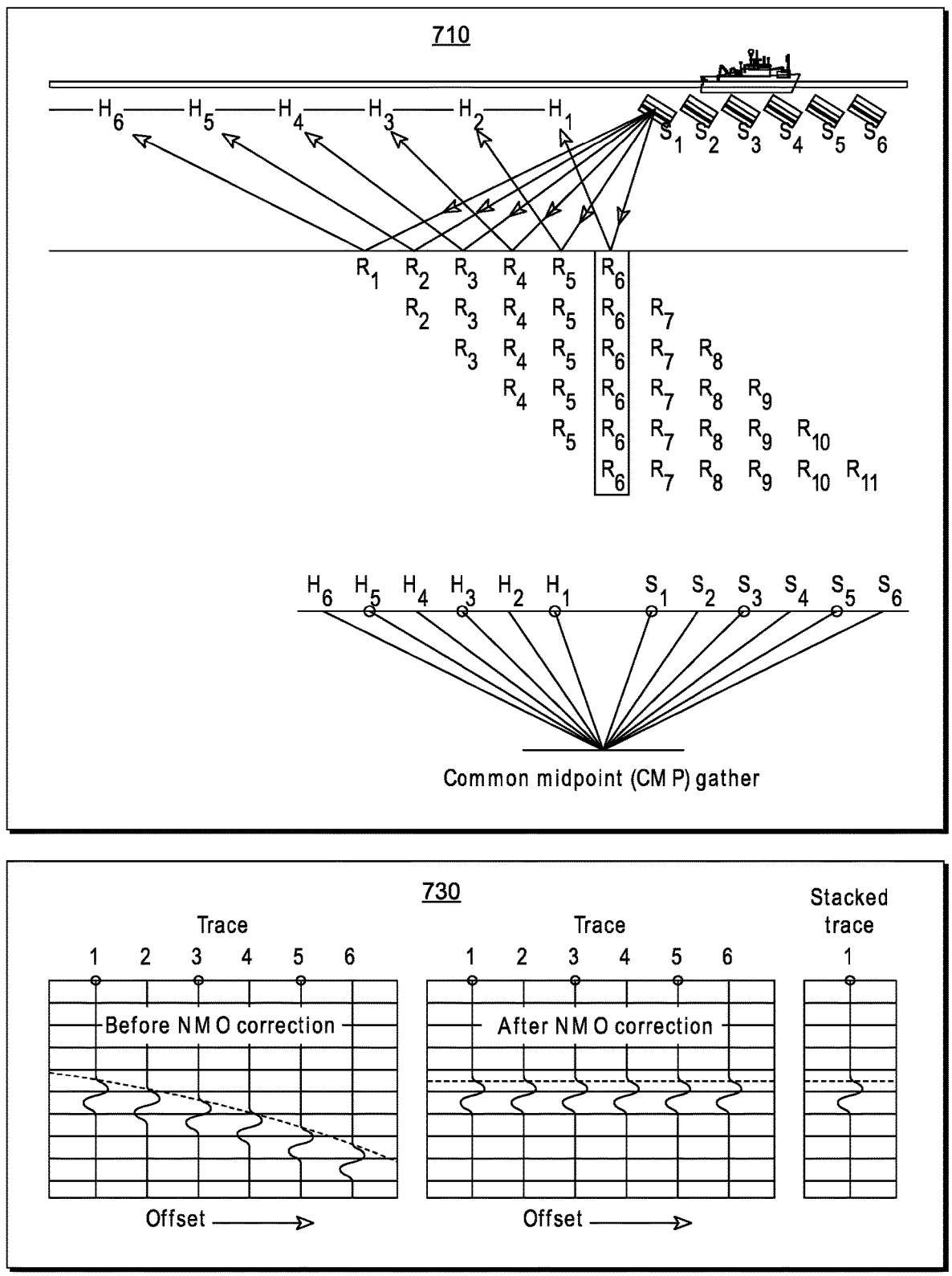
FIG. 7 illustrates an example of a survey and an example of a moveout technique.

FIG. 7 shows an example of a survey technique 710 and an example of processing seismic data 730, which may be referred to as normal moveout (NMO). NMO aims to account for the effect of the separation between receiver and source on the arrival time of a reflection that does not dip. A reflection may arrive first at the receiver nearest the source. The offset between the source and other receivers induces a delay in the arrival time of a reflection from a horizontal surface at depth. A plot of arrival times versus offset has a hyperbolic shape.

As shown in the example of FIG. 7, traces from different source-receiver pairs that share a common midpoint (CMP), such as receiver 6 (R6), can be adjusted during seismic processing to remove effects of different source-receiver offsets, or NMO. After NMO adjustments, the traces can be stacked to improve the signal-to-noise ratio.

Figure 8:
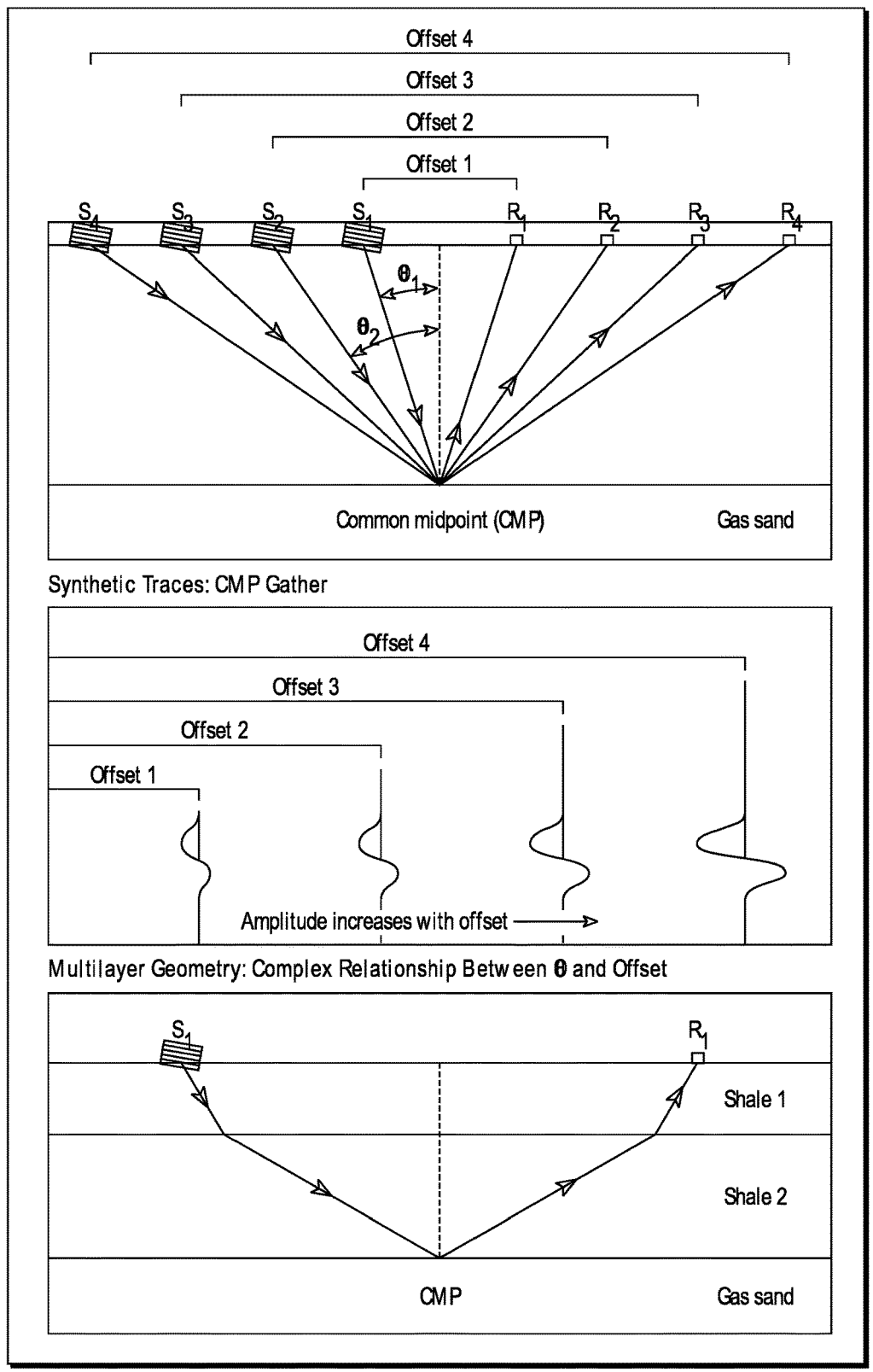
FIG. 8 illustrates an example of a survey and associated processing.

FIG. 8 shows an example of various AVO processes where angles exist between a common midpoint (CMP) and sources and receivers. As shown in FIG. 8, amplitude can increase with offset. In such an example, averaging the four traces with Offsets 1, 2, 3 and 4 would produce a trace that does not resemble a zero-offset trace; in other words, stacking would not preserve amplitudes. As shown in the lower view of FIG. 8, the offset versus angle relationship may be determined by, for example, ray tracing.

Figure 9:
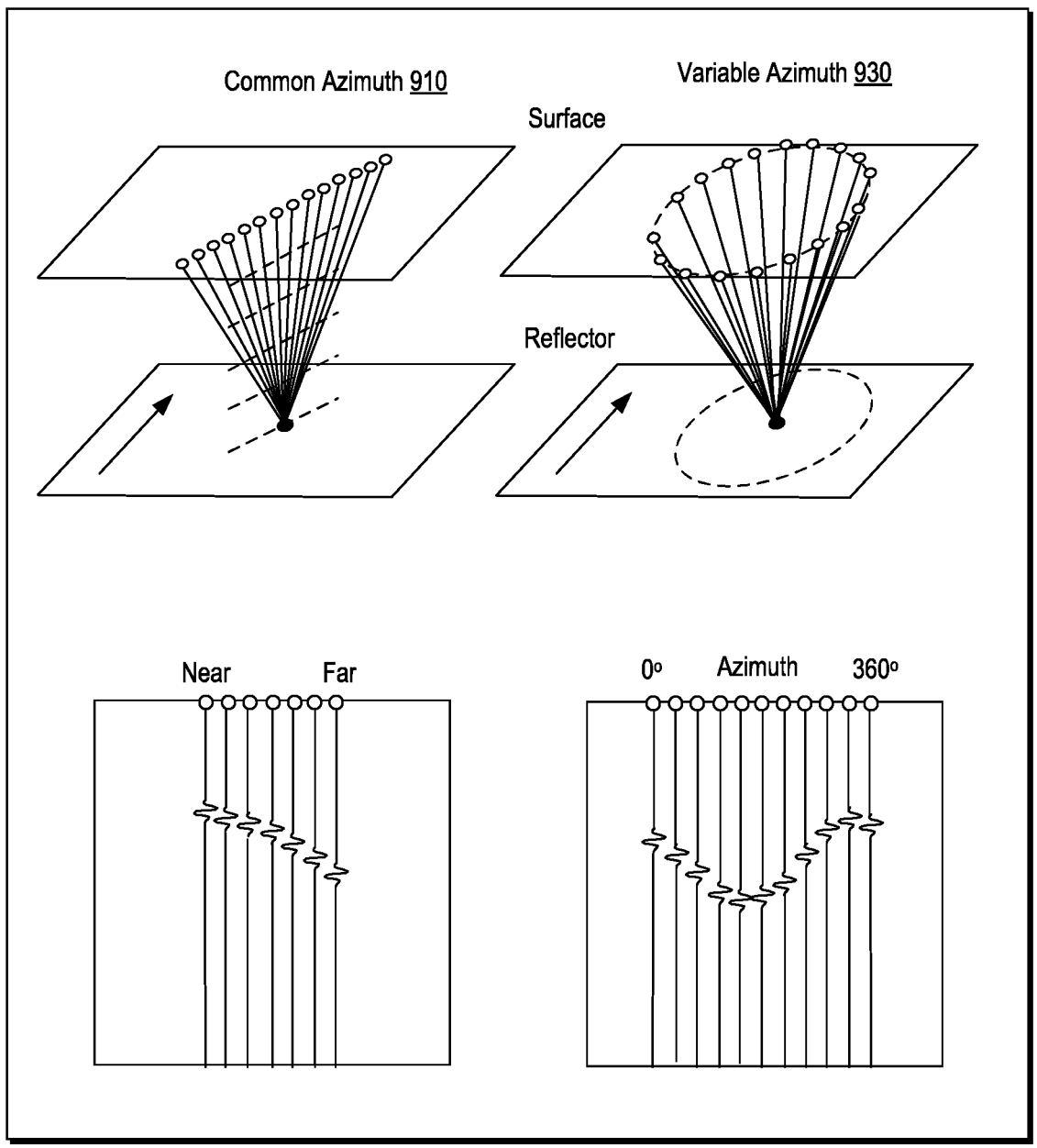
FIG. 9 illustrates an example of a common azimuth survey and an example of a variable azimuth survey.

FIG. 9 shows an example of a survey with common azimuth 910 and an example of a survey with variable azimuth 930. As shown in FIG. 9, variations for the common azimuth with respect to near and far source-receiver distance correspond to the trend illustrated in FIG. 7 (e.g., where NMO may be applied) while variations for the variable azimuth correspond to a different type of trend.

As an example, a technique may be referred to as an AVOz technique, which is an abbreviation for amplitude variation with offset and azimuth (e.g., the azimuthal variation of the AVO response).

Figure 10:
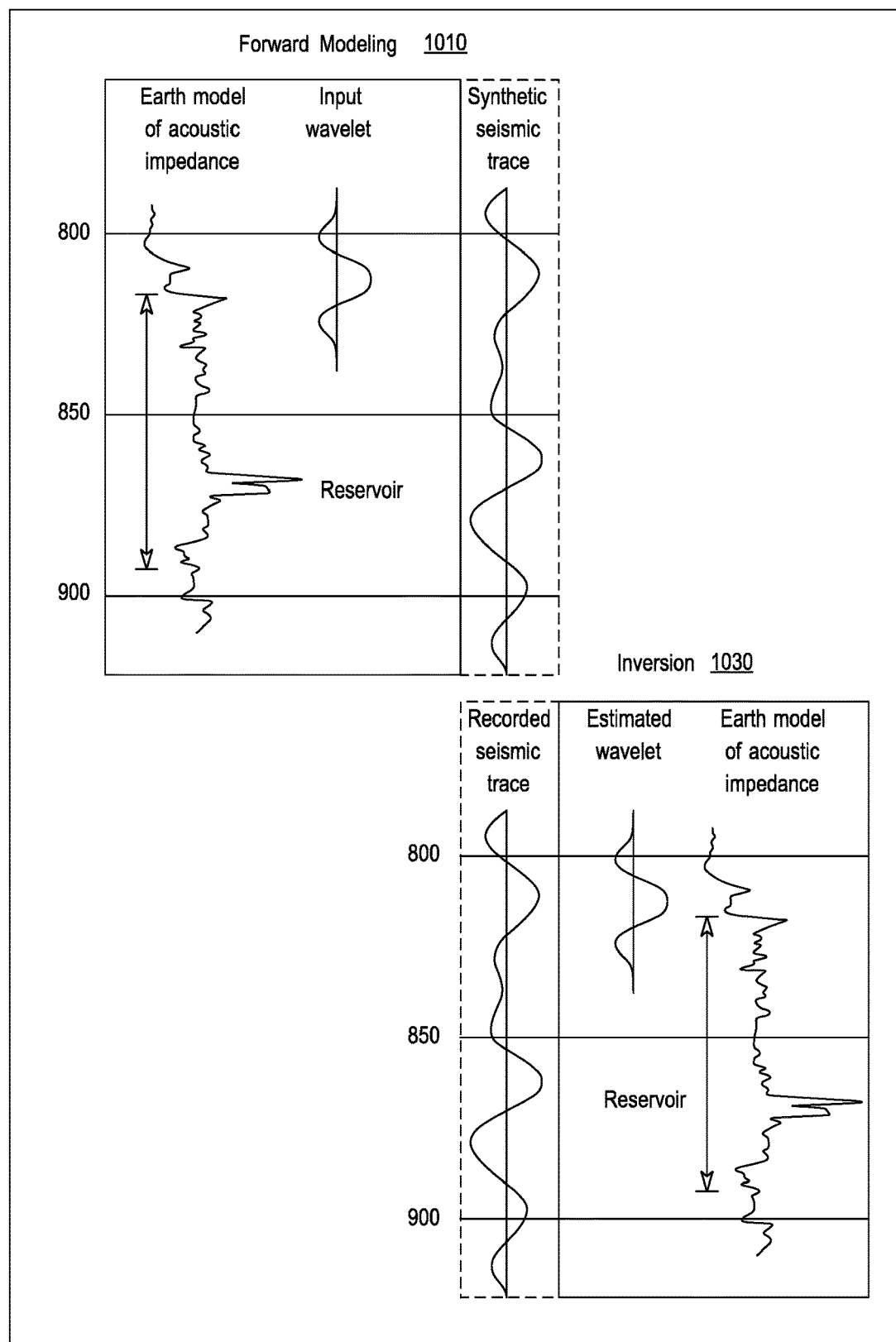
FIG. 10 illustrates an example of forward modeling and an example of inversion.

FIG. 10 shows an example of forward modeling 1010 and an example of inversion 1030 (e.g., an inversion or inverting). As shown, forward modeling 1010 progresses from an earth model of acoustic impedance and an input wavelet to a synthetic seismic trace while inversion 1030 progresses from a recorded seismic trace to an estimated wavelet and an Earth model of acoustic impedance. As an example, forward modeling can take a model of formation properties (e.g., acoustic impedance as may be available from well logs) and combine such information with a seismic wavelength (e.g., a pulse) to output one or more synthetic seismic traces while inversion can commence with a recorded seismic trace, account for effect(s) of an estimated wavelet (e.g., a pulse) to generate values of acoustic impedance for a series of points in time (e.g., depth).

As an example, a method may employ amplitude inversion. For example, an amplitude inversion method may receive arrival times and amplitude of reflected seismic waves at a plurality of reflection points to solve for relative impedances of a formation bounded by the imaged reflectors. Such an approach may be a form of seismic inversion for reservoir characterization, which may assist in generation of models of rock properties.

As an example, an inversion process can commence with forward modeling, for example, to provide a model of layers with estimated formation depths, thicknesses, densities and velocities, which may, for example, be based at least in part on information such as well log information. A model may account for compressional wave velocities and density, which may be used to invert for P-wave, or acoustic, impedance. As an example, a model can account for shear velocities and, for example, solve for S-wave, or elastic, impedance. As an example, a model may be combined with a seismic wavelet (e.g., a pulse) to generate a synthetic seismic trace.

Inversion can aim to generate a "best-fit" model by, for example, iterating between forward modeling and inversion while seeking to minimize differences between a synthetic trace or traces and actual seismic data.

As an example, a method can include seismic amplitude variation with offset and azimuth (AVOAz) or amplitude variation with azimuth (AVAz) inversion. As an example, a framework such as the ISIS inversion framework (Schlumberger Limited, Houston Tex.) may be implemented to perform an inversion. As an example, a framework such as the Linerarized Orthotropic Inversion framework (Schlumberger Limited, Houston, Tex.) may be implemented to perform an inversion. As an example, an inversion may allow for determination of estimates of components of a fracture compliance tensor (see, e.g., U.S. Pat. No. 7,679, 993 "Method of characterizing a fractured reservoir using seismic reflection amplitudes", which is incorporated by reference herein).

As an example, an AVAz inversion framework may provide estimates of P-impedance $I_P$, fast shear impedance $I_{S1}$, slow shear impedance $I_{S2}$, and the fast shear azimuth $\phi_{S1}$. As an example, the aforementioned Linearized Orthotropic Inversion framework may provide for estimates of fracture compliance tensor components. As an example, different AVAz inverted quantities may be used to determine fracture size and orientation at different spatial locations, for example, under an assumption that fractures are substantially vertical.

As natural fractures in reservoirs play a role in determining fluid flow during production, knowledge of the orientation and density of fractures can help to optimize production from naturally fractured reservoirs. As an example, an area of high fracture density can represent a "sweet spot" of high permeability. As an example, a method can help to target such locations, for example, for performing infill drilling of one or more bores, etc.

Natural fractures can be arranged in fracture sets, which can exhibit a particular orientation. Fracture orientation can affect permeability anisotropy in a reservoir. As this leads in turn to anisotropic reservoir drainage, for optimum drainage, producers be more closely spaced along the direction of minimum permeability $k_{min}$ rather than along the direction of maximum permeability $k_{max}$.

Figure 11:
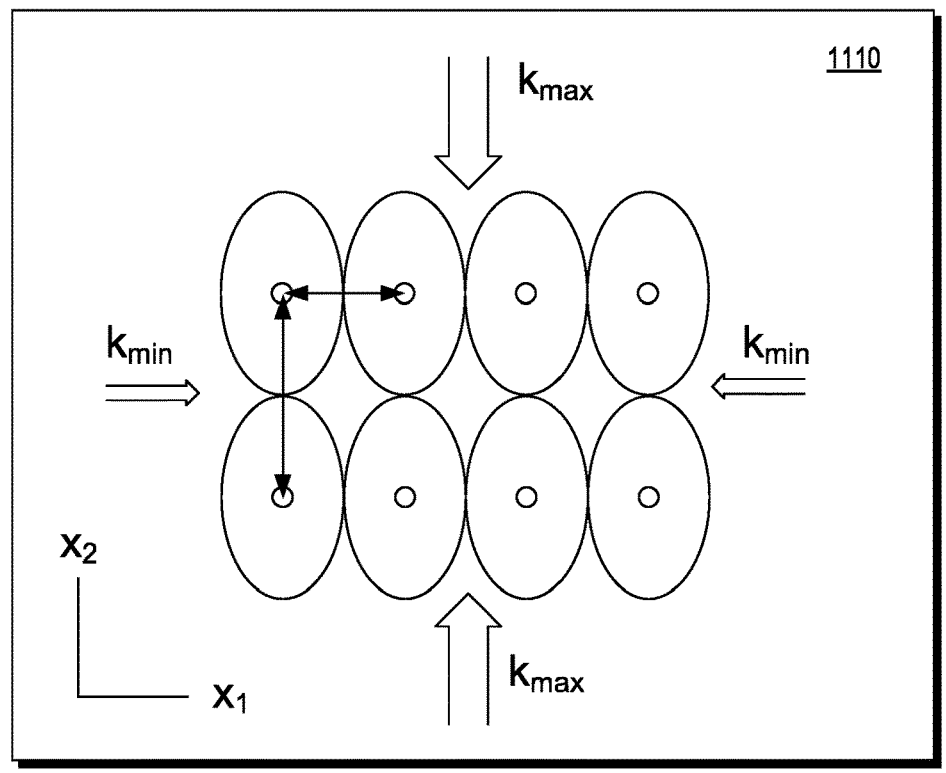
FIG. 11 illustrates examples of permeability with respect to wells or well plans.
Figure 11:
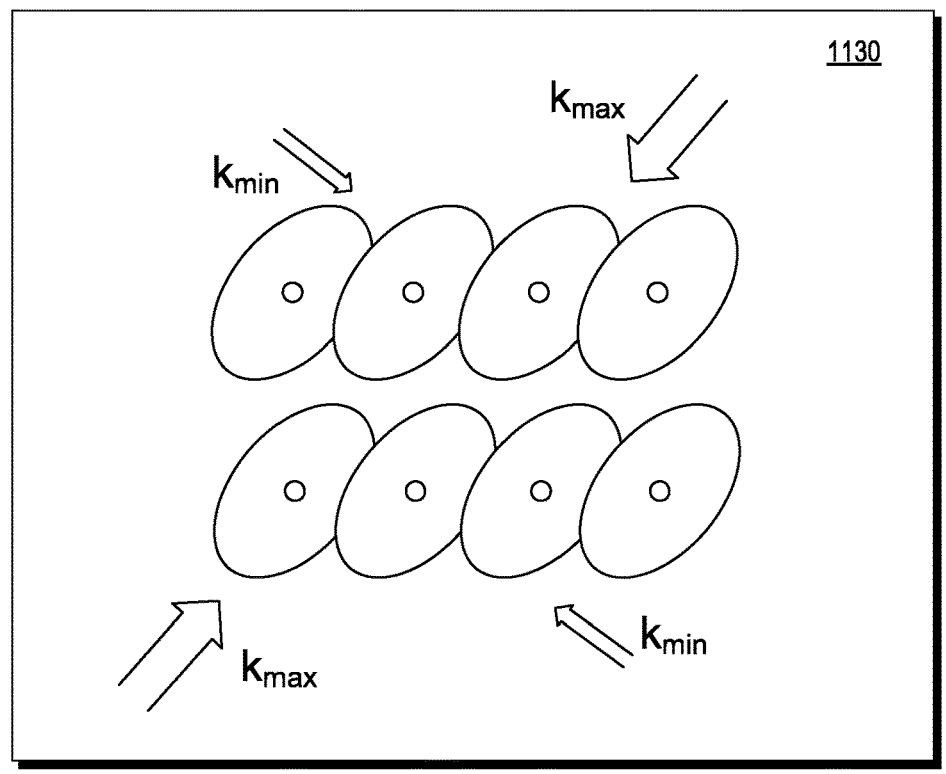

FIG. 11 shows example diagrams 1110 and 1130 that illustrate permeability anisotropy with respect to minimum and maximum permeability ($k_{min}$ and $k_{max}$) and effect on well placement. In FIG. 11, ovals or ellipses, each with a central well, represent approximate boundaries of flow to each corresponding well that may be defined by a major axis and a minor axis of an individual oval or ellipse. As shown, the major axes are oriented substantially along a direction of maximum permeability ($k_{max}$) while the minor axes are oriented substantially along a direction of minimum permeability ($k_{min}$). As shown in FIG. 11, the wells, as producers, can be arranged as a grid that may aim to provide for optimum drainage by more closely spacing the wells along the direction of minimum permeability ($k_{min}$) than along the direction of maximum permeability ($k_{max}$). In the diagram 1110, $x_1$ and $x_2$ correspond to orthogonal directions where well spacing is less along $x_1$ (direction of $k_{min}$) and where well spacing is greater along $x_2$ (direction of $k_{max}$).

As an example, for estimation of permeability anisotropy (e.g., $k_{min}$, $k_{max}$, etc.), a discrete fracture network (DFN) can be provided such that fluid flow can be simulated. As an example, a method can include estimating permeability anisotropy via generating a discrete fracture network (DFN) and providing the DFN, for example, such that fluid flow can be simulated (e.g., using a simulation system that includes one or more processors, memory, etc.).

As an example, a reservoir may be characterized as being unconventional. As an example, the phrase unconventional resource may be utilized as an umbrella phrase for oil and natural gas that is produced using techniques, technologies, etc., that in one or more ways differ from those of so-called conventional production. Unconventional resource characteristics may depend on available exploration and production technologies, economic environment, and scale, frequency and duration of production from the resource. As an example, the phrase unconventional resource may be utilized to reference oil and gas resources whose porosity, permeability, fluid trapping mechanism, or other characteristics differ from conventional sandstone and carbonate reservoirs. As an example, coalbed methane, gas hydrates, shale gas, fractured reservoirs, and tight gas sands can be considered unconventional resources.

Unconventional reservoirs represent a considerable amount of energy resources, examples being organic-rich shales like the Eagle Ford, Bakken, Haynesville, Marcellus, etc. Due to their relatively low permeability, hydraulic fracturing can be performed to increase paths for flow of fluids, which can make production of hydrocarbons from such resources more economical.

Figure 12:
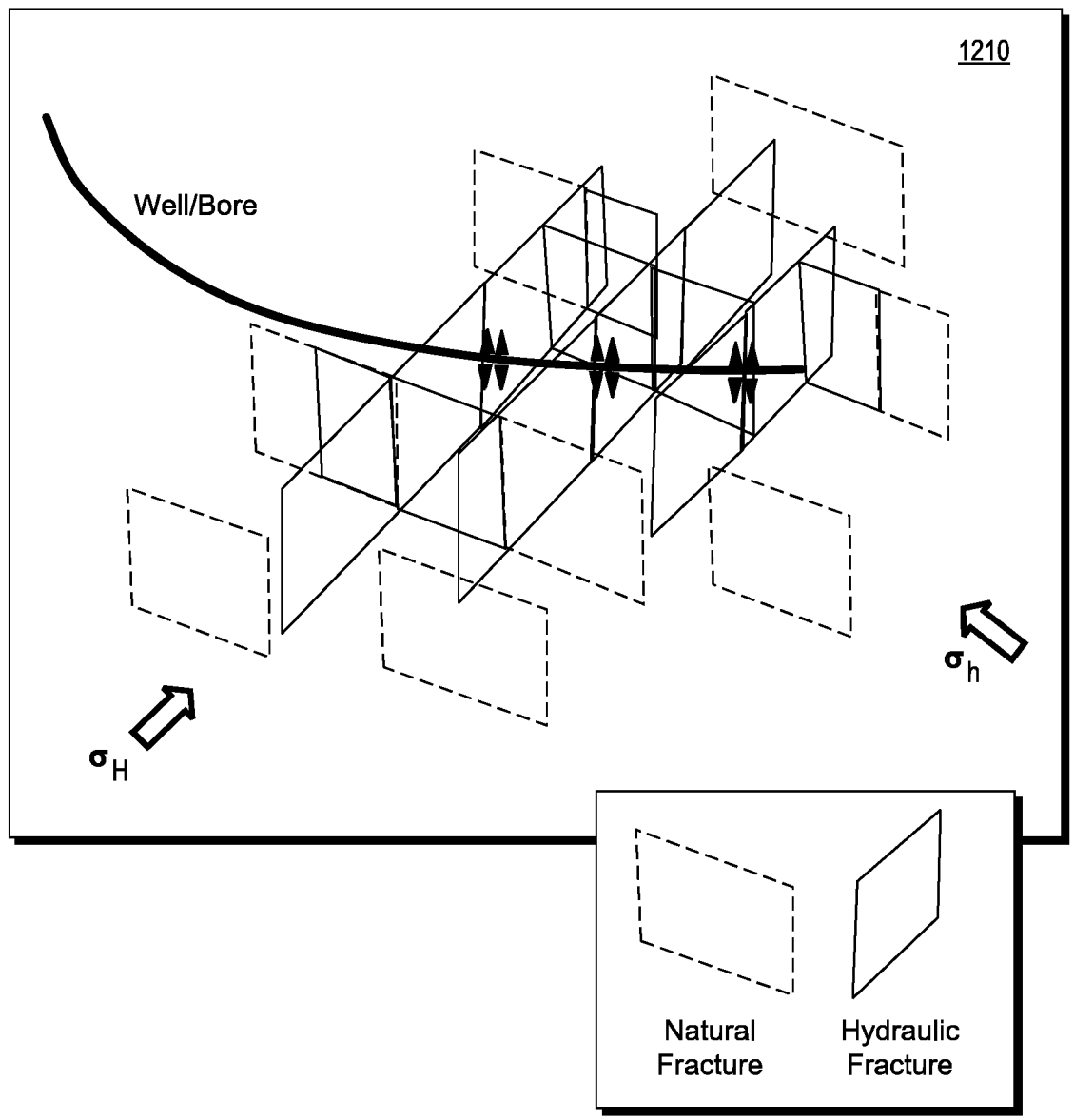
FIG. 12 illustrates example fractures with respect to stresses.

FIG. 12 shows an example of a diagram 1210 that includes natural fractures and hydraulic fractures (e.g., artificial fractures, reactivated natural fractures, etc.). As illustrated, natural fractures can affect the propagation of hydraulic fractures.

As an example, a method may aim to simulate propagation of fractures of a fracture network that can include intersecting fractures. Such a method may aim to satisfy equations governing the underlying physics of the fracturing process. Such can include an equation governing fluid flow in the fracture network, an equation governing fracture deformation, and fracture propagation criterion or criteria. Hydraulic fractures tend to be three-dimensional where fracture planes may not be vertical. For example, consider the case when the initial natural fractures are not vertical, potentially leading to non-vertical hydraulic fractures when the fracturing fluid opens up the natural fractures. However, solving a fully three-dimensional non-planar fracture problem can be computation intensive.

As an example, an assumption may be imposed such that natural and hydraulic fractures are substantially vertical or, for example, generally oriented in a particular direction where some amount of symmetry may exist. For example, where a direction of orientation of fractures can be specified, if substantially vertical, a method may utilize vertical transverse isotropy (VTI); whereas, if not substantially vertical, another type of directional isotropy may be utilized.

VTI or transverse isotropy (TI) includes an axis of rotational symmetry (e.g., vertical or another direction). As an example, for VTI, in layered rocks, properties can be substantially uniform horizontally within a layer, but vary vertically and from layer to layer.

Interactions between a propagating hydraulic fracture and preexisting natural fractures can be modelled, for example, via a hydraulic fracture modeling framework such as, for example, the MANGROVE® framework (Schlumberger Limited, Houston, Tex.). A framework may refer to unconventional fractures and be considered an unconventional fracture modeler (UFM). As an example, a framework may be implemented as a plug-in (e.g., a PETREL® plug-in, an OCEAN® plug-in, etc.) or in another manner.

Figure 13:
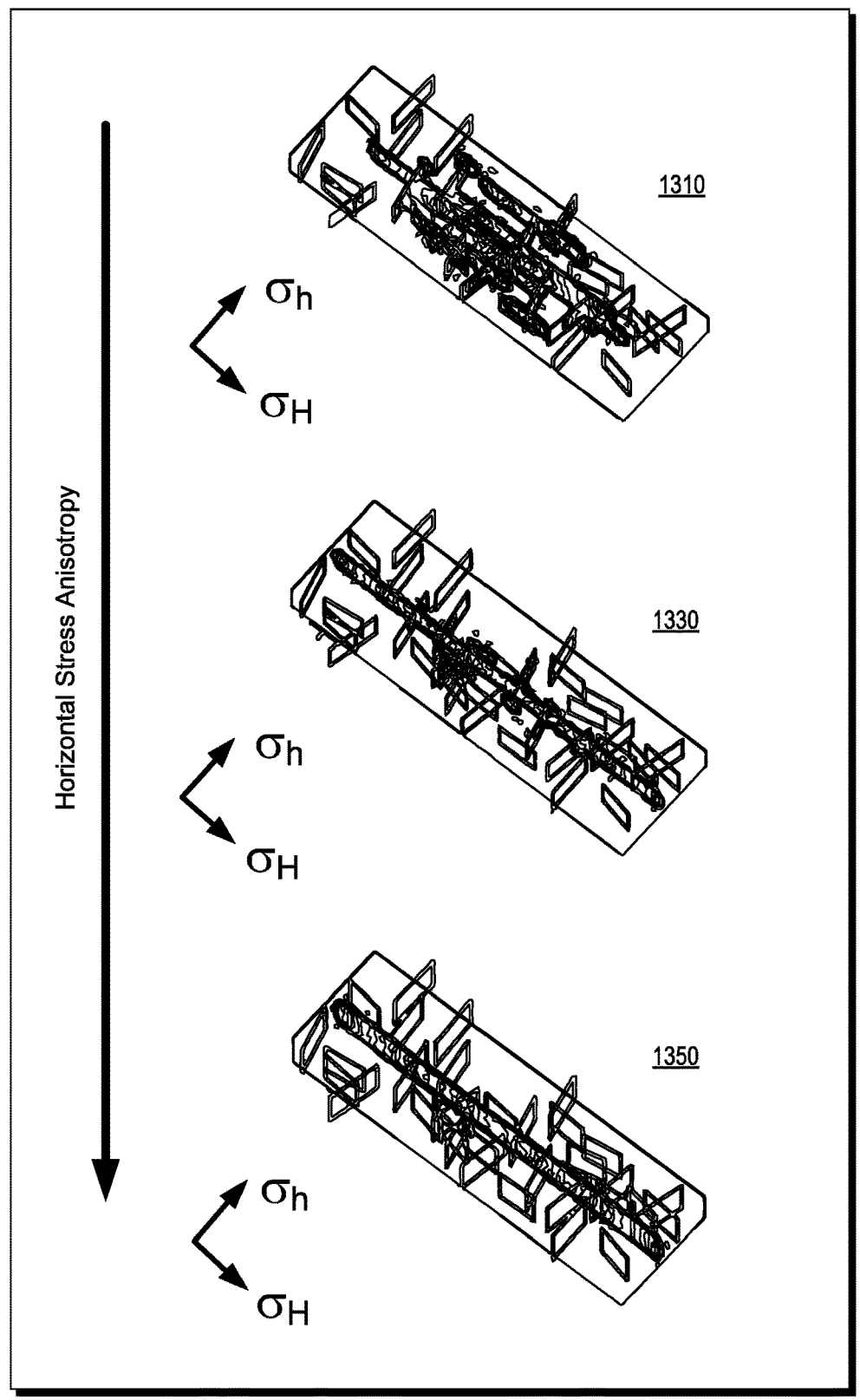
FIG. 13 illustrates an example of a series of plots with respect to increasing stress anisotropy.

FIG. 13 shows a series of plots 1310, 1330 and 1350 of hydraulic fracture propagation in a region with natural fractures, the series corresponding to increasing horizontal stress anisotropy, from 0.1 MPa to 0.5 MPa to 0.7 MPa. In the plots 1310, 1330 and 1350, fluid pressure is illustrated by contours, which generally align along an axial direction as the horizontal stress anisotropy increases. As an example, increasing stress anisotropy can change induced fracture geometry from a complex fracture network to a bi-wing fracture network given a common set of initial natural fractures; noting that decreasing stress anisotropy can change an induced fracture geometry from a bi-wing fracture to a complex fracture network given a common set of initial natural fractures. The plots 1310, 1330 and 1350 of FIG. 13 are generated via an UFM within the MANGROVE® framework plug-in for the PETREL® framework (e.g., and/or OCEAN® framework). The UFM, to produce such results, takes a discrete fracture network (DFN) as an input. Thus, a workflow to perform such modeling can include accessing, receiving and/or generating a DFN.

As an example, a DFN may be generated in a "constrained" manner. For example, seismic data may be used to constrain generation of a DFN. In such an example, seismic data can include AVOAz or AVAz seismic survey data along with inversion of at least a portion of such data to generate property values for a region of a geologic environment (e.g., parameter values of a geologic environment).

As an example, a method can include building a discrete fracture network (DFN) based at least in part on results of seismic amplitude variation with offset and azimuth (AVOAz or AVAz) inversion, which may be used to predict permeability anisotropy of fractured reservoirs and to model hydraulic fracture propagation in unconventional reservoirs.

A method can include building a constrained DFN (e.g., cDFN) using results of seismic amplitude variation with offset and azimuth (AVOAz or AVAz) inversion. A cDFN may be used to compute permeability anisotropy of a reservoir, allowing for more optimal placement of wells within a fractured reservoir, and to model propagation of hydraulic fractures in an unconventional reservoir, enhancing optimization of hydraulic fracture design.

As an example, an inversion framework may be implemented to allow for estimates of components of a fracture compliance tensor. As an example, components of the fracture compliance tensor can be used to determine fracture size and orientation at different spatial locations, allowing the construction of a cDFN.

Figure 14:
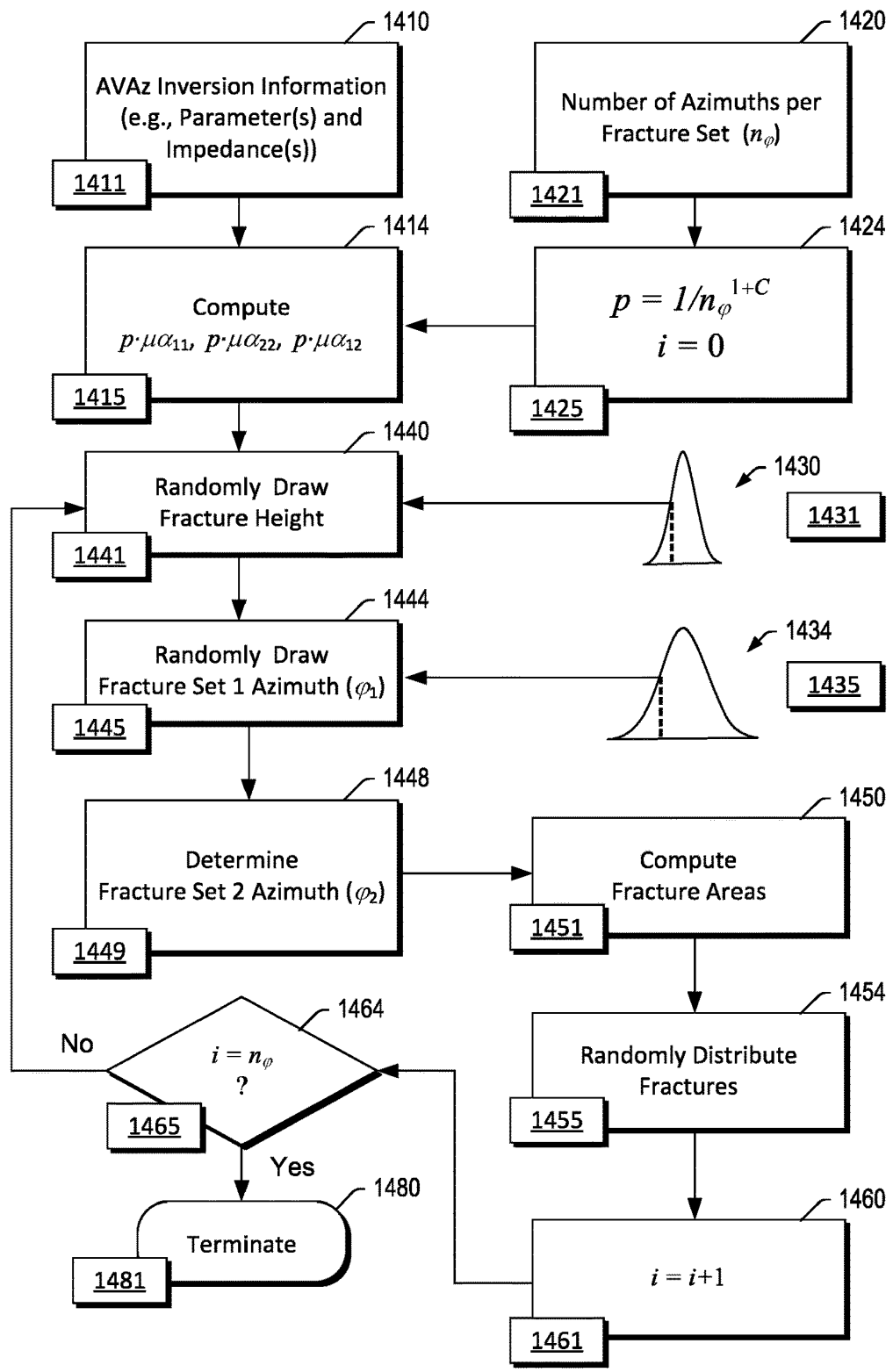
FIG. 14 illustrates an example of a method.

FIG. 14 shows an example of a method 1400 that includes a provision block 1410 for providing AVAz inversion information (e.g., inverted parameter value(s), impedance(s), etc.), a compute block 1414 for computing various values where a parameter may specify a number of azimuths per fracture set, a selection block 1440 for selecting a fracture height (e.g., optionally randomly from a Gaussian or other distribution 1430), a selection block 1444 for selecting a fracture set azimuth (e.g., optionally randomly from a Gaussian or other distribution 1434), a determination block 1448 for determining an azimuth for another, different fracture set, a compute block 1450 for computing fracture areas, a distribution block 1454 for distributing fractures within a region of a geologic environment (e.g., optionally randomly within a model of a region of geologic environment), an iteration block 1460 for optionally iterating to account for another azimuth per fracture set, a decision block 1464 for deciding whether to iterate and a termination block 1480 for terminating the method 1400.

As shown, a selection block 1420 can include selecting a number of azimuths for one or more fracture sets and a computation block 1424 can include computing one or more parameter values based at least in part on a selected number of azimuths. As mentioned, such a parameter may be utilized in one or more equations of the compute block 1414. As shown, the block 1424 can include computing a value for the parameter p, which may be utilized by the compute block 1414. The value of the parameter p can depend on a number of azimuths selected for a fracture set or fracture sets, which may depend on another parameter C, which may have a value determined via experiment, etc.

As an example, one or more inversions of seismic data may provide P-Impedance values (P-wave impedance values) and/or S-Impedance values (S-wave impedance values). As an example, one or more inversions may provide one or more azimuthal attributes.

As an example, one or more of the following equations may be utilized in the compute block 1414, denoted below as (A), (B) and (C) (e.g., and further below, given as Equations 7, 13 and 15, respectively):

$$a'_{11} \equiv \mu\alpha'_{11} \equiv \frac{I_{Sb}^2}{I_{S2}^2} - 1 \tag{A}$$

$$a'_{22} \equiv \mu\alpha'_{22} \equiv \frac{I_{Sb}^2}{I_{S1}^2} - 1$$

$$a'_{11} \equiv \mu\alpha'_{11} \approx \frac{(1-v)(1-2v)}{4v^2}\left(1 - \left(\frac{I_P}{\rho V_P}\right)^2\right) + \frac{I_{S1}^2 - I_{S2}^2}{2(I_{S1}^2 - I_{S2}^2)} \tag{B}$$

$$a'_{22} \equiv \mu\alpha'_{22} \approx \frac{(1-v)(1-2v)}{4v^2}\left(1 - \left(\frac{I_P}{\rho V_P}\right)^2\right) - \frac{I_{S1}^2 - I_{S2}^2}{2(I_{S1}^2 - I_{S2}^2)}$$

$$a_{11} \equiv \mu\alpha_{11} \approx 2\left(1 - \frac{I_S}{I_{S_b}}\right) + \frac{1}{2}\left(\frac{1-v}{1-4v}\right)(\Gamma_x - \Gamma_y) \tag{C}$$

$$a_{22} \equiv \mu\alpha_{22} \approx 2\left(1 - \frac{I_S}{I_{S_b}}\right) - \frac{1}{2}\left(\frac{1-v}{1-4v}\right)(\Gamma_x - \Gamma_y)$$

As to the compute block 1414, equations utilized can depend on particulars of an inversion or inversions. For example, the dimensionless products $a_{11}$ and $a_{22}$ may be computed via equation A for an inversion that provides S-impedance values, equation B for an inversion that provides P-impedance values and equation C for values of a linearized orthotropic inversion. In the foregoing equations, $\mu$ is the shear modulus, which may be computed individually using, for example, velocity or impedance.

In equation C, above, the parameters $\Gamma_x$ and $\Gamma_y$ determine an AVO (Amplitude Variation with Offset) gradient (e.g., a coefficient of the $\sin^2 \theta$ term in an expression for PP reflection coefficient, see, e.g., $R_{PP}$ and equations below) in the two principal azimuthal directions. These can be, for example, parallel and perpendicular to fractures, for example, if there were a single set of vertical fractures. A quantity determined via $\Gamma_x - \Gamma_y$ can determine the azimuthal anisotropy, for example, at small to moderate offsets.

As an example, the parameters $\Gamma_x$ and $\Gamma_y$ may be determined via equations as follows:

$$R_{pp}(\phi, \theta) = R_{PP}^{iso} + R_{PP}^{Aniso}$$

$$R_{PP}^{iso} = A + b_1 \sin^2\theta + b_2 \sin^2\theta \tan^2\theta; \phi = \phi_s \phi_{sym}$$

$$A = \frac{1}{2}\frac{\Delta I_P}{I_P}; b_1 = \frac{1}{2}\left(\frac{\Delta\alpha}{\alpha} - 4\left(\frac{\beta}{\alpha}\right)^2\frac{\Delta G}{G}\right); b_2 = \frac{1}{2}\frac{\Delta\alpha}{\alpha}; I_P = \alpha\rho; G = \rho\beta^2$$

$$R_{PP}^{Aniso} = [b_3\cos^2\phi + b_4\sin^2\phi]\sin^2\theta +$$

$$[b_5\cos^4\phi + b_6\sin^4\phi + b_7\cos^2\phi\sin^2\phi]\sin^2\theta\tan^2\theta$$

$$b_3 \equiv \Gamma_x = \left(\Delta\delta_x \ 8\left(\frac{\beta^2}{\alpha^2}\right)\Delta\gamma_x\right), b_4 \equiv \Gamma_y = \left(\Delta\delta_y \ 8\left(\frac{\beta^2}{\alpha^2}\right)\Delta\gamma_y\right)$$

$$b_5 = \frac{\Delta\varepsilon_x}{2}; b_6 = \frac{\Delta\varepsilon_y}{2}; b_6 = \frac{\Delta\delta_z}{2}$$

The foregoing equations, which provides examples of $\Gamma_x$ and $\Gamma_y$, appears in Bachrach et al., "Recent Advances in the Characterization of Unconventional Reservoirs with Wide-Azimuth Seismic Data", SPE-168764-MS, Unconventional Resources Technology Conference, 12-14 August, Denver, Colo., USA (2013), which is incorporated by reference herein.

As an example, a method can include receiving inversion attributes from an inversion technique. For example, cubes of P-impedance, S-impedance and anisotropic parameters such as, for example, of $\Gamma_x$ and $\Gamma_y$, can be inversion attributes. As an example, attributes can include first-order inversion attributes (e.g., first-order in that they may vary with angle of incidence $\theta$ as $\sin^2 \theta$). As an example, attributes can include second-order anisotropic attributes (e.g., second-order in that they may vary with angle of incidence $\theta$ as $\sin^2 \theta \tan^2 \theta$), for example, consider $\varepsilon_x$, $\varepsilon_y$ and density. As an example, anisotropy may be azimuthal anisotropy. As an example, an inversion may provide values for anisotropic impedance attributes. As an example, an inversion may provide values for elastic attributes. As an example, values generated from an inversion may be attribute values for one or more attributes. As an example, such attributes may be referred to as "inversion attributes". As an example, an attribute may be an AVAz attribute (e.g., an AVAz inversion attribute).

In the example of FIG. 14, one or more of the distributions 1430 and 1434 may be provided as an input. As an example, a distribution may be distributed about a mean value (e.g., a peak). A random selection process may select a value to one side or to another side of a distribution's mean value.

The method 1400 is shown in FIG. 14 in association with various computer-readable media (CRM) 1411, 1415, 1421, 1425, 1431, 1435, 1441, 1445, 1449, 1451, 1455, 1461, 1465, and 1481. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 1400. As an example, a computer-readable medium (CRM) may be a computer-readable storage medium that is non-transitory and that is not a carrier wave.

Figure 15:
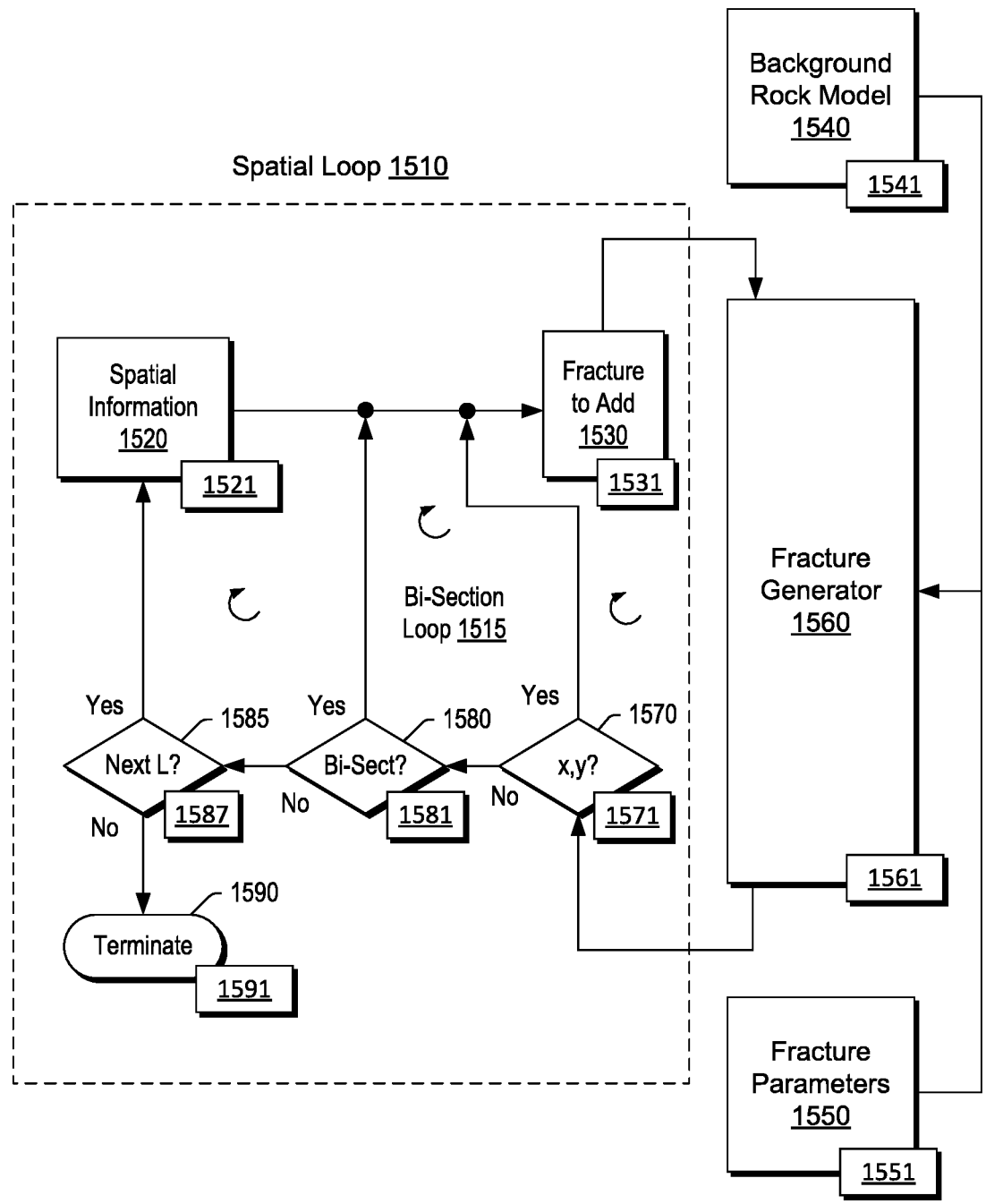
FIG. 15 illustrates an example of a method.

FIG. 15 shows an example of a method 1500 that includes a spatial loop 1510 (e.g., a multi-scale loop) that includes a bi-section loop 1515, a spatial information block 1520, a fracture addition block 1530, a background rock model block 1540, a fracture parameters block 1550, a fracture generator block 1560, an intra-level decision block 1570, a bi-section decision block 1580, a level decision block 1585 and a termination block 1590.

In the example method 1500 of FIG. 15, the spatial loop 1510 may operate on a level by level basis where a level, L, may correspond to depth in a geologic environment (e.g., z). In such an example, seismic data (e.g., optionally seismic attribute data, etc.) can be available for a series of individual levels. As an example, the fracture generator block 1560 can generate fractures for a particular level for one or more fracture sets and the spatial loop 1510 can increment to a next level.

Within the spatial loop 1510, the method 1500 includes the intra-level decision block 1570, which itself may form part of a loop (e.g., an intra-level loop at a particular scale). The intra-level decision block 1570 may operate for a level at a particular scale as may be determined by the bi-section loop 1515. In the example of FIG. 15, the intra-level decision block 1570 is shown as including x and y, noting that such dimensions may correspond to a selected coordinate system (e.g., r, $\Theta$, etc. in a cylindrical coordinate system, etc.).

Within the spatial loop 1510, the method 1500 includes the bi-section loop 1515 where, for example, the bi-section decision block 1580 can decide whether to subdivide a level, which can correspond to a super-voxel.

As an example, where a region of interest is a three-dimensional region in x, y and z dimensions of a Cartesian coordinate system, the spatial loop 1510 can include an x-loop, a y-loop and a z-loop where, for example, the z-loop can be a depth loop that aims to increment depth in a level by level manner. In such an example, a level may be a super-voxel that includes voxels defined by x and y dimensions. In such an example, the bi-section loop 1515 can include subdividing the super-voxel into sub-regions (e.g., successively from super-voxels to individual voxels) for further fracture generation per the fracture generator block 1560. In the example of FIG. 15, the intra-level decision block 1570 can process portions of individual sub-regions until a decision is made by the bi-section decision block 1580 to perform bi-section (e.g., subdivision) or to proceed to the level decision block 1585, which may increment to another level or terminate the spatial loop 1510 per the termination block 1590.

As an example, the fracture generator block 1560 can optionally handle more than one fracture set at a given level. For example, the fracture generator block 1560 may handle a number of fracture sets, which may be from 1 to about five; noting that about three may provide sufficient information.

In the method 1500, the fracture generator block 1560 can include various blocks of the method 1400 of FIG. 14. In the method 1500, the spatial loop 1510 can allow for a scaled approach to a region where the region may be defined, for example, via a super-voxel that can be subdivided into sub-regions. For example, data may exist in the form of an array, which may be a multidimensional array such as, for example, a volume array (e.g., a cube array). As an example, data may exist as volume data where the volume is defined by elements that may be considered to be voxels (e.g., volume elements). In such an example, a super-voxel can include a plurality of voxels. In such an example, the spatial loop 1510 can handle a super-voxel and progress from that super-voxel to smaller scale groupings of voxels and optionally to a scale of single voxels. Where such a loop handles a grouping of voxels, the grouping may be referred to as a super-voxel as it includes more than one voxel. Thus, a loop can progress from a super-voxel to a smaller scale super-voxel and optionally to a single voxel in scale. In the example of FIG. 15, the bi-section loop 1515 performs operations to progress from a super-voxel to a smaller scale super-voxel and optionally to single voxel in scale.

As shown in the example of FIG. 15, the fracture generator 1560 can generate fractures in a manner that depends on input from the fracture addition block 1530, the background rock model block 1540 and the fracture parameter block 1550. As an example, output from the fracture generator block 1560 can be directed to the spatial loop 1510, for example, to determine via the decision block 1580 whether to add another fracture per the fracture addition block 1530 or to terminate via the termination block 1590. As shown, the intra-level decision block 1570 can receive output from the fracture generator block 1560 and provide output to the decision block 1580 or to the fracture addition block 1530. As an example, where a super-voxel is processed from a large scale to a small scale, the level decision block 1585 may determine when to terminate such processing. For example, where a number of scales have been processed for a desired number of levels, the fracture generator block 1560 may have generated a desired number of fractures for the levels such that the method 1500 can be terminated per the termination block 1590.

The method 1500 is shown in FIG. 15 in association with various computer-readable media (CRM) 1521, 1531, 1541, 1551, 1561, 1571, 1581, 1587 and 1591. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 1500. As an example, a computer-readable medium (CRM) may be a computer-readable storage medium that is non-transitory and that is not a carrier wave.

In the example of FIG. 15, the method 1500 can include receiving constraints, for example, the background rock model block 1540 and/or the fracture parameters block 1550 can provide constraints where the fracture generator block 1560 can receive and operate based at least in part on such received constraints. As an example, the fracture addition block 1530 may be considered to be a constraint provider such that the fracture generator block 1560 can receive information germane to addition of one or more fractures. As an example, one or more constraints may be based at least in part on information such as, for example, information from one or more of outcrop images, cores, borehole image logs, satellite imagery, etc.

As an example, a scaled approach can include bi-section. For example, a method can include iterative bi-section where a large scale region is subjected iteratively to bi-section to define sub-regions, where a sub-region may be selected for processing or, for example, where sub-regions may be selected for processing (e.g., in parallel). As an example, a bi-section algorithm may optionally perform a front-end bi-section of a region to generate a plurality of sub-regions that may be suitable for processing using parallel computing. For example, parallel computing may be utilized for two or more sub-regions. As to bi-section, as an example, a number of sub-regions may be generated as a geometric series (e.g., 2, 4, 8, 16, 32, etc.).

As an example, an iterative bi-section approach can commence via definition of a single super-voxel that includes a desired fractured area of interest at a particular depth level. In such an example, a DFN generated within the super-voxel can effectively determines an overall connectivity (e.g., a backbone) of a composite fracture network that is obtained. As an example, a single super-voxel can be then split about its centroid into 4 smaller super-voxels (e.g., equal or differing in size) and a DFN can be generated within each smaller super-voxel. Such a bi-section process can be repeated, splitting each smaller super-voxel into 4 smaller super-voxels and generating a DFN in each one, until no further bi-section is desired or possible (e.g., where the level of a single voxel is reached, as may correspond to a voxel of a seismic data volume, a seismic attribute volume, etc.). In a bi-section approach, a DFN at a current depth level can then be complete and the bi-section algorithm can advance to a next depth level.

While the foregoing approach refers to bi-section, one or more types of sectioning may be utilized where sectioning commences at a large scale and proceeds to a smaller scale, which may be as small as, for example, a single volume element of a data set or data sets. As an example, where data for a region are in the form of a seismic volume (e.g., volumetric seismic data), which may be a so-called seismic cube, sectioning may proceed to the level of an individual datum element. While seismic volume and seismic cube are mentioned, such data structures may be in a suitable form for storage, retrieval, etc. As an example, seismic data may be processed seismic data and may optionally be seismic attribute data, which are data based at least in part on seismic measurements acquired in a geologic environment.

As an example, a method can include sectioning and fracture generation where such sectioning can be performed in a loop with fracture generation or, for example, where sectioning may proceed to a certain level followed by fracture generation, which may optionally be performed at least in part in parallel (e.g., via parallel computing).

As an example, fractures can be added to a super-voxel via a method that can be implemented via a fracture generator, for example, consider the fracture generator block 1560 of FIG. 15.

As an example, a valid seismic voxel (e.g., having a non-zero facies flag, not filled to capacity with fractures as may be determined based at least in part on results of an AVAz inversion, etc.) and a random origin point within the valid seismic voxel can be selected. In such an example, a random azimuth can be generated for a first fracture set. Next, an azimuth of a second fracture set and a total fracture length for the first and second sets can then be determined. As an example, the total fracture length can be randomly subdivided into shorter lengths, subject to a specified maximum for a corresponding set. In such an example, fractures can be permitted to extend outside the voxel in which they originate, but not outside a super-voxel for which that voxel is a member thereof. To establish a length, an individual fracture can be traced from its origin, voxel by voxel, to its endpoint. If along the way (e.g., a fracture path), a voxel is encountered that is non-fractured, or filled to capacity, the fracture is truncated at the boundary of that voxel. Contributions of the fracture to coefficients $a_{11}$, $a_{22}$ and $a_{12}$ (e.g., or $\alpha_{11}$, $\alpha_{22}$ and $\alpha_{12}$) can then be determined for one or more voxels intersected. For example, starting at the origin point, an intersected voxel can be checked in sequence to determine if adding the fracture would cause the sum of previous fracture contributions to exceed desired target values obtained via AVAz inversion results. If the instance that the sum is exceeded, the fracture can be truncated at that voxel boundary. Once a proper length of the fracture has been established, its contributions to coefficients $\alpha_{ij}$ can be recomputed and added to the sums for the one or more remaining voxels. Such a method may be then repeated in a different voxel. Such a process can continue until no more fractures can be added.

Figure 16:
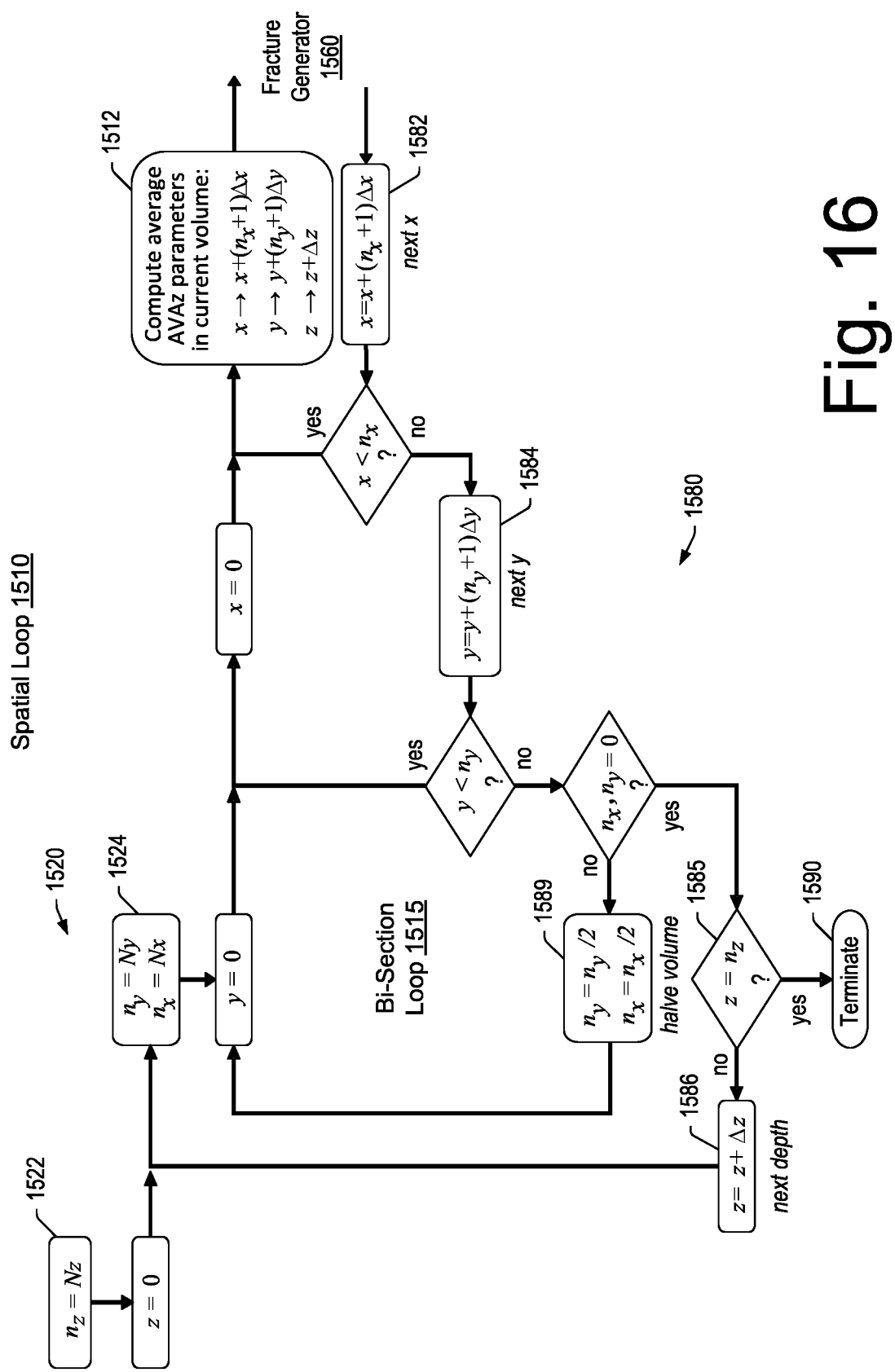
FIG. 16 illustrates an example of a portion of the method of FIG. 15.

FIG. 16 shows an example of the spatial loop 1510 of the method 1500 of FIG. 15 that includes a computation block 1512 and index blocks 1582, 1584 and 1586 where the computation block 1512 can transmit information to the fracture generator block 1560 and where the fracture generator block 1560 can transmit information to the index block 1582; noting that such a block can be for a particular dimension in a coordinate system where the other index blocks 1584 and 1586 correspond to other dimensions in the coordinate system as part of decision logic, for example, per the decision block 1580.

The spatial loop 1510 shown in FIG. 16 also includes the bi-section loop 1515 where a division block 1589 can act to divide spatial indexes (see, e.g., $n_z$ and $n_y$ and $n_x$); noting that the spatial indexes can be used in multiplication with increment dimensions (e.g., $\Delta x$, $\Delta y$ and $\Delta z$). Thus, when a spatial index is halved and used as a multiplier for an increment dimension, the resulting dimension is halved (e.g., bisected).

As shown in the example of FIG. 16, the spatial information block 1520 can be in the form of one or more blocks such as, for example, the blocks 1522 and 1524, which provide parameter settings for dimensions (see, e.g., $n_z$ and $n_y$ and $n_x$); noting that such information can include corresponding increments such as $\Delta x$, $\Delta y$ and $\Delta z$. Such information may be considered to be spatial information sufficient to perform computations per the computation block 1512 for addition of fractures per the fracture addition block 1530 of FIG. 15. As an example, the computation block 1512 may be part of the fracture addition block 1530.

As shown in the example of FIG. 16, various decision blocks 1580 can decide whether to proceed to call for additional fractures to be generated by the fracture generator block 1560 or to terminate the spatial loop 1510 per the termination block 1590. Where a decision is made by the decision block 1585 not to terminate, a next depth may be selected (e.g., increment to another depth level) per the index block 1586 where depth may be specified by the dimension z in a Cartesian coordinate system. As an example, a method may be implemented in a Cartesian coordinate system or another type of coordinate system. For example, consider a cylindrical coordinate system. As an example, a data set (e.g., seismic volume, etc.) may be organized with respect to a type of coordinate system (e.g., Cartesian, cylindrical, spherical, etc.) and data therein may be utilized directly or via transformation to a coordinate system of a spatial loop.

In the example of FIG. 16, the spatial loop 1510 can operate for a selected number of fracture sets. For example, a number of fracture sets, m, may correspond to an index, j. For example, m may be a number from 1 to about five; noting that about three fracture sets may provide a sufficient amount of information for a discrete fracture network (DFN). As an example, the fracture generator block 1560 can include the index j for handling fracture generation per fracture set and incrementing to the desired number of fracture sets m. Once the desired number of fracture sets has been handled by the fracture generator block 1560, a call may be made to the spatial loop 1510.

Figure 17:
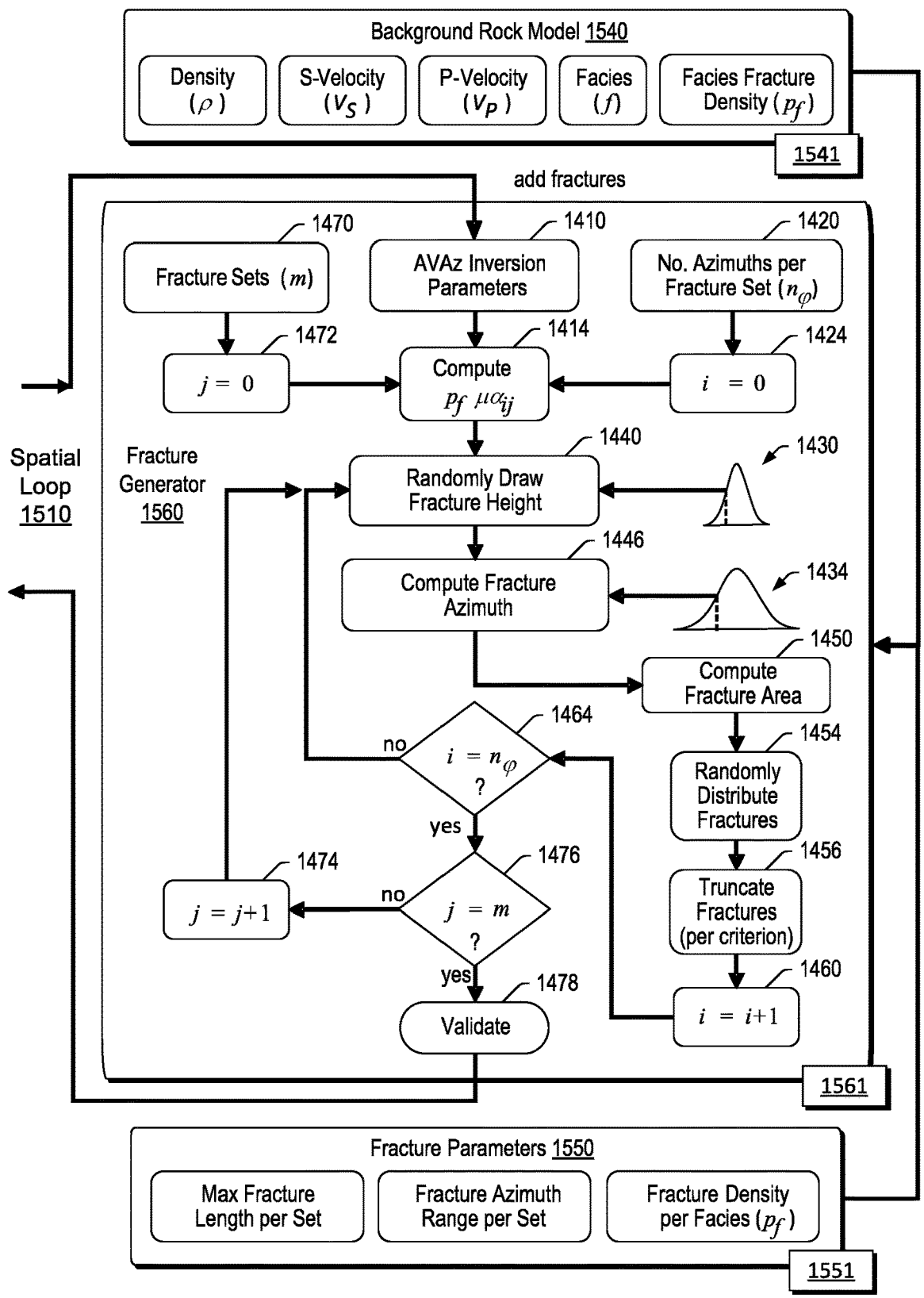
FIG. 17 illustrates an example of a portion of the method of FIG. 15.

FIG. 17 shows an example of the background rock model block 1540, the fracture parameters block 1550 and the fracture generator block 1560 as operatively coupled to the spatial loop 1510, for example, as shown in FIG. 16.

The example fracture generator block 1560 of FIG. 17 includes various blocks of the method 1400 of FIG. 14, which are labeled with corresponding labels as in FIG. 14. In FIG. 17, also shown are a compute fracture azimuth block 1446, a truncate fracture(s) block 1456, and various blocks 1470, 1474, 1476 and 1478 as associated with handling of fracture sets, m, via an index, j.

As shown in FIG. 17, the first fracture set may be associated with an index value of j=0 where the index can be incremented in the decision block 1476. Once j=m, per the decision block 1476, the fracture generator block 1560 can proceed to the validation block 1478 and then to the spatial loop 1510.

As an example, a bi-section approach may generate fractures for a region of interest where the fractures form a discrete fracture network (DFN). In such an example, the DFN may exhibit some amount of fractal character. For example, at different scales, fractures may appear to exhibit some common characteristics. Such common characteristics may be akin to those of natural fractures in some types of geologic environments (e.g., depending on history, stresses, facies, etc.).

As an example, an initial super-voxel may be a layer that includes about 8 to about 600 elements (e.g., voxels). In such an example, the thickness of the layer may be a single element. For example, consider x-y voxels numbering from about 8 to about 600 each being of a single z voxel thickness (e.g., depth).

As an example, a division technique may utilize a centroid or a biased centroid. As an example, division may be odd number division or even number division.

As an example, a lower limit or minimum length for fractures may be associated with a change or amount adding to a new $a_{ij}$ (e.g., or $\alpha_{ij}$) being less than a certain value such that a process is considered to have meaningfully accounted for an appropriate amount of fractures. In other words, a fracture can be considered to be meaningful where it contributes to a sum of $a_{ij}$ (e.g., or $\alpha_{ij}$).

As an example, a minimum voxel size may correspond to a voxel size that is no smaller than a dominant fracture length, which may be, for example, that of a length scale that is most prominent in a histogram.

As an example, various types of information may be utilized for generating fractures. For example, information from a geologist that has studied an outcrop, an image in a bore, etc. may be utilized in addition to seismic information where one or more constraints may be based at least in part on such information.

As an example, a flow simulation model that can receive a DFN generated via a method such as the method 1400 of FIG. 14, the method 1500 of FIG. 15, etc., may include voxels of a size of about 50 m by 50 m by 10 m, which may be suitable for capturing fluid phenomena via simulation (e.g., fluid phenomena associated with a reservoir).

As an example, in a workflow, a DFN may be generated as an intermediate product that can be upscaled (e.g., by a reservoir engineer) for use in a flow simulation model that can be used in a simulator to simulate fluid flow where such fluid flow can account for the presence of fractures of the DFN.

As an example, where levels correspond to depths and where a level is a super-voxel, for a Cartesian 3D grid (e.g., corresponding to a seismic volume) a number of levels within a region of interest (e.g., a reservoir region) may be about 50 m in depth and, for example, a number of levels may be about 5 such that an individual super-voxel is about 10 m in thickness (e.g., depth) and such that a spatial loop can include about 5 iterations where each iteration generates a DFN for a corresponding level and where, for example, each DFN may optionally include more than one fracture set.

As an example, a method can include receiving facies information and generating fractures based at least in part on such information where such facies information may optionally be utilized in a spatial loop that is operatively coupled to a fracture generation method. As an example, a region can include different facies, which can be different types of rock with corresponding rock physics that can determine fracturability thereof. For example, some types of rock may be more readily fractured than other types of rock.

As an example, facies may be accounted for via a multiplier, for example, as a fraction that can be multiplied by $a_{ij}$ (e.g., or $\alpha_{ij}$) where the fraction may be a value, for example, bound by 0 and 1. In such an example, consider limestone and dolomite where part of a level is limestone and part of the level is dolomite and where the fraction can indicate an amount of a particular facies where a sum of facies fractions is to equal unity. As an example, a method may include a separate loop for handling a type of rock.

As to a maximum fracture length for a fracture set, such a value may be specified based on one or more types of information. For example, where facies information is known, such information may be associated with an expected or estimated fracture length due to physics of such rock. As an example, information as to flow simulation may indicate a fluid communication distance (e.g., between a producer and an injector, etc.) which may correspond to an approximate fracture length that may be deemed to be a maximum fracture length or that may be utilized to determine a maximum fracture length.

As an example, as to one or more constraints, a workflow can be iterative. For example, a DFN can be generated based on information associated with a region of interest, fluid flow can be simulated using the DFN for the region of interest and results thereof compared to actual fluid flow information (e.g., flow measurements) for the region of interest. In such an example, differences and/or similarities in fluid flow between the simulation and the actual information may be utilized to adjust one or more constraints followed by generation of an adjusted DFN, etc.

Figure 18:
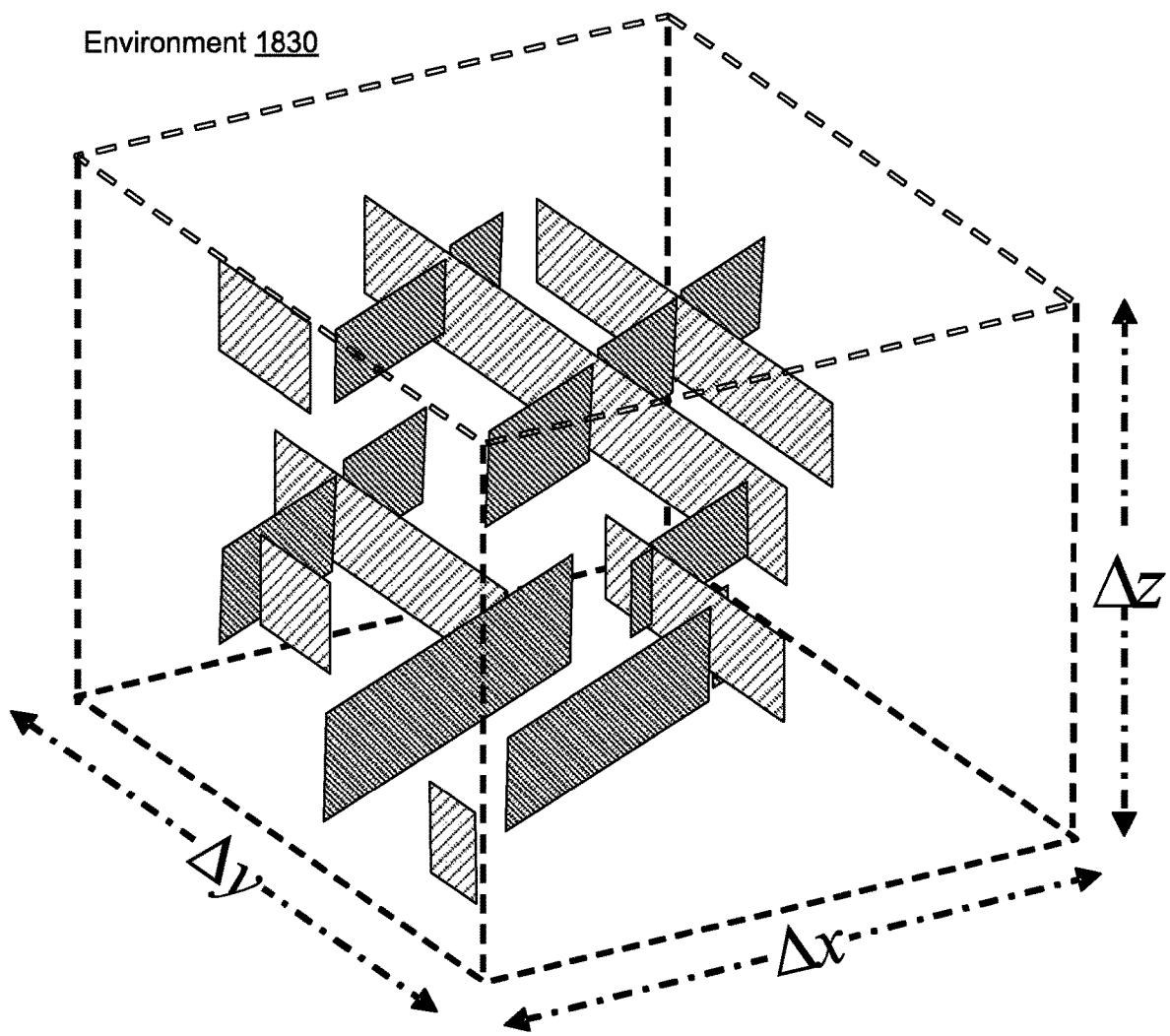
FIG. 18 illustrates an example of an equation and an example of fractures in a three-dimensional region.

FIG. 18 shows an example of an equation 1810 and examples of natural and hydraulic fractures in a three-dimensional geologic environment 1830 where the fractures are substantially directed along a z-direction (e.g., in an x, y, z Cartesian coordinate system), which may be considered to be a vertical direction. As to the computation block 1414 of the method 1400 for computing various values, where a parameter p may be based at least in part on a specified number of azimuths per fracture set, $n_{100}$, values can include values for a parameter $\alpha_{ij}$ with indexes (i,j), which take values of 1 and 2. For example, consider $\alpha_{11}$, $\alpha_{22}$ and, for example, optionally $\alpha_{22}$.

Figure 19:
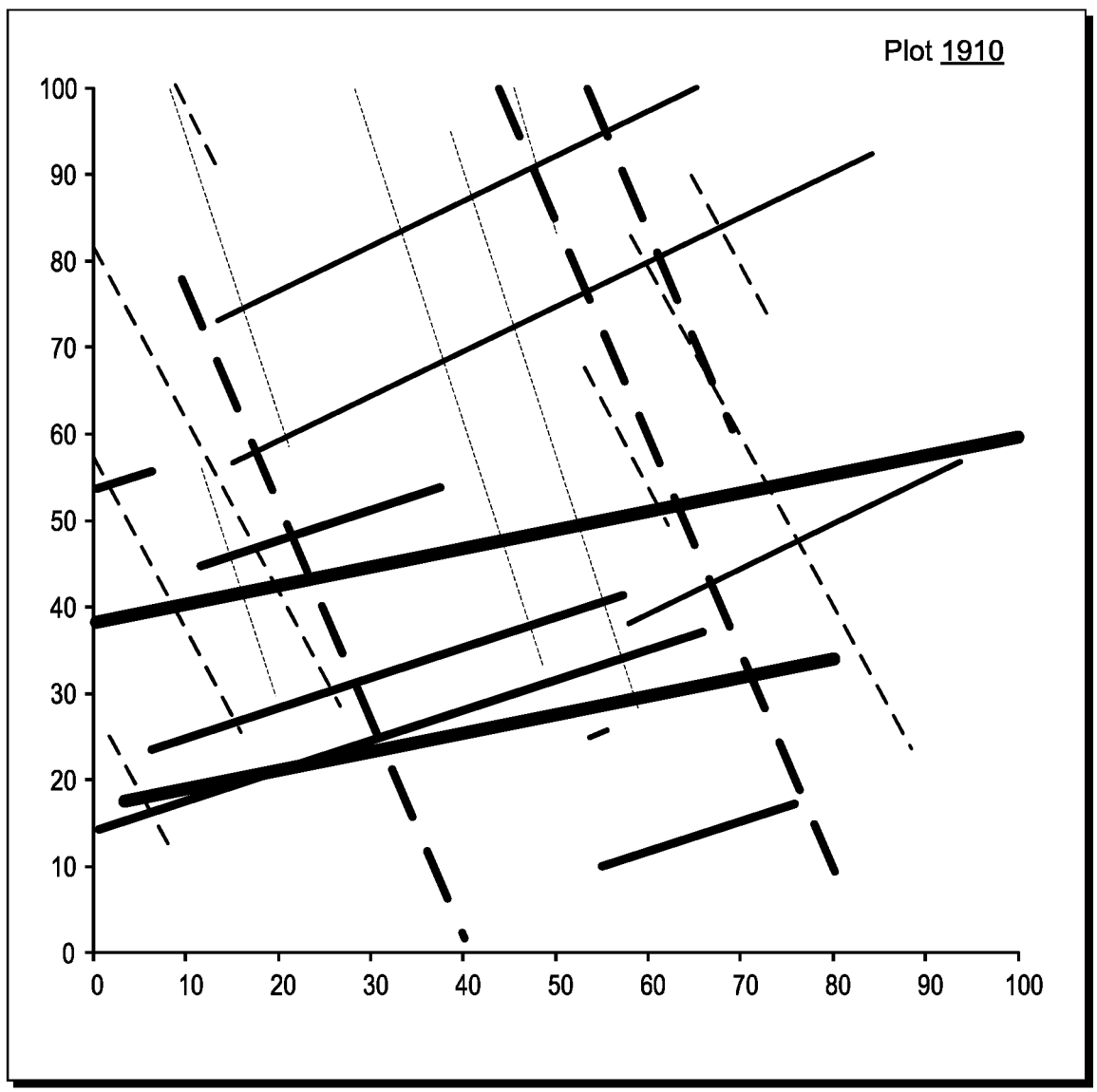
FIG. 19 illustrates examples of discrete fractures of a first set and of a second set.

FIG. 19 shows an example of a plot 1910 of a projection of a "voxel" (e.g., a cell or block) of a model of a geologic environment that includes fractures of a cDFN. In FIG. 19, fractures of a first fracture set with three azimuths and fractures of a second fracture set with three azimuths are illustrated as being within a 100 by 100 region of a geologic environment where the fractures are oriented substantially vertically. For example, if the vertical axis is z, as in FIG. 15, the 100 by 100 dimensions are along x and y axes. A model may be a gridded earth model that can be populated with at least a portion of the fractures of a generated cDFN.

More specifically, FIG. 19 shows a portion of results from a Constrained DFN Builder as a map-view of 2 sets of vertical fractures, N-S (dashed lines) and E-W (solid lines). Each set includes 3 distinct azimuths (shown in different line thicknesses).

Various models that describe the seismic response of fractured reservoirs make simplifying assumptions that can confound an ability to characterize fractured reservoirs. For example, some models assume a single set of perfectly aligned fractures; whereas a reservoir can include several fracture sets with variable orientation within a given fracture set.

Figure 20:
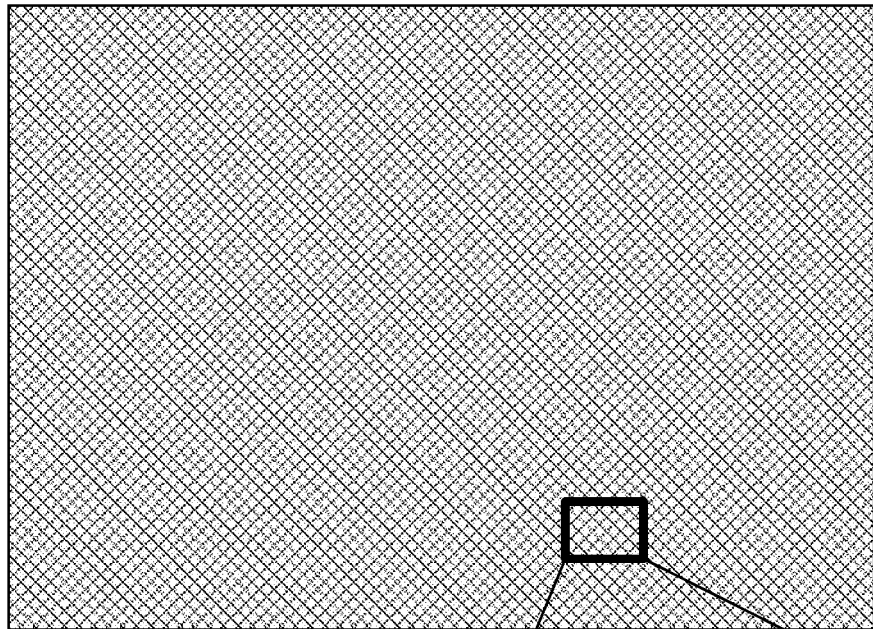
FIG. 20 illustrates a plot of examples of joints.

FIG. 20 shows an example of a plot 2010 of fractures of an example of a reservoir where different fracture sets may be identified and where orientation can differ within a given fracture set. As an example, a method can include generating a cDFN that can approximate at least a portion of fractures (e.g., fracture characteristics) within such a geologic environment. Specifically, the plot 2010 of FIG. 20 is a map of joints exposed on a sandstone bedding plane. A joint can be a surface of breakage, cracking or separation within rock. An enlarged portion of the plot 2010 is illustrated, which may be characterized at least in part by its fractal nature (e.g., one or more fractal related parameters). As mentioned, a bi-section approach may be utilized to generate a DFN (e.g., a cDFN) that includes fractures that exhibit one or more fractal characteristics.

As an example, an approach that utilizes a fractured reservoir model that assumes a single set of fractures for an environment such as the environment 2010 may give misleading results. For example, consider a vertically fractured reservoir including a large number of fractures whose normals are isotropically distributed in the horizontal plane. For such a fractured reservoir, there could be little or no variation in reflection coefficient with azimuth, so an interpretation of the reflection amplitude versus azimuth curve using an assumption of a single set of aligned fractures would predict, inappropriately, that the fracture density is zero.

Various equations are presented below, which may be implemented using a computing device, computing system, etc., to generate a constrained discrete fracture network (e.g., a cDFN).

Various equations below demonstrate how a naturally fractured reservoir can be characterized by using Amplitude Versus Azimuth (AVAz) inversion to constrain the construction of a Discrete Fracture Network (DFN), which may be referred to as a cDFN.

As an example, an AVAz inversion framework can provide estimates of P-impedance $I_P$, fast shear impedance $I_{S_1}$, slow shear impedance $I_{S_2}$, and the fast shear azimuth $\phi_{S_1}$. As an example, another type of inversion framework (Linearized Orthotropic Inversion) can provide alternative estimates of fracture compliance tensor components. AVAz inverted quantities (e.g., attributes, etc.) can be used to determine fracture size and orientation at different spatial locations, assuming fractures are, for example, substantially oriented (e.g., heightwise) in a particular direction. In the examples below, the direction is selected to be vertical (e.g., fractures oriented heightwise in a substantially vertical direction). Mathematically, equations may consider vertical alignment of fracture heights where precision may be determined via computational resources implemented. As an example, some amount of variation may be assumed to exist, for example, consider a range of about 10 degrees or less from vertical, which may be considered to be substantially vertical.

Figure 21:
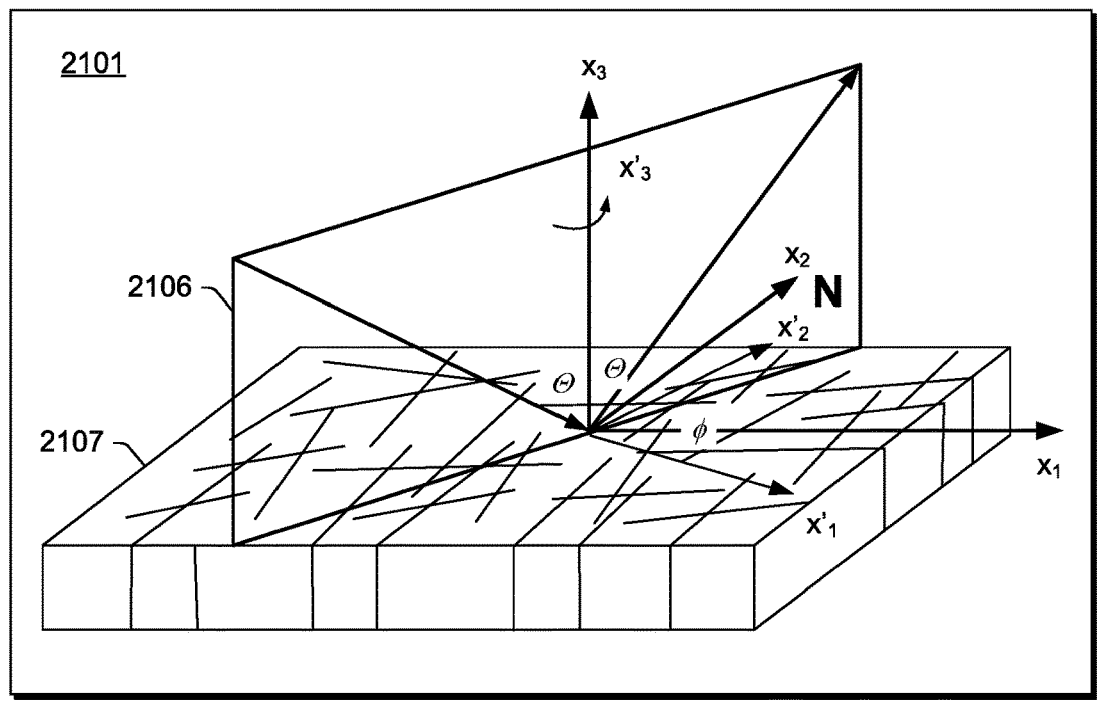
FIG. 21 illustrates example plots.
Figure 21:
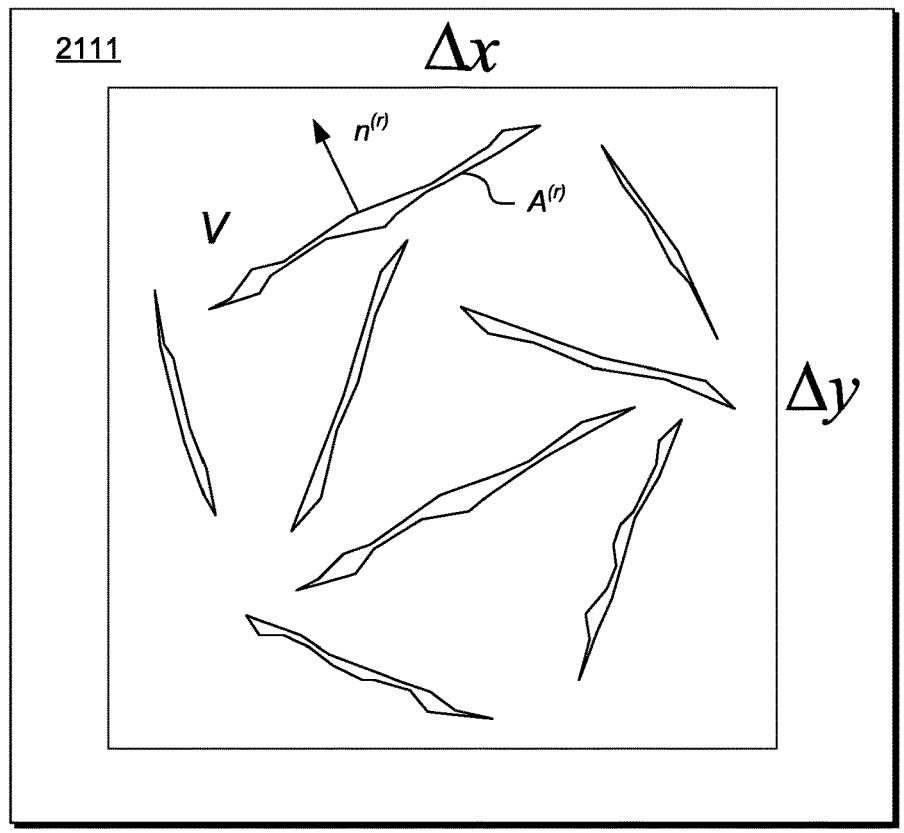

FIG. 21 shows an example diagram 2101 that illustrates elastic compliance of a vertically fractured medium. Specifically, the diagram 2101 schematically illustrates the reflection of seismic P-waves from a vertically fractured reservoir, with angle of incidence $\theta$ and azimuth $\phi$.

In particular, the diagram 2101 of FIG. 21 shows reflection of seismic P-waves from a vertically fractured reservoir. Unprimed axes denote the geographic coordinates. Primed axes denote geologic coordinates, obtained via clockwise rotation by angle φ about axis $x_3 = x'_3$, from axis $x_2$(North=0° to axis $x'_1$ (direction of fast shear wave polarization).

Geologic coordinate axes can be chosen such that for a vertically propagating shear wave, $x'_3$ is perpendicular to the fractured layer and $x'_1$, $x'_2$ are aligned with the fast and slow shear polarization directions respectively. In the neighborhood of the reflection point, the fractured layer can be treated as an effective medium with elastic stiffness tensor $C_{ijkl}$ and compliance tensor $S_{ijkl}$ (see, e.g., Schoenberg & Sayers 1995). These tensors vary spatially over the reservoir due to the lateral variation of fracture density. In the absence of fractures, the elastic stiffness tensor and elastic compliance tensor of the background rock are denoted by $C_{ijkl_b}$ and $S_{ijkl_b}$ respectively. Sayers & Kachanov (1995) show that the elastic compliance of a fractured reservoir may be written in the form:

$$S_{ijkl} = S_{ijkl_b} + \Delta S_{ijkl} \tag{1}$$

where the excess compliance $\Delta S_{ijkl}$ due to the presence of the fractures can be written as:

$$\Delta S_{ijkl} = \frac{1}{4}(\delta_{ik}\alpha_{jl} + \delta_{il}\alpha_{jk} + \delta_{jk}\alpha_{il} + \delta_{jl}\alpha_{ik}) + \beta_{ijkl} \tag{2}$$

Here $\alpha_{ij}$ is a second-rank tensor and $\beta_{ijkl}$ is a fourth-rank tensor defined by:

$$\alpha_{ij} = \frac{1}{V}\sum_r B_T^{(r)} n_i^{(r)} n_j^{(r)} A^{(r)} \tag{3}$$

$$\beta_{ijkl} = \frac{1}{V}\sum_r (B_N^{(r)} - B_T^{(r)}) n_i^{(r)} n_j^{(r)} n_k^{(r)} n_l^{(r)} A^{(r)} \tag{4}$$

where $B_N^{(r)}$ and $B_T^{(r)}$ are the normal and shear compliance of the $r^{th}$ fracture in volume V (FIG. 21, example diagram 2111), $n_i^{(r)}$ is the $i^{th}$ component of the normal to the fracture, and $A^{(r)}$ is the surface area of the fracture (see, e.g., Sayers & Kachanov 1995).

As an example, where an excess compliance is to be based on $\alpha_{ij}$ (second-rank tensor) and not $\beta_{ijkl}$ (fourth-rank tensor), such an approach can include an assumption that $B_N^{(r)}$ (normal compliance) and $B_T^{(r)}$ (shear compliance) of the fractures are substantially the same (see, e.g., equation (4) where the term ($B_N$–$B_T$) may become smaller to closer $B_N$ and $B_T$ are to each other). In such an example, the term $\beta_{ijkl}$ (fourth-rank tensor) may become negligible compared to the term $\alpha_{ij}$ (second-rank tensor); for example, consider a metric that may be preset to determine when such a condition is met. As an example, data may exist upon which a determination may be made that such an assumption of $B_N$ and $B_T$ being substantially the same is acceptable (e.g., optionally calculating values for the compliances). As an example, where it is desired to relax such an assumption (e.g., due to a substantial difference in the compliances), an excess compliance can based in part on $\alpha_{ij}$ (second-rank tensor) and based in part on $\beta_{ijkl}$ (fourth-rank tensor). In such an example, an algorithm utilized for generation of a discrete fracture network (DFN) can include a portion that checks for agreement as to $\alpha_{ij}$ (second-rank tensor) and can include a portion that checks for agreement as to $\beta_{ijkl}$ (fourth-rank tensor).

As an example, the second-rank tensor and the fourth-rank tensor may be defined using suitable equations, which may differ from the foregoing example equations (3) and (4). As an example, a second-rank tensor can be associated with shear compliance (e.g., $B_T$) and a fourth-rank tensor can be associated with normal compliance and shear compliance (e.g., $B_N$ and $B_T$). As an example, a tensor may be a crack density tensor.

In FIG. 21, an example diagram 2111 shows a fracture r in rectangular voxel V that has unit normal vector $n^{(r)}$ and surface area $A^{(r)}$. The lateral dimensions of voxel V are αx and αy. Axis $x_3$ is out of the page.

As an example, tangential compliance $B_T$ can be assumed to be independent of the direction of shear traction within the plane of the fracture. In addition, in the absence of fractures, a reservoir can be assumed to be VTI (transversely isotropic with a vertical axis of rotational symmetry). For a general distribution of vertical fracture orientations, the elastic symmetry of the fractured rock can then be monoclinic, with the 13 non-vanishing elastic stiffness coefficients: $C_{11}$, $C_{22}$, $C_{33}$, $C_{12}=C_{21}$, $C_{13}=C_{31}$, $C_{23}=C_{32}$, $C_{44}$, $C_{55}$, $C_{66}$, $C_{16}=C_{61}$, $C_{26}=C_{62}$, $C_{36}=C_{63}$, and $C_{45}=C_{54}$, in the conventional two-index notation.

Excess Compliance in Terms of S-Impedance

For a general orientation distribution of vertical fractures in a VTI medium, the elastic behavior of the reservoir is described by the 13 independent elastic stiffnesses, as listed above. However, as shown in FIG. 21, a choice of axes $x'_1$ and $x'_2$ exists such that $C_{45}=0$. In this coordinate frame, the number of independent elastic constants is reduced to 12. This choice of axes corresponds to the fast and slow polarization directions of a vertically propagating shear wave, which coincides with the principal directions of the second-rank tensor $\alpha_{ij}$ (Sayers 1998). The azimuth of the fast shear wave polarization $\phi_{S1}$ is given by:

$$\tan 2\phi_{S1} = \frac{2\alpha_{12}}{\alpha_{11} - \alpha_{22}} \tag{5}$$

Denoting $\alpha'_{11}$ and $\alpha'_{22}$ the non-vanishing components of $\alpha_{ij}$ in the $x'_1$ and $x'_2$ frame of reference, the shear-wave anisotropy may be defined in terms of the fast shear impedance $I_{S_1}$ and slow shear impedance $I_{S_2}$ obtained via AVAz inversion as follows:

$$\frac{I_{S1}^2 - I_{S2}^2}{I_{S1}^2 + I_{S2}^2} = \frac{\mu(\alpha'_{11} - \alpha'_{22})}{2 + \mu(\alpha'_{11} + \alpha'_{22})} \tag{6}$$

where $\mu = C_{44b} = C_{55b}$ is the shear modulus governing vertical shear-wave propagation in the VTI background medium. Assuming the S-impedance $I_{Sb}$ of the background medium can be determined, dimensionless quantities $a'_{11} \equiv \mu\alpha'_{11}$ and $a'_{22} \equiv \mu\alpha'_{22}$ are given by:

$$\alpha'_{11} \equiv \mu\alpha'_{11} \equiv \frac{I_{Sb}^2}{I_{S2}^2} - 1 \tag{7}$$

-continued $$\alpha'_{22} \equiv \mu \alpha'_{22} \equiv \frac{I_{Sb}^2}{I_{S1}^2} - 1$$

Equations 5-7 are relations which make no assumptions aside from a VTI background medium including vertical fractures.

Excess Compliance in Terms of P-Impedance

Alternatively, $\alpha'_{11}$ and $\alpha'_{22}$ can also be determined from P-impedance $I_P$ and equation 6. Assuming normal compliance $B_N$ and shear compliance $B_T$ are approximately of the same value ($B_N/B_T \approx 1$), it follows from equation 4 that rank-4 tensor $\beta_{ijkl}$ may be neglected. Consequently, the elastic stiffness tensor is a function primarily of $\alpha_{ij}$. With this simplification, $\alpha'_{11}$ and $\alpha'_{22}$ can be further constrained by P-impedance $I_P$ via the following equation:

$$C_{33} = \frac{[C_{33_b} + (C_{11_b}C_{33_b} - C_{13_b}^2)(\alpha'_{11} + \alpha'_{22}) + 4C_{66_b}(C_{11_b}C_{33_b} - C_{13_b}^2 - C_{33_b}C_{66_b})\alpha'_{11}\alpha'_{22}]}{[1 + C_{11_b}(\alpha'_{11} + \alpha'_{22}) + 4C_{66_b}(C_{11_b} - C_{66_b})\alpha'_{11}\alpha'_{22}]} \quad (8)$$

Since the azimuthal anisotropy due to fractures can be small, the following linearized scheme may be useful as a first approximation:

$$\mu(\alpha'_{11} - \alpha'_{22}) \approx \frac{I_{S1}^2 - I_{S2}^2}{I_{S1}^2 + I_{S2}^2} \quad (9)$$

$$\mu(\alpha'_{11} + \alpha'_{22}) \approx \frac{C_{33_b}C_{55_b}}{C_{13_b}^2}\left(1 - \frac{I_P^2}{I_{P_b}^2}\right) \quad (10)$$

These estimates may be improved by iteration using equations 5, 6 and 8. It is recommended that the dimensionless products $a'_{ij} \equiv \mu \alpha'_{ij}$ be used rather than the unnormalized quantities $\alpha_{ij}$, as the latter have dimensions of inverse stiffness. For an isotropic background rock, applicable to reservoirs such as carbonates and tight gas sands, equations 8 and 10 may be written in the form:

$$C_{33} = \frac{2\mu[(1-v) + 2\mu(\alpha'_{11} + \alpha'_{22}) + 4\mu^2 \alpha'_{11}\alpha'_{22}]}{[(1-2v) + 2\mu(1-v)(\alpha'_{11} + \alpha'_{22}) + 4\mu^2 \alpha'_{11}\alpha'_{22}]} \quad (11)$$

$$\mu(\alpha'_{11} + \alpha'_{22}) \approx \frac{(1-v)(1-2v)}{2v^2}\left(1 - \frac{I_P^2}{I_{P_b}^2}\right) \quad (12)$$

where $v$ denotes Poisson's ratio. Combining approximations 9 and 12 yields:

$$a'_{11} \equiv \mu \alpha'_{11} \approx \frac{(1-v)(1-2v)}{4v^2}\left(1 - \left(\frac{I_P}{\rho V_P}\right)^2\right) + \frac{I_{S1}^2 - I_{S2}^2}{2(I_{S1}^2 + I_{S2}^2)} \quad (13)$$

$$a'_{22} \equiv \mu \alpha'_{22} \approx \frac{(1-v)(1-2v)}{4v^2}\left(1 - \left(\frac{I_P}{\rho V_P}\right)^2\right) - \frac{I_{S1}^2 - I_{S2}^2}{2(I_{S1}^2 + I_{S2}^2)}$$

Figure 22:
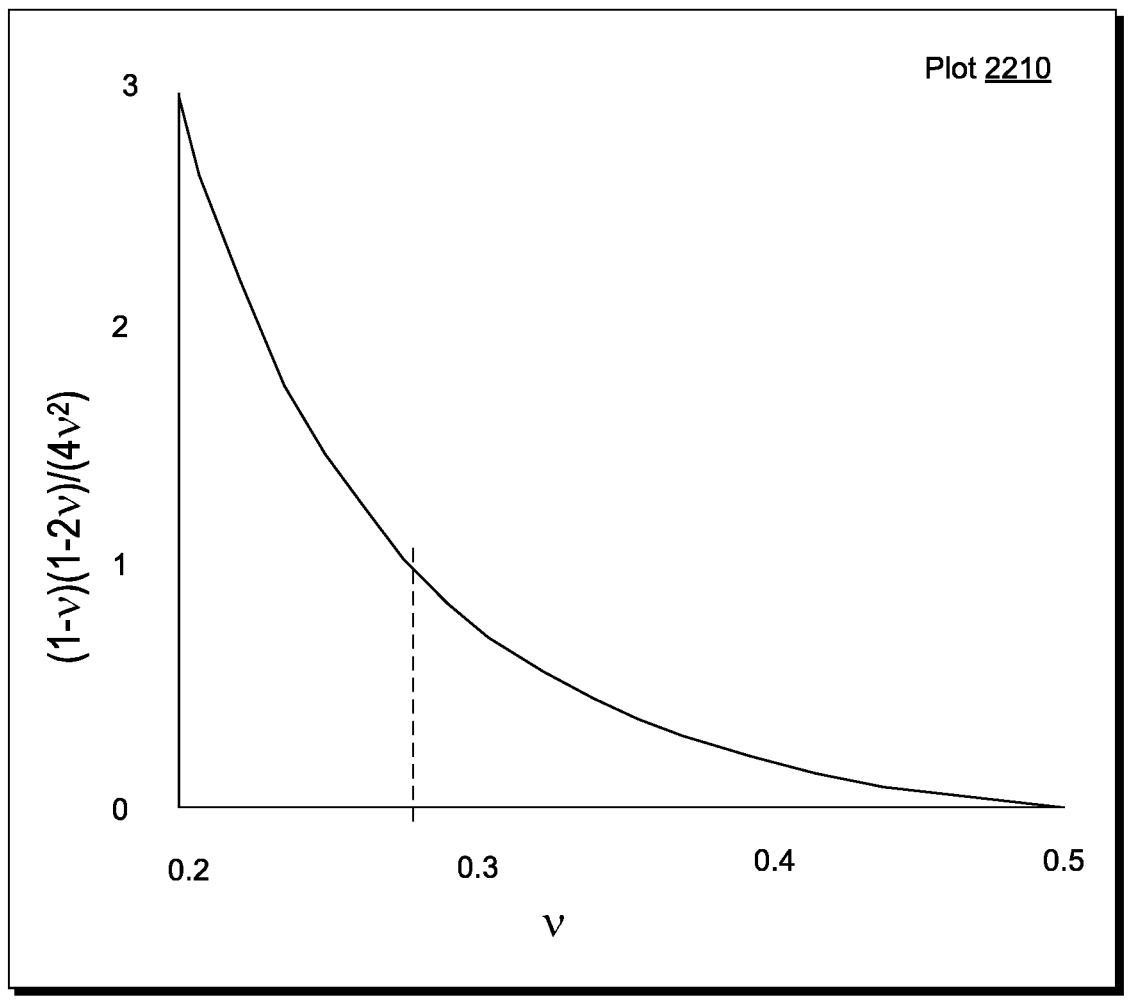
FIG. 22 illustrates an example of a plot of a P-Impedance prefactor versus Poisson's ratio.

FIG. 22 shows an example plot 2210 of the prefactor $(1-v)(1-2v)/4v^2$ in equations 13 plotted against Poisson's ratio where the pre-factor exceeds unity when $v<0.2807764061\ldots$ (see dashed black line in FIG. 22).

From FIG. 22, it can be seen that for Poisson's ratio $v<0.28$, the prefactor is larger than unity, leading to amplification of errors in the P-impedance obtained by inversion. For this reason, this approach can be utilized when $v>0.28$, for example, which may be suitable for carbonate reservoirs.

Excess Compliance from Linearized Orthotropic Inversion

Compared to the impedance-based (ISIS) AVAz inversion approach, Linearized Orthotropic inversion produces estimates of the fast shear azimuth $\phi_{S1}$, the shear impedance of the nearest VTI medium $I_S$, and quantities $\Gamma_x$ and $\Gamma_y$, which are related to $\alpha_{ij}$ by:

$$\mu\alpha_{11} + \mu\alpha_{22} \approx 4\left(1 - \frac{I_S}{I_{Sb}}\right) \quad (14)$$

$$\mu\alpha_{11} - \mu\alpha_{22} = \left(\frac{1-v}{1-4v}\right)(\Gamma_x - \Gamma_y)$$

from which the following expressions are obtained for the dimensionless coefficients $a_{ij}$:

$$a_{11} \equiv \mu\alpha_{11} \approx 2\left(1 - \frac{I_S}{I_{S_b}}\right) + \frac{1}{2}\left(\frac{1-v}{1-4v}\right)(\Gamma_x - \Gamma_y) \quad (15)$$

$$a_{22} \equiv \mu\alpha_{22} \approx 2\left(1 - \frac{I_S}{I_{S_b}}\right) - \frac{1}{2}\left(\frac{1-v}{1-4v}\right)(\Gamma_x - \Gamma_y)$$

In the foregoing example, the value computed via the first equation of 14 is to exceed the absolute value computed via the second equation and $I_S < I_{S_b}$.

Azimuthal Isotropy

A medium may appear azimuthally isotropic in the presence of two or more sets of vertical fractures if there is no variation in reflection amplitude with azimuth. In the case of ISIS inversion, azimuthal isotropy implies $I_{S1}=I_{S2}=I_S$, the fast shear azimuth $\phi_{S1}$ is undefined, and $a'_{11}=a_{11}$ and $a'_{22}=a_{22}$. The corresponding S-impedance solutions for dimensionless products $a'_{11}$ and $a'_{22}$ are:

$$a'_{11} = a'_{22} = \frac{I_{Sb}^2}{I_S^2} - 1, \quad (16)$$

The corresponding P-impedance solutions are:

$$a'_{11} = a'_{22} \approx \frac{(1-v)(1-2v)}{4v^2}\left(1 - \left(\frac{I_P}{\rho V_P}\right)^2\right), \quad (17)$$

As explained above, use of the latter result may be appropriate when $v>0.28$. In the case of linearized orthotropic inversion, azimuthal isotropy implies $\Gamma_x=\Gamma_y=\Gamma$, hence:

$$a'_{11} = a'_{22} = 2\left(1 - \frac{I_S}{I_{Sb}}\right) \quad (18)$$

Conversion from Geologic to Geographic Coordinates

Equations 1-18 assume a geologic coordinate system in which axes $x'_1$, $x'_2$ are aligned with the fast and slow shear polarization directions respectively, where azimuth is measured clockwise from North (0°). As a consequence of this geologic coordinate system, $\alpha'_{ij}$ by construction. To convert to a geographic coordinate system in which $x_1$ is parallel to East and $x_2$ is parallel to North, the following rotations can be applied:

$$\alpha_{ij} = R_{ij} \alpha'_{ij} R_{ij}^T$$

$$\alpha_{ij} = \begin{bmatrix} \cos\phi_{S1} & -\sin\phi_{S1} \\ \sin\phi_{S1} & \cos\phi_{S1} \end{bmatrix} \begin{bmatrix} \alpha'_{11} & 0 \\ 0 & \alpha'_{22} \end{bmatrix} \begin{bmatrix} \cos\phi_{S1} & \sin\phi_{S1} \\ -\sin\phi_{S1} & \cos\phi_{S1} \end{bmatrix}$$

which gives:

$$\alpha_{11} = \alpha'_{11} \cos^2\phi_{S1} + \alpha'_{22} \sin^2\phi_{S1}$$

$$\alpha_{22} = \alpha'_{11} \sin^2\phi_{S1} + \alpha'_{22} \cos^2\phi_{S1}$$

$$\alpha_{12} = (\alpha'_{11} - \alpha'_{22}) \sin\phi_{S1} \cos\phi_{S1} \quad (19)$$

where $\alpha'_{ij}$ (primed) denotes compliance in the original geologic coordinates, $\alpha_{ij}$ (unprimed) denotes compliance in the new geographic coordinate system, and $\phi_{S1}$ denotes the fast shear azimuth. Equations 19 can be verified via substitution into equation 5:

$$\frac{2\alpha_{12}}{\alpha_{11} - \alpha_{22}} = \frac{2\sin\phi_{S1}\cos\phi_{S1}(\alpha'_{11} - \alpha'_{22})}{\alpha'_{11}(\cos^2\phi_{S1} - \sin^2\phi_{S1}) - \alpha'_{22}(\cos^2\phi_{S1} - \sin^2\phi_{S1})}$$

$$= \frac{(\alpha'_{11} - \alpha'_{22})\sin 2\phi_{S1}}{(\alpha'_{11} - \alpha'_{22})\cos 2\phi_{S1}}$$

$$= \tan(2\phi_{S1})$$

Initial Solution

For modeling purposes, fractures are mathematically idealized by representing them as planar rectangular surfaces. An initial solution can be obtained by considering the case of two single vertical rectangular fracture planes in geographic coordinates, both of fixed height H but variable length L, in which the strike azimuth $\phi_1$ of the first fracture (primary set) is uniquely known and the other azimuth $\phi_2$ (secondary set) is unique but unknown. The effective surface area of each fracture, $A_1 = H \cdot L_1$ and $A_2 = H \cdot L_2$, is determined from equation 3 by employing an empirical scaling relationship (see, e.g., Worthington 2007):

$$B_T \approx B_{To} \cdot L^C \quad (20)$$

where $B_T$ denotes the tangential fracture compliance, and $B_{To}$ and C are experimental constants ranging in value from $5.0 \times 10^{-4}$ to $2.5 \times 10^{-3}$ [m/GPa] and 0.85 to 1.20 respectively. For vertical fractures, the unit normal vector $\hat{n}$ is given by:

$$\hat{n} = [\cos\varphi, \sin\varphi, 0] \quad (21)$$

where $\varphi$ denotes fracture azimuth measured positively clockwise from North (0°). Substituting equations 20 and 21 into equation 3 thus yields:

$$\alpha_{11} = \frac{B_{To}}{V \cdot H^C}(A_1^{1+C}\cos^2\varphi_1 + A_2^{1+C}\cos^2\varphi_2) \quad (22)$$

$$\alpha_{22} = \frac{B_{To}}{V \cdot H^C}(A_1^{1+C}\sin^2\varphi_1 + A_2^{1+C}\sin^2\varphi_2)$$

$$\alpha_{12} = \frac{B_{To}}{V \cdot H^C}(A_1^{1+C}\cos\varphi_1\sin\varphi_1 + A_2^{1+C}\cos\varphi_2\sin\varphi_2)$$

For $\varphi_1 = 0$, the first two expressions yield the following surface areas:

$$A_2 = \left(\frac{a_{22}}{\mu} \frac{V \cdot H^C}{B_{To}\sin^2\varphi_2}\right)^{1/1+C} \quad (23)$$

$$A_1 = \left(\left(\frac{a_{11}}{\mu} - \frac{a_{22}}{\tan^2\varphi_2}\right)\frac{V \cdot H^C}{B_{To}}\right)^{1/1+C}$$

For $\varphi_1 = \pi/2$, the following surface areas are obtained:

$$A_2 = \left(\frac{V \cdot H^C \cdot a_{11}}{B_{To} \cdot \mu \cdot \cos^2\varphi_2}\right)^{1/1+C} \quad (24)$$

$$A_1 = \left(\frac{V \cdot H^C}{B_{To} \cdot \mu}(a_{22} - a_{11}\tan^2\varphi_2)\right)^{1/1+C}$$

For a general case $\varphi_1 \neq 0$ and $\varphi_1 \neq \pi/2$, the following surface areas are obtained:

$$A_2 = \left(\frac{V \cdot H^C}{B_{To} \cdot \mu}\left[\frac{a_{22} - a_{11}\tan^2\varphi_1}{\sin^2\varphi_2 - \cos^2\varphi_2 \tan^2\varphi_1}\right]\right)^{1/1+C} \quad (25)$$

$$A_1 = \left(\frac{V \cdot H^C}{B_{To} \cdot \mu}\left[\frac{a_{11}}{\cos^2\varphi_1} - \left(\frac{a_{22} - a_{11}\tan^2\varphi_1}{\sin^2\varphi_2 - \cos^2\varphi_2\tan^2\varphi_1}\right)\frac{\cos^2\varphi_2}{\cos^2\varphi_1}\right]\right)^{1/1+C}$$

Solutions for the case $\varphi_2 = 0$ or $\pi/2$ when $\varphi_1 \neq 0$ and $\varphi_1 \neq \pi/2$ are obtained by interchanging the subscripts of $A_1$ and $A_2$ in equations 23 and 24 respectively.

Since azimuth $\varphi_1$ is known, azimuth $\varphi_2$ can be determined by substituting equations 23-25 into the last expression of equation 22. For the case $\varphi_1 \neq \pi/2$ or 0, this leads to the expression:

$$\alpha_{12} = \left\{\left[a_{11} - \left(\frac{a_{22} - a_{11}\tan^2\varphi_1}{\tan^2\varphi_2 - \tan^2\varphi_1}\right)\right]\tan\varphi_1 + \left[\frac{a_{22} - a_{11}\tan^2\varphi_1}{\tan^2\varphi_2 - \tan^2\varphi_1}\right]\tan\varphi_2\right\}$$

Making the substitutions $x = \tan\varphi_2$, $c = \tan\varphi_1$, simplifying and collecting terms, yields a quadratic in x:

$$0 = x^2(ca_{11} - a_{12}) + x(a_{22} - c^2 a_{11}) + c(ca_{12} - a_{22})$$

Hence, for $\varphi_1 \neq \pi/2$, the two roots $\varphi_2^\pm$ are given by:

$$\varphi_2^\pm = \tan^{-1}\left[\frac{(c^2 a_{11} - a_{22}) \pm \sqrt{(a_{22} - c^2 a_{11})^2 - 4c(ca_{11} - a_{12})(ca_{12} - a_{22})}}{2(ca_{11} - a_{12})}\right] \quad (26)$$

where $c = \tan\varphi_1$. One roots is equal to $\varphi_1$, hence the other root is the feasible solution. For the case $\varphi_1 = \pi/2$, substituting equation 24 into equation 22 yields:

$$a_{12} = (a_{22} - a_{11}\tan^2\varphi_2)\cos\varphi_1\sin\varphi_1 + a_{11}\tan\varphi_2$$

Substituting $x = \tan\varphi_2 c = \cos\varphi_1\sin\varphi_1$, simplifying and collecting terms, yields the quadratic:

$$0 = -ca_{11}x^2 + a_{11}x + ca_{22} - a_{12}$$

Hence, for $\varphi_1=\pi/2$, the two roots $\varphi_2^{\pm}$ are given by:

$$\varphi_2^{\pm} = \tan^{-1}\left[\frac{1}{2c}\left(1 \pm \sqrt{1 + \frac{4c}{a_{11}}(ca_{22} - a_{12})}\right)\right] \quad (27)$$

where c=cos $\varphi_1$ sin $\varphi_1$=½ sin $2_{100\ 1}$. As in the case $\varphi_1 \neq \pi/2$, one root is equal to $\varphi_1$, hence the other root is the feasible solution. For the case $\varphi_1=0$, substituting equation 23 into equation 22 yields:

$$\left(\alpha_{11} - \frac{\alpha_{22}}{\tan^2\varphi_2}\right)\cos\varphi_1\sin\varphi_1 + \alpha_{22}\frac{\cos\varphi_2}{\sin\varphi_2}$$

Substituting x=1/tan $\varphi_2$, c=cos $\varphi_1$ sin $\varphi_1$, simplifying and collecting terms, yields the quadratic:

$$0 = -c\alpha_{22}x^2 + \alpha_{22}x + (c\alpha_{11} - \alpha_{12})$$

Hence, for $\varphi_1=0$, the two roots $\varphi_2^{\pm}$ are given by:

$$\varphi_2^{\pm} = \tan^{-1}\left[2c\left(1 \pm \sqrt{1 + \frac{4c}{\alpha_{22}}(c\alpha_{11} - \alpha_{12})}\right)^{-1}\right] \quad (28)$$

where c=cos $\varphi_1$ sin $\varphi_1$=½ sin $2_{100\ 1}$. One root is equal to $\varphi_1$, hence the other root is the feasible solution.

Multi-Azimuth Solution

The initial solution detailed above is obtained by solving equations 22 assuming contributions to net fracture compliance are due to a single fracture azimuth in each set. Since at least a portion of the fractures in a set are not perfectly parallel (e.g., not perfectly parallel within a mathematical or computational limit as may be determined by hardware, etc.), this single azimuth solution can be generalized to allow for azimuthal dispersion by partitioning fracture area $A_{ii}$ into independent contributions from an arbitrary number m of fracture azimuths in each fracture set:

$$A_{ii} = \sum_{j=1}^{m} p_j A_{ii} \text{ where: } m > 1, 0 < p_j < 1 \text{ and } \sum_{j=1}^{m} p_j = 1 \quad (29)$$

A simple possible partitioning scheme corresponds to equal proportions p:

$$p_j \equiv p = \frac{1}{m}$$

Due to the form of equations 23-25, dimensionless coefficients $a_{ii}$ can be scaled by $p_j^{1+C}$:

$$A_{ii} = \sum_{j=1}^{m} p_j A_{ii} \propto \sum_{j=1}^{m} p_j a_{ii}^{1/1+C} = \sum_{j=1}^{m} [p_j^{1+C} a_{ii}]^{1/1+C}$$

P-Versus S-Impedance

For the impedance-based AVAz approach, several reasons to formulate elastic fracture compliance in terms of S-impedance (equation 7) rather than P-impedance (equation 13) can include:

1. Vertically incident P-waves are relatively insensitive to the presence of vertical fractures. Thus, the ratio $I_P/I_{Pb}$ in equations 12-13 is prone to be near unity and $1-I_P/I_{Pb}$ near zero. Moreover, as shown in the plot of FIG. 22, the prefactor $(1-v)(1-2v)/2v^2$ amplifies the latter near-zero quantity when v<0.28, rendering the product of both terms numerically unstable. By comparison, slower horizontally polarized S-waves are more sensitive to vertical fractures since they encounter them substantially normal to their plane and thus experience a more predominant fracture influence.
2. The P-impedance formulation can be appropriate if Poisson's ratio exceeds about 0.28; whereas, an S-impedance formulation may be valid irrespective of v.
3. Equations 5-7 are relations without assumptions other than a vertically fractured VTI background medium (e.g., a direction for which some form a symmetry may exist); whereas, equations 8-15 are linearized approximations which assume an isotropic background medium and $B_N/B_T \approx 1$.
4. Equations 5-7 are independent of rank-4 tensor $\beta_{ijkl}$ since shear waves are sensitive to tangential fracture compliance ($B_T$). By contrast, equations 8-13 provide for $\beta_{ijkl}$ to be neglected.
5. Compared to an S-impedance formulation, a P-impedance formulation tends to be more complicated, for example, including an explicit dependence on Poisson's ratio.

For such reasons, equations 7 and 15 utilizing horizontally polarized S-waves can be quite robust.

Implementation

As an example, an implementation can presume that a realistically detailed 3D stratigraphic framework model (e.g., geocellular grid in depth) has been constructed for a designated area of interest, and that cells in the 3D model have been populated with rock properties corresponding to the unfractured (background') rock medium. Such a model can be considered to be a representation of real geology. A stratigraphic model can be constructed from a set of depth horizons, for example, as may be generated via areal interpolation of well tops within an area of interest. Individual strata may be created between horizons, for example, by conformable spline interpolation. A 3D grid may be established by partitioning individual layers into hexahedral cells. Wire-line log properties such as rock density and velocity may then be intersected with the 3D grid along the trajectories of wells, and individual log properties may be upscaled by averaging samples within intersected cells. Cells not intersected by wells may then be populated by interpolating the upscaled log properties between wells, for example, via a geostatistical interpolation technique of trend kriging. The resulting model thus includes rock property values in individual grid cells.

The foregoing example implementation assumes inputs are available at individual spatial locations of a designated set of spatial locations G[x,y,z], and that the volume V of an individual location is known (see E.1 below). For example, G may correspond to the cells of a stratigraphic grid, as above, or a 3D Cartesian grid of voxels that may be of dimensions $\Delta x$, $\Delta y$, $\Delta z$. In the latter case, G[x,y,z] can be assumed to be populated via resampling from the stratigraphic grid into the Cartesian one. It may also be assumed that (e.g., excepting with respect to one or more actions) the procedure can be applied independently at individual spatial locations; that is, results at a given location may not be affected by other locations.

A. Inputs

The following input AVAz parameters are assumed to have been derived from inversion of recorded seismic amplitude versus azimuth data:
- P-impedance ($I_P$)
- fast shear impedance ($I_{S1}$)
- slow shear impedance ($I_{S2}$)
- fast shear azimuth ($\phi_{S1}$)

The following input background medium parameters are assumed to be derived from recorded wire-line log data:
- P-velocity ($V_P$) or alternatively P-impedance ($I_{P_b} = \rho V_P$)
- S-velocity ($V_S$) or alternatively S-impedance ($I_{S_b} = \rho V_S$)
- bulk density ($\rho$)

The following input fracture parameters are assumed to be interpreted from available fracture data:
- mean azimuth of primary (dominant) fracture set ($\phi_1$)
- angular dispersion of primary (dominant) fracture set ($\pm \delta_1$)
- mean azimuth of secondary fracture set ($\phi_2$)
- angular dispersion of secondary fracture set ($\pm \delta_2$)
- mean fracture height ($H_0$) and standard deviation ($\sigma_H$)
- mean fracture length ($L_0$) and maximum ($L_{max}$)

Given such inputs, an example implementation can derive a discrete fracture network (DFN) model consistent with the input data.

B. Assumptions

The example implementation can makes the following assumptions:
1. Fractures are oriented vertical rectangular planes such that:
   a. the unit normal vector n of any fracture plane is [cos φ, sin φ, 0], where φ denotes the fracture azimuth (clockwise from North=0°) and $-\pi/4 \le \phi < 3\pi/4$.
   b. the non-zero components of rank-2 tensor $\alpha_{ij}$ are $\alpha_{11}$, $\alpha_{12}$ and $\alpha_{22}$.
2. The number of distinct fracture sets is 2.
3. The azimuths in each fracture set are approximately Gaussian (normal) distributed.
4. Fracture sets are distinct such that their azimuths do not overlap; thus: $\phi_1 \pm \delta_1 \Leftrightarrow \phi_2 \pm \delta_2$.
5. Fracture shear compliance ($B_T$) and normal compliance ($B_N$) are equal such that components of rank-4 fracture compliance tensor $\beta_{ijkl}$ are zero and can be neglected.
6. The background rock medium is isotropic or vertically transverse isotropic (VTI).
7. Input parameters are reliably determined.

C. Procedure

Given the above inputs, the proposed implementation can include the following actions:
1. Compute Poisson's ratio $\nu$ and shear modulus $\mu$ as:

$$\nu = \frac{(V_P/V_S)^2 - 2}{2(V_P/V_S)^2 - 2}, \quad \mu = \rho V_S^2$$

where if the background medium is specified via velocities, or if impedances are used:

$$\nu = \frac{(I_{Pb}/I_{Sb})^2 - 2}{2(I_{Pb}/I_{Sb})^2 - 2}, \quad \mu = \frac{I_{Sb}^2}{\rho}$$

2. Compute dimensionless products $a_{11}$ and $a_{22}$ via either: equation 7 (S-impedance), equation 13 (P-impedance), or equation 15 (linearized orthotropic inversion).

3. Verify that derived values $a_{11}$ and $a_{22}$ satisfy the constraints:

$$\left. \begin{array}{l} 0 \le a_{11} < 1 \\ 0 \le a_{22} < 1 \end{array} \right\} \; 0 < a_{11} + a_{22} < 1$$

where if either $a_{11}$ or $a_{22}$ is invalid, report an error and proceed to action 13. This condition can imply that one or more input parameters are unreliable.

4. Rotate $a_{11}$ and $a_{22}$ from geologic coordinates to geographic coordinates via equation 19. In such an example, this rotation yields $a_{12} \ne 0$ if $a_{11} \ne a_{22}$.

5. Assign fracture height H by drawing at random from either a Von Mises-Fisher distribution or a (truncated) normal distribution:

$$H = H_o + \frac{\sigma_H}{\kappa} f_{dev} \quad \text{or:} \quad H = H_o + \frac{\sigma_H}{w} g_{dev}$$

where $f_{dev}$ denotes a random Von Mises deviate with concentration κ, $g_{dev}$ denotes a random Gaussian deviate with zero mean and unit variance, and w is a constant determining the effective width of the normal distribution ($2 \le w \le 4$). In such an example, the magnitude of w determines the extent to which the tails of the normal distribution are truncated. Truncation is achieved by generating a new deviate if the one obtained exceeds w.

6. Draw a discretized trial azimuth $\varphi_1$ at random from a (truncated) normal distribution:

$$\varphi_1 = \Delta \cdot \text{INT}\left[\frac{1}{\Delta}\left(\phi_1 + \frac{\delta_1}{w} g_{dev}\right)\right]$$

where $g_{dev}$ denotes a random Gaussian deviate distinct from action 5, and Δ denotes a fixed angular resolution ($\frac{1}{2}° \le \Delta \le 5°$). In such an example, discretization can facilitate action 14.

7. If $\varphi_1 < \phi_1 - \delta_1$ or $\varphi_1 > \phi_1 + \delta_1$, or if $\varphi_1$ matches a trial azimuth previously attempted, return to action 6 if the number of trials attempted thus far is less than a designated limit. Otherwise, report an error and proceed to action 13. In such an example, as multiple pairs of solutions ($\varphi_1, \varphi_2$) exist if input parameters are accurate, this condition implies the input parameters are either unreliable or mutually inconsistent.

8. Using one of equations 26-28, compute both roots $\varphi_2^\pm$ and discard the one equal to $\varphi_1$.

9. Set $\varphi_2$ equal to the remaining root if $\varphi_2^\pm < \phi_2 - \delta_2$ and $\varphi_2^\pm < \phi_2 + \delta_2$. Otherwise, return to action 6.

10. Using one of equations 23-25, compute the effective fracture surface areas $A_1$ and $A_2$ of a single fracture at azimuth $\varphi_1$ and a single fracture at azimuth at $\varphi_2$ respectively, both of fixed fracture height H, employing the empirical scaling relationship $B_T = B_{T_o} \cdot (A/H)^C$ (equation 20).

11. For fracture set 1, partition the single fracture plane (azimuth $\varphi_1$, surface area $A_1$) into shorter sub-planes via the following actions:

11.1 Compute the maximum voxel fracture length $l_i$, where i denotes the set index:

$$l_i = \text{MIN}\left[\frac{\Delta x}{|\sin\varphi_i|}, \frac{\Delta y}{|\cos\varphi_i|}\right]$$

11.2 Compute the total compliance $B_T = B_{to} \cdot (A_i/H_i)^C$ of the single fracture (eq. 20).

11.3 Set sequential sub-plane index k=1 and the sum of compliances $\Sigma B_{Tk} = 0$.

11.4 Generate a uniform deviate $\delta_U$ in the range 0 to 1.

11.5 Compute the length of fracture sub-plane k as $l_k \delta U \cdot l_i$ 11.6 Compute the compliance of sub-plane k as $B_{Tk} = B_{to} \cdot l_k^C$ 11.7 Accumulate the sum of sub-plane compliances as $\Sigma B_{Tk} = \Sigma B_{Tk} + B_{Tk}$ 11.8 If $\Sigma B_{Tk} < B_T$, set k=k+1 and return to action 11.3

11.9 If $\Sigma B_{Tk} > B_T$, set $l_k = [(\Sigma B_{Tk} - B_T)/B_{To}]^{1/C}$ 11.10 Position the endpoints of each sub-plane 1 to k randomly within the voxel such that the sub-plane is completely enclosed within the voxel:

11.10.1 Compute coordinates $x_{k_1}, y_{k_1}$ endpoint 1 as:

$$x_{k_1} = x_0 + \delta_{Ux} \Delta x$$

$$y_{k_1} = y_0 + \delta_{Uy} \Delta y$$

where $x_0, y_0$ denote the coordinates of the voxel origin, and $\delta_{Ux}, \delta_{Uy}$ denote uniform deviates between zero and unity.

11.10.2 Compute coordinates $x_{k_2}, y_{k_2}$ of endpoint 2 as:

$$x_{k_2} = x_{k_1} + l_k \left|\cos\left(\frac{\pi}{2} - \varphi_i\right)\right|$$

$$y_{k_2} = \begin{cases} y_{k_1} + l_k \left|\sin\left(\frac{\pi}{2} - \varphi_i\right)\right|, & 0 \leq \varphi_i \leq \frac{\pi}{2} \\ y_{k_1} - l_k \left|\sin\left(\frac{\pi}{2} - \varphi_i\right)\right|, & 0 > \varphi_i > \frac{\pi}{2} \end{cases}$$

11.10.3 Shift the endpoints if they lie outside the voxel boundaries:

$$\begin{cases} x_{k_1} = x_{k_1} + x_o + \Delta x - x_{k_2}, & x_{k_2} = x_o + \Delta x, & x_{k_2} > x_o + \Delta x \\ y_{k_1} = y_{k_1} + y_o + y_{k_2}, & y_{k_2} = y_o, & y_{k_2} < y_o \\ y_{k_1} = y_{k_1} + y_o + \Delta y - y_{k_2}, & y_{k_2} = y_o + \Delta y, & y_{k_2} > y_o + \Delta y \end{cases}$$

11.10.4 Repeat actions 11.10.1-3 if the perpendicular distance of the current sub-plane k to a previous sub-plane 0 . . . k−1 is less than a threshold (e.g. 3% of voxel diagonal).

12. Repeat actions 11.1-11.10 for fracture set 2 to partition the single fracture plane of azimuth $\varphi_2$ and surface area $A_2$ into shorter sub-planes positioned randomly within the voxel but completely enclosed within it.

13. Repeat actions 1-12 at the next location until locations in G[x,y,z] have been processed.

14. Once locations in G[x,y,z] have been processed, perform a post-fix fracture merge operation on cells at the same depth level, to better honor the expected distribution of fracture lengths. Merge fractures having approximately the same azimuth but situated in adjacent cells by laterally repositioning them so their vertical edges join at the cell boundary to form a single longer fracture. The total fracture area within each cell is not changed as a result of this merge operation, since each constituent fracture remains fully contained within its original host cell. Fractures from multiple adjacent cells can be merged to form a single continuous fracture. As an example, discretization of primary fracture set azimuths can be performed for azimuths in different cells to be equal. However, discretization affects resolution (see D.2).

15. Compile a histogram of the (merged) fracture length in individual cells, compute the mean and maximum fracture length and compare to the expected values $L_0$ and $L_{max}$. Repeat action 14 as desired until a satisfactory agreement is obtained. As an example, it may be possible to change $\Delta x$, $\Delta y$ to achieve an acceptable agreement (see D.1).

Figure 23:
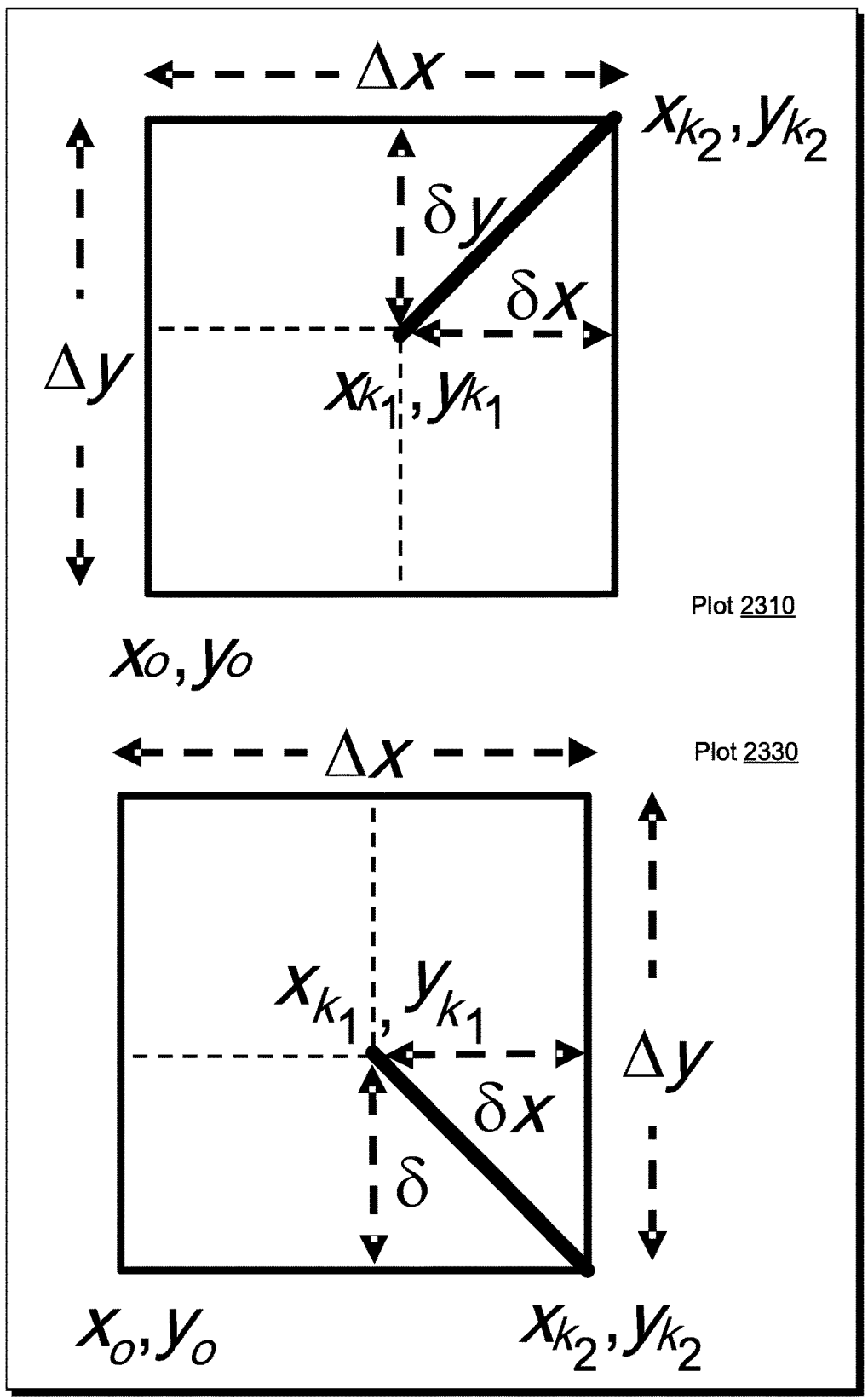
FIG. 23 illustrates example plots.

FIG. 23 shows plots 2310 and 2330 of feasible locations (bounded by thin dashed lines) for the first endpoint of a vertical fracture plane (thick diagonal line) in a voxel of dimensions $\Delta x, \Delta y$ with origin at $x_0, y_0$ for fracture azimuths between 0°-90° (upper) and azimuths between 90°-180° (lower).

D. Performance Factors

As an example, performance of an algorithm may be measured by: i) the resolution of its output, and ii) the efficiency with which the output is obtained. The performance of algorithm C. is influenced by the following parameters:

1. Voxel Volume V

Since the maximum length of any fracture is determined by the lateral voxel dimensions $\Delta x$, $\Delta y$, the voxel volume $V = \Delta x \cdot \Delta y \cdot \Delta z$ effectively controls the resolution of the algorithm via the number and length of fractures generated. If V is large, a smaller number of longer fractures is generated, whereas if V is small, a larger number of shorter fractures is generated. Moreover, this relationship also determines the relative efficiency of the algorithm, since fewer voxels implies fewer computations. Accordingly, the voxel volume V can be small enough that the average number of fractures in each voxel exceeds unity for each fracture set, but large enough that the average fracture length is on the order of the mean fracture length $L_0$. These considerations suggest the following ranges:

$$\frac{L_o}{2}\cos\left(\frac{1}{2}\pi - \phi_1\right) < \Delta x < 2L_o$$

$$\frac{L_o}{2}\sin\left(\frac{1}{2}\pi - \phi_1\right) < \Delta y < 2L_o$$

2. Discretization Interval A

Appropriate choice of the azimuthal discretization interval for the primary fracture set is similarly subject to opposing considerations. A smaller value of A increases resolution by better representing a continuous azimuth distribution. However, a smaller value of $\Delta$ reduces the probability of fractures in different cells having the same azimuth, thus precluding the merging of shorter fractures to form longer ones spanning more than one cell (see, e.g., action C.14). As an example, merging fractures can be a possible action, for example, to obtain a more realistic network of sufficiently interconnected fractures. As an example, depending on complexity of dynamics involved, experimentation may be effective for choosing an appropriate value for $\Delta$.

E. Other Constraints

If available, additional constraints, such as fracture orientation data from moment tensor inversion of micro-seismic data, could be employed to constrain the distributions of fracture azimuths and/or fracture length.

F. Output

The output of the aforementioned procedure is a discrete fracture network (DFN) consistent with the inputs provided. As an example, the DFN can be output as PETREL® framework fracture attributes in a "FAB" file format. Replacing multiple contiguous shorter fractures by a single merged fracture plane on output is not practically feasible, as this would increase the compliance of the longer fracture (via equation 17) and hence each sub-plane, thus causing the product of shear modulus $\mu$ and fracture compliance within each contributing voxel to exceed the original dimensionless coefficients $a_{ij}$. Notwithstanding, by virtue of their contiguous nature, vertically joined fracture planes can be computationally indistinguishable from a single longer fracture and thus provide a more realistic degree of fracture network connectivity.

Figure 24:
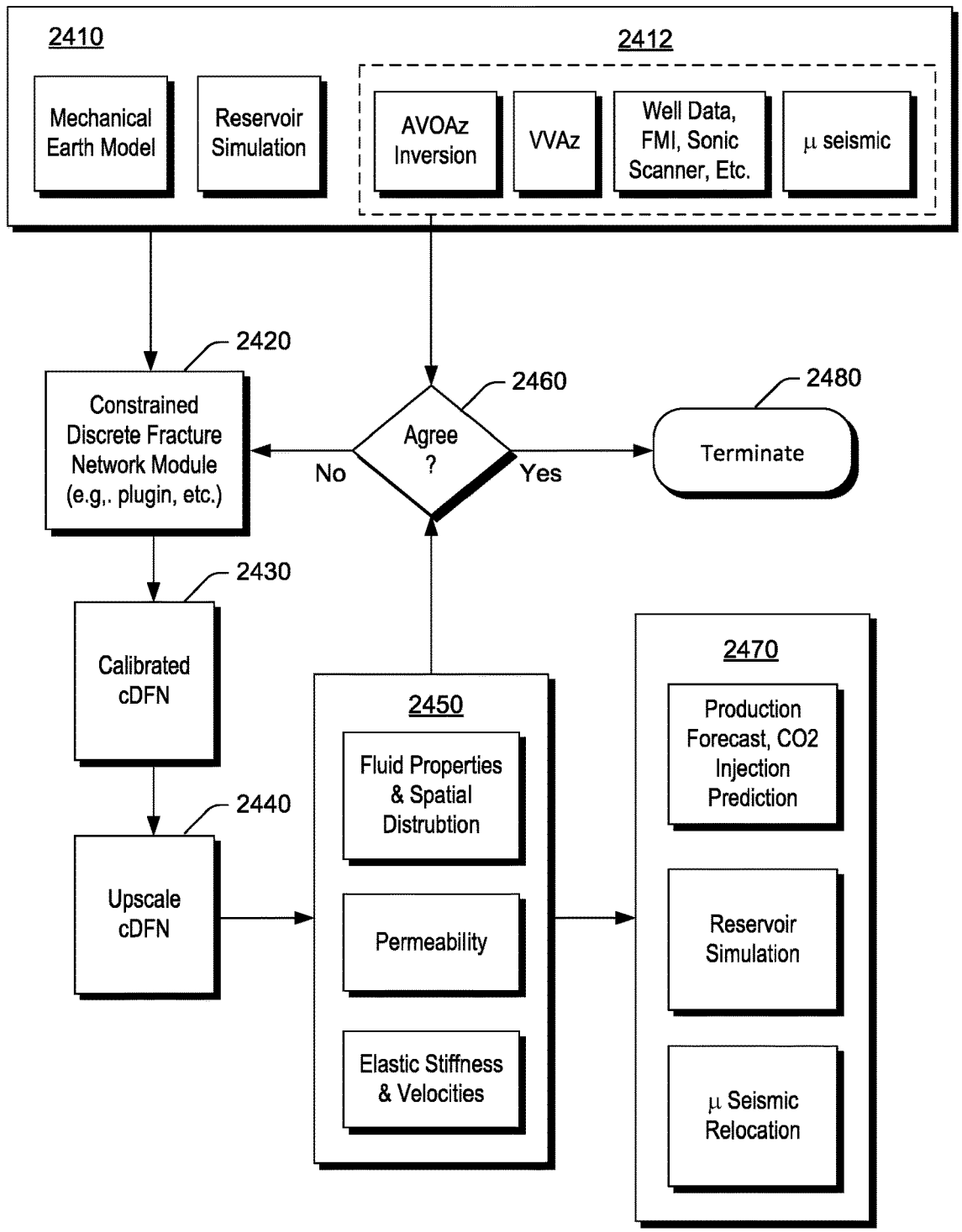
FIG. 24 illustrates an example of a method.

FIG. 24 shows a diagram of a method 2400 that includes an input block 2410 that can include a mechanical earth model (MEM), a reservoir simulation, AVOAz inversion AVAz, well data, image data (e.g., FMI data), sonic scanner data, and micro seismic parameter $\mu$. The method 2400 can include providing various inputs of the input block 2410 to a constrained discrete fracture network module or block 2420, which may be provided as processor-executable instructions stored in a storage device (e.g., memory) where execution of the instructions by one or more processors can cause a computing device, computing system, etc., to perform various actions to generate a cDFN, which may be output as a result according to a calibrated cDFN block 2430. As shown, the method 2400 can include an upscale block 2440 to perform upscaling using the cDFN. As an example, the module or block 2420 may be a plug-in, for example, it may be a PETREL® framework (e.g., or OCEAN® framework) plug-in.

As to the upscale block 2440, one or more techniques may be implemented. For example, consider a technique that includes identifying a fracture polygon intersecting a voxel of a three-dimensional grid of voxels representing a region of interest of a hydrocarbon-bearing reservoir (e.g., based on information associated with a discrete fracture network) and partitioning the fracture polygon with a regular mesh of points. In such an example, the technique can include determining a number of the mesh points inside the voxel and inside the fracture polygon and, for example, estimating an area of the fracture inside the voxel based at least in part on the determined number of mesh points inside the voxel and inside the fracture polygon. Such a technique can then include determining at least one property of a portion of the reservoir, which coincides with the voxel based at least in part on the estimated area of the fracture. As an example one or more techniques of US Patent Application Publication No. 2011/0087472, to den Boer and Sayers (incorporated by reference herein) may be implemented as to upscaling.

In the example of FIG. 24, the upscale block 2440 may provide values for one or more of permeability, elastic stiffness, velocity, one or more injection anomalies (e.g., $CO_2$, etc.), etc. For example, as shown in the block 2450, fluid properties and spatial distribution may be provided by the upscale block 2440 (see also, e.g., permeabilities, elastic stiffnesses, velocities, etc.). As shown, the method 2400 can include a decision block 2460 that can include deciding whether sufficient agreement exists between values (see, e.g., input subset 2412) and upscaled values. Such a decision can include computing, comparing, etc., for example, with respect to one or more criteria. As shown in FIG. 24, where sufficient agreement exists, the decision block 2460 can include continuing at a termination block 2480; whereas, if sufficient agreement is not achieved, the method 2400 may continue to the module or block 2420. As shown, the method 2400 can include a loop where the loop iterates in an effort to achieve sufficient agreement.

As shown in the example of FIG. 24, the method 2400 can also include operations such as forecasting production, planning/predicting $CO_2$ injection operations and/or results, performing $\mu$ seismic relocation, etc.

As an example, a method can include receiving impedance values and azimuthal attribute values from an inversion based at least in part on seismic amplitude variation with azimuth (AVAz) data for a region of a geologic environment; based at least in part on the impedance values and azimuthal attribute values, computing values that depend on components of a second-rank tensor $\alpha_{ij}$; selecting a fracture height for fractures in the geologic environment; selecting an azimuth for a first fracture set of the fractures; based at least in part on the values for the second-rank tensor $\alpha_{ij}$, the fracture height and the selected azimuth, determining an azimuth for a second fracture set of the fractures; and generating a discrete fracture network (DFN) for at least a portion of the region of the geologic environment where the discrete fracture network (DFN) includes fractures of the first fracture set and fractures of the second fracture set. In such an example, the DFN may be referred to as a constrained DFN. In such a method, the components of the second-rank tensor can include components with i, j indexes 1,1; 1,2; and 2,2.

As an example, a method can include receiving impedance values and azimuthal attribute values from an inversion based at least in part on seismic amplitude variation with azimuth (AVAz) data for a region of a geologic environment; based at least in part on the impedance values and azimuthal attribute values, computing values that depend on components of a second-rank tensor $\alpha_{ij}$; selecting a fracture height for fractures in the geologic environment; selecting an azimuth for a first fracture set of the fractures; based at least in part on the values for the second-rank tensor $\alpha_{ij}$, the fracture height and the selected azimuth, determining an azimuth for a second fracture set of the fractures; and generating a discrete fracture network (DFN) for at least a portion of the region of the geologic environment where the discrete fracture network (DFN) includes fractures of the first fracture set and fractures of the second fracture set. In such an example, the components of the second-rank tensor $\alpha_{ij}$ can be associated with shear compliance $B_T$ and the method can include computing values that depend on components of a fourth-rank tensor $\beta_{ijkl}$ where the components of the fourth-rank tensor $\beta_{ijkl}$ are associated with normal compliance $B_N$ and shear compliance $B_T$. For example, such a method can include, based at least in part on th impedance values and azimuthal attribute values, computing values that depend on components of a second-rank tensor $\alpha_{ij}$ (associated with shear compliance $B_T$) and that depend on components of a fourth-rank tensor $\beta_{ijkl}$ (associated with normal compliance $B_N$ and shear compliance $B_T$).

As an example, fracture planes can be aligned substantially vertically and a region of a geologic environment can be characterized as being transversely isotropic with a vertical or tilted axis of rotational symmetry.

As an example, impedance values can include S-Impedance values. As an example, impedance values can include P-Impedance values. As an example, a method can include receiving impedance values for fast shear impedance $I_{S_1}$ and slow shear impedance $I_{S_2}$. As an example, a method can include receiving at least shear impedance values and a value for a fast shear azimuth. As an example, a method can include receiving values for $\Gamma_x$ and $\Gamma_y$ (e.g., as may be generated via an orthotropic inversion).

As an example, a region may be a region of a hydrocarbon reservoir. As an example, a region may be a region of a carbonate reservoir.

As an example, a method can include performing and/or receiving information from one or more linearized orthotropic inversions.

As an example, a method can include performing one or more inversions and/or receiving values for P-impedance ($I_P$), fast shear impedance ($I_{S1}$), slow shear impedance ($I_{S2}$) and fast shear azimuth ($\phi_{S1}$).

As an example, a method can include selecting fracture planes at random from probability distribution functions, for example, for determining agreement with at least a portion of results of at least one AVAz inversion.

As an example, a method can include selecting fracture planes for determining agreement with at least a portion of results of one or more seismic inversions, for example, by using an appropriate scale-dependent relation between fracture normal and shear compliance and fracture dimensions.

As an example, a method can include, based at least in part on a generated DFN (e.g., a cDFN), performing one or more of predicting permeability of a reservoir, determining a location for an in-fill well, determining an orientation of an in-fill well, and determining a location and an orientation of an in-fill well.

As an example, a method can include constraints from well data that constrain fracture orientations at one or more well locations and at least in part determine properties of background media (e.g., "unfractured" background rock).

As an example, a method can include drilling at least one well based at least in part on locations of the fractures in a generated discrete fracture network (e.g., a generated cDFN).

As an example, a system can include a processor; memory operatively coupled to the processor; and one or more modules that include processor-executable instructions stored in the memory to instruct the system where the instructions include instructions to: receive impedance values and azimuthal attribute values from an inversion based at least in part on seismic amplitude variation with azimuth (AVAz) data for a region of a geologic environment; based at least in part on the impedance values and azimuthal attribute values, compute values that depend on components of a second-rank tensor $\alpha_{ij}$; select a fracture height for fractures in the geologic environment; select an azimuth for a first fracture set of the fractures; based at least in part on the values for the second-rank tensor $\alpha_{ij}$, the fracture height and the selected azimuth, determine an azimuth for a second fracture set of the fractures; and generate a discrete fracture network (DFN) for at least a portion of the region of the geologic environment where the discrete fracture network (DFN) includes fractures of the first fracture set and fractures of the second fracture set. In such an example, instructions can be included to drill at least one well based at least in part on locations of the fractures in the discrete fracture network (e.g., instructions that can direct one or more operations associated with drilling earth via drilling and/or related equipment).

As an example, one or more computer-readable storage media can include computer-executable instructions to instruct a computer where the instructions include instructions to: receive impedance values and azimuthal attribute values from an inversion based at least in part on seismic amplitude variation with azimuth (AVAz) data for a region of a geologic environment; based at least in part on the impedance values and azimuthal attribute values, compute values that depend on components of a second-rank tensor $\alpha_{ij}$; select a fracture height for fractures in the geologic environment; select an azimuth for a first fracture set of the fractures; based at least in part on the values for the second-rank tensor $\alpha_{ij}$, the fracture height and the selected azimuth, determine an azimuth for a second fracture set of the fractures; and generate a discrete fracture network (DFN) for at least a portion of the region of the geologic environment where the discrete fracture network (DFN) includes fractures of the first fracture set and fractures of the second fracture set. In such an example, the one or more computer-readable media can include instructions to drill at least one well based at least in part on locations of the fractures in the discrete fracture network (e.g., instructions that can direct one or more operations associated with drilling earth via drilling and/or related equipment).

As an example, a method can include accounting for the scale dependence of fracture compliance such that fracture compliance depends on size of fractures.

As an example, a method can include at least a portion of fractures within a given fracture set that are not perfectly parallel to at least a portion of other fractures within the given fracture set, for example, due to dispersion in fracture orientations. For example, a method can include generating fractures with a fracture dispersion as to angular orientation as may be viewed in a x-y plane of a Cartesian coordinate system where z represents a direction substantially aligned with an axis of symmetry (e.g., consider a vertical axis for VTI, a tilted axis for a form of TI, etc.).

As an example, a method can include generating multiple fracture planes within at least one fracture set.

As an example, a method can include generating a gridded model, where, for example, individual grid cells may be processed independently (e.g., of one or more other individual grid cells). As an example, a grid can include grid cells where one or more individual grid cells include a respective individual grid cell DFN. For example, in a grid of cells, a grid cell can include its own DFN, which may be a generated constrained DFN (e.g., a cDFN). A method can include generating a DFN for a first grid cell, selecting a second grid cell and generating a second DFN for the second grid cell, etc. As an example, a method may be implemented at least in part in parallel for a plurality of grid cells to independently generate a respective DFN for individual grid cells. For example, given four processing cores, four DFNs may be generated in a parallel processing manner. As an example, given virtual machines (e.g., operating on a hardware platform via software that may include a hypervisor, etc.), a method may be implemented in parallel for a plurality of cells to generate a plurality of corresponding DFNs.

As an example, a method can include receiving constraints from well data such as sonic data, image logs, etc., that can be used to constrain fracture orientations at one or more well locations and, for example, to determine properties of the unfractured background rock.

As an example, by combining constraints from microseismic data, a generated DFN may be used to predict one or more fracture patterns that may be produced by one or more hydraulic fracturing operations.

As an example, a DFN may be used to predict permeability which can be compared with production data, well tests, model the propagation of a hydraulic fracture, etc. In such an example, one or more discrepancies may be used to update, the fracture aperture, for example.

As an example, a generated DFN may predict changes in elastic properties and seismic velocities in a grid that can be compared with crosswell seismic, seismic reflection data, etc. In such an example, one or more discrepancies may be used to update the model.

As an example, a workflow may be associated with various computer-readable media (CRM) blocks. Such blocks generally include instructions suitable for execution by one or more processors (or cores) to instruct a computing device or system to perform one or more actions. As an example, a single medium may be configured with instructions to allow for, at least in part, performance of various actions of a workflow. As an example, a computer-readable medium (CRM) may be a computer-readable storage medium. As an example, blocks may be provided as one or more modules, for example, such as the one or more modules 270 of the system 250 of FIG. 2.

Figure 25:
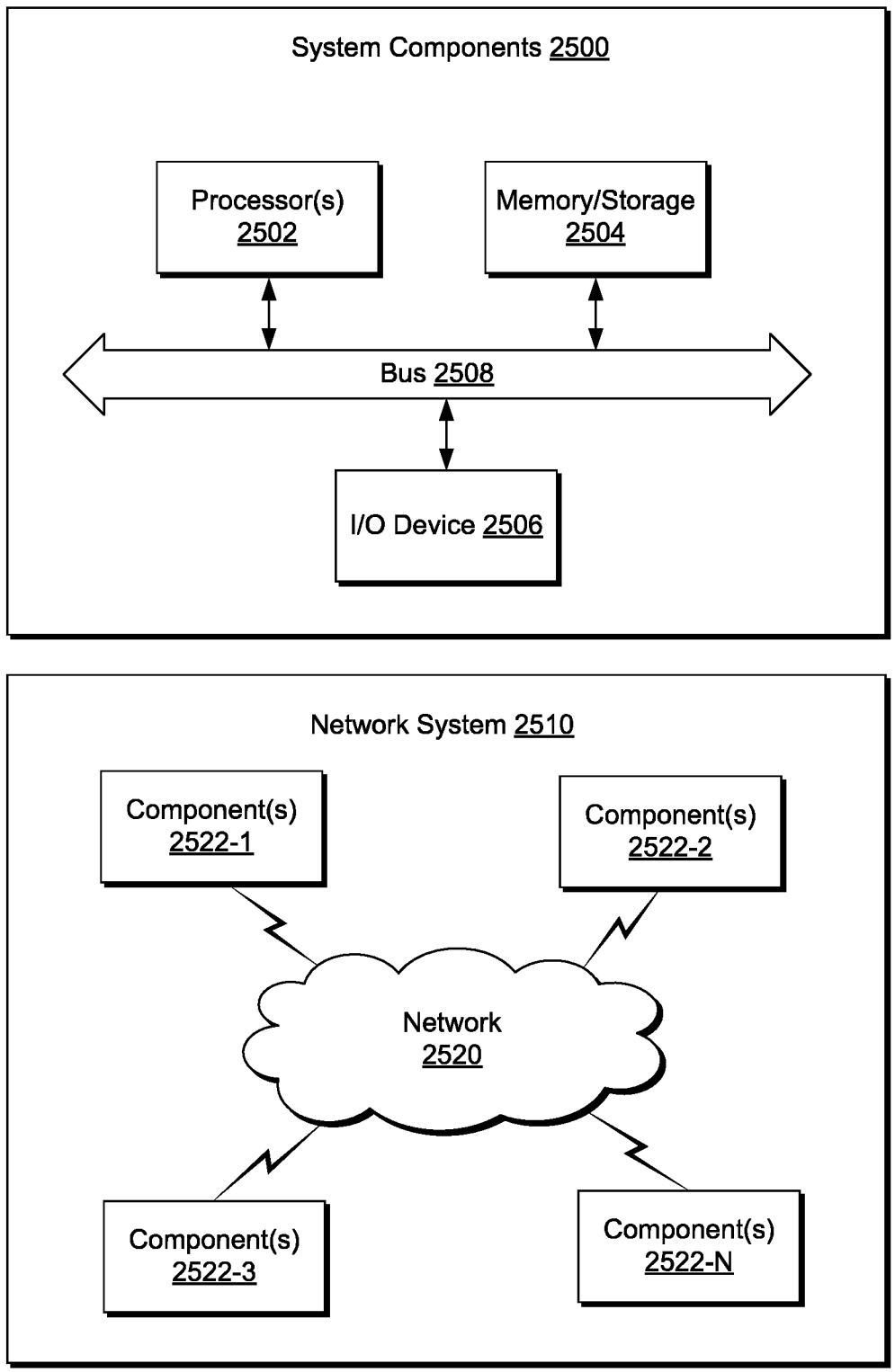
FIG. 25 illustrates example components of a system and a networked system.

FIG. 25 shows components of an example of a computing system 2500 and an example of a networked system 2510. The system 2500 includes one or more processors 2502, memory and/or storage components 2504, one or more input and/or output devices 2506 and a bus 2508. In an example embodiment, instructions may be stored in one or more computer-readable media (e.g., memory/storage components 2504). Such instructions may be read by one or more processors (e.g., the processor(s) 2502) via a communication bus (e.g., the bus 2508), which may be wired or wireless. The one or more processors may execute such instructions to implement (wholly or in part) one or more attributes (e.g., as part of a method). A user may view output from and interact with a process via an I/O device (e.g., the device 2506). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 2510. The network system 2510 includes components 2522-1, 2522-2, 2522-3, . . . 2522-N. For example, the components 2522-1 may include the processor(s) 2502 while the component(s) 2522-3 may include memory accessible by the processor(s) 2502. Further, the component(s) 2522-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

BIBLIOGRAPHY (DOCUMENTS INCORPORATED BY REFERENCE HEREIN)

1. Sayers, C. M., 1998, Misalignment of the orientation of fractures and the principal axes for P- and S-waves in rocks containing multiple non-orthogonal fracture sets: *Geophysical Journal International,* 133, 459-466.
2. Sayers, C. M. and S. Dean, 2001, Azimuth-dependent AVO in reservoirs containing non-orthogonal fracture sets: *Geophysics,* 49, 100-106.
3. Sayers, C. M. and Kachanov, M., 1995, Microcrack-induced elastic wave anisotropy of brittle rocks: *J. Geophys. Res.,* 100, 4149-4156.
4. Sayers, C. M. and J. E. Rickett, 1997, Azimuthal variation in AVO response for fractured gas sands: *Geophysical Prospecting,* 45, 165-182.
5. Schoenberg, M. and J. Protazio, 1992, Zoeppritz rationalized and generalized to anisotropy: *Journal of Seismic Exploration,* 1, 125-144.
6. Schoenberg, M., and C. M. Sayers, 1995, Seismic anisotropy of fractured rock: *Geophysics,* 60, 204-211.
7. Worthington, M., 2007, The compliance of macrofractures: *The Leading Edge,* SEG, September 2007, 26, 9, 1118-22.

What is claimed is:

1. A method comprising:
    receiving impedance values and azimuthal attribute values from an inversion based at least in part on seismic amplitude variation with azimuth data for a region of a geologic environment;
    based at least in part on the impedance values and azimuthal attribute values, computing values that depend on components of a second-rank tensor;
    selecting a fracture height for fractures in the geologic environment;
    selecting an azimuth for a first fracture set of the fractures;
    based at least in part on the values for the second-rank tensor, the selected fracture height and the selected azimuth, determining an azimuth for a second fracture set of the fractures;
    generating a discrete fracture network for at least a portion of the region of the geologic environment wherein the discrete fracture network comprises fractures of the first fracture set and fractures of the second fracture set; and
    based at least in part on the discrete fracture network, performing one or more of predicting permeability of a reservoir, determining a location for an in-fill well, determining an orientation of an in-fill well, and determining a location and an orientation of an in-fill well.

2. The method of claim 1 wherein the components of the second-rank tensor are associated with shear compliance.

3. The method of claim 1 wherein the components of the second-rank tensor comprise components with i, j indexes 1, 1, 1, 2 and 2, 2.

4. The method of claim 1 wherein the fractures are represented by fracture planes that are aligned substantially vertically and wherein the region of the geologic environment is characterized as being transversely isotropic with a vertical or tilted axis of rotational symmetry.

5. The method of claim 1 wherein the impedance values comprise S-Impedance values.

6. The method of claim 1 wherein the impedance values comprise P-Impedance values.

7. The method of claim 1 wherein the receiving comprises receiving impedance values for fast shear impedance $I_{S1}$ and slow shear impedance $I_{S2}$.

8. The method of claim 1 wherein the receiving comprises receiving at least shear impedance values and a value for a fast shear azimuth.

9. The method of claim 1 wherein the inversion comprises a linearized orthotropic inversion.

10. The method of claim 1 wherein the receiving comprises receiving values for P-impedance ($I_P$), fast shear impedance ($I_{S1}$), slow shear impedance ($I_{S2}$) and fast shear azimuth $\phi_{S1}$).

11. The method of claim 1 comprising selecting fracture planes at random from probability distribution functions for determining agreement with results of seismic amplitude variation with azimuth inversion.

12. The method of claim 1 comprising selecting fracture planes for determining agreement with results of seismic inversion by using an appropriate scale-dependent relation between fracture normal and shear compliance and fracture dimensions.

13. The method of claim 1 wherein constraints from well data constrain fracture orientations at one or more well locations and at least in part determine properties of background media.

14. The method of claim 1 comprising computing values that depend on components of the second-rank tensor and that depend on components of a fourth-rank tensor wherein the components of the second-rank tensor are associated with shear compliance and wherein the components of the fourth-rank tensor are associated with normal compliance and shear compliance.

15. A system comprising:
    a processor;
    memory operatively coupled to the processor; and
    one or more modules that comprise processor-executable instructions stored in the memory to instruct the system wherein the instructions comprise instructions to:
        receive impedance values and azimuthal attribute values from an inversion based at least in part on seismic amplitude variation with azimuth data for a region of a geologic environment;
        based at least in part on the impedance values and azimuthal attribute values, compute values that depend on components of a second-rank tensor;
        select a fracture height for fractures in the geologic environment;
        select an azimuth for a first fracture set of the fractures;
        based at least in part on the values for the second-rank tensor, the selected fracture height and the selected azimuth, determine an azimuth for a second fracture set of the fractures;
        generate a discrete fracture network for at least a portion of the region of the geologic environment wherein the discrete fracture network comprises fractures of the first fracture set and fractures of the second fracture set; and
        based at least in part on the discrete fracture network, perform one or more of predict permeability of a reservoir, determine a location for an in-fill well, determine an orientation of an in-fill well, and determine a location and an orientation of an in-fill well.

16. A method comprising:
    receiving impedance values and azimuthal attribute values from an inversion based at least in part on seismic amplitude variation with azimuth data for a region of a geologic environment;
    based at least in part on the impedance values and azimuthal attribute values, computing values that depend on components of a second-rank tensor;
    selecting a fracture height for fractures in the geologic environment;
    selecting an azimuth for a first fracture set of the fractures;
    based at least in part on the values for the second-rank tensor, the selected fracture height and the selected azimuth, determining an azimuth for a second fracture set of the fractures;
    generating a discrete fracture network for at least a portion of the region of the geologic environment wherein the discrete fracture network comprises fractures of the first fracture set and fractures of the second fracture set; and
    selecting fracture planes for determining agreement with results of seismic inversion by using an appropriate scale-dependent relation between fracture normal and shear compliance and fracture dimensions.

17. The method of claim 16 wherein the components of the second-rank tensor are associated with shear compliance.

18. The method of claim 16 wherein the receiving comprises receiving impedance values for fast shear impedance $I_{si}$ and slow shear impedance $I_{S2}$.

19. The method of claim 16 wherein the receiving comprises receiving at least shear impedance values and a value for a fast shear azimuth.

20. The method of claim 16 comprising computing values that depend on components of the second-rank tensor and that depend on components of a fourth-rank tensor wherein the components of the second-rank tensor are associated with shear compliance and wherein the components of the fourth-rank tensor are associated with normal compliance and shear compliance.

* * * * *